(12) United States Patent
Hughes et al.

(10) Patent No.: US 10,578,720 B2
(45) Date of Patent: Mar. 3, 2020

(54) LIDAR SYSTEM WITH A POLYGON MIRROR AND A NOISE-REDUCING FEATURE

(71) Applicant: LUMINAR TECHNOLOGIES, INC., Orlando, FL (US)

(72) Inventors: John G. Hughes, Casselberry, FL (US); Sean P. Hughes, Belle Isle, FL (US)

(73) Assignee: Luminar Technologies, Inc., Orlando, FL (US)

( * ) Notice: Subject to any disclaimer, the term of this patent is extended or adjusted under 35 U.S.C. 154(b) by 0 days.

(21) Appl. No.: 15/974,319

(22) Filed: May 8, 2018

(65) Prior Publication Data

US 2019/0310351 A1 Oct. 10, 2019

Related U.S. Application Data

(60) Provisional application No. 62/653,452, filed on Apr. 5, 2018.

(51) Int. Cl.
*G01S 7/48* (2006.01)
*G01S 7/481* (2006.01)
(Continued)

(52) U.S. Cl.
CPC ............ *G01S 7/4817* (2013.01); *G01S 7/484* (2013.01); *G01S 7/4863* (2013.01); *G02B 5/09* (2013.01);
(Continued)

(58) Field of Classification Search
CPC .......... G01S 7/484; G01S 17/89; G01S 17/10; G01S 7/4817; G01S 17/936; G01S 17/87;
(Continued)

(56) References Cited

U.S. PATENT DOCUMENTS

| 5,006,721 A | 4/1991 | Cameron et al. |
| 5,793,491 A | 8/1998 | Wangler et al. |

(Continued)

OTHER PUBLICATIONS

Precision Laser Scanning, "Road Runner 70,000 RPM Polygon Scanner Solves the Noise Problem," (2016). Retrieved from the Internet at: URL:https://precisionlaserscanning.com/2016/03/road-runner-70000-rpm-polygon-scanner-solves-the-noise-problem/.
(Continued)

*Primary Examiner* — Luke D Ratcliffe

(57) ABSTRACT

A lidar system includes a light source configured to produce a beam of light, a scanner configured to scan a field of regard of the lidar system, and a receiver configured to detect light from the beam of light scattered by a remote target. The scanner includes a polygon mirror having a block with a first wall, a second wall, and several reflective surfaces angularly offset from one another along a periphery of the block, the polygon mirror configured to rotate about a scan-mirror rotation axis to scan the beam of light across the field of regard. The scanner further includes a bracket adjacent to the polygon mirror, where at least one of the polygon mirror or the bracket includes a noise-reducing feature configured to reduce acoustic noise produced when pressure waves generated by the polygon mirror during rotation are incident on one or more components of the scanner.

21 Claims, 32 Drawing Sheets

(51) Int. Cl.
- *G01S 7/4863* (2020.01)
- *G02B 26/10* (2006.01)
- *G02B 26/08* (2006.01)
- *G01S 7/484* (2006.01)
- *G02B 5/09* (2006.01)
- *G02B 26/12* (2006.01)
- *G01S 13/931* (2020.01)

(52) U.S. Cl.
CPC ....... *G02B 26/0816* (2013.01); *G02B 26/101* (2013.01); *G02B 26/105* (2013.01); *G02B 26/12* (2013.01); *G01S 13/931* (2013.01)

(58) Field of Classification Search
CPC ...... G01S 17/42; G01S 7/4814; G01S 7/4861; G01S 7/499
See application file for complete search history.

(56) References Cited

U.S. PATENT DOCUMENTS

| | | |
|---|---|---|
| 6,449,384 B2 | 9/2002 | Laumeyer et al. |
| 6,710,324 B2 | 3/2004 | Hipp |
| 6,723,975 B2 | 4/2004 | Saccomanno |
| 6,747,747 B2 | 6/2004 | Hipp |
| 6,759,649 B2 | 7/2004 | Hipp |
| 7,092,548 B2 | 8/2006 | Laumeyer et al. |
| 7,209,221 B2 | 4/2007 | Breed et al. |
| 7,345,271 B2 | 3/2008 | Boehlau et al. |
| 7,443,903 B2 | 10/2008 | Leonardo et al. |
| 7,532,311 B2 | 5/2009 | Henderson et al. |
| 7,570,793 B2 | 8/2009 | Lages et al. |
| 7,583,364 B1 | 9/2009 | Mayor et al. |
| 7,649,920 B2 | 1/2010 | Welford |
| 7,652,752 B2 | 1/2010 | Fetzer et al. |
| 7,872,794 B1 | 1/2011 | Minelly et al. |
| 7,902,570 B2 | 3/2011 | Itzler et al. |
| 7,945,408 B2 | 5/2011 | Dimsdale et al. |
| 7,969,558 B2 | 6/2011 | Hall |
| 7,995,796 B2 | 8/2011 | Retterath et al. |
| 8,059,263 B2 | 11/2011 | Haberer et al. |
| 8,072,663 B2 | 12/2011 | O'Neill et al. |
| 8,081,301 B2 | 12/2011 | Stann et al. |
| 8,138,849 B2 | 3/2012 | West et al. |
| 8,279,420 B2 | 10/2012 | Ludwig et al. |
| 8,280,623 B2 | 10/2012 | Trepagnier et al. |
| 8,346,480 B2 | 1/2013 | Trepagnier et al. |
| 8,364,334 B2 | 1/2013 | Au et al. |
| 8,452,561 B2 | 5/2013 | Dimsdale et al. |
| 8,548,014 B2 | 10/2013 | Fermann et al. |
| 8,625,080 B2 | 1/2014 | Heizmann et al. |
| 8,675,181 B2 | 3/2014 | Hall |
| 8,723,955 B2 | 5/2014 | Kiehn et al. |
| 8,767,190 B2 | 7/2014 | Hall |
| 8,796,605 B2 | 8/2014 | Mordarski et al. |
| 8,836,922 B1 | 9/2014 | Pennecot et al. |
| 8,880,296 B2 | 11/2014 | Breed |
| 8,896,818 B2 | 11/2014 | Walsh et al. |
| 8,934,509 B2 | 1/2015 | Savage-Leuchs et al. |
| 9,000,347 B2 | 4/2015 | Woodward et al. |
| 9,041,136 B2 | 5/2015 | Chia |
| 9,048,370 B1 | 6/2015 | Urmson et al. |
| 9,063,549 B1 | 6/2015 | Pennecot et al. |
| 9,069,060 B1 | 6/2015 | Zbrozek et al. |
| 9,074,878 B2 | 7/2015 | Steffey et al. |
| 9,086,273 B1 | 7/2015 | Gruver et al. |
| 9,086,481 B1 | 7/2015 | Dowdall et al. |
| 9,091,754 B2 | 7/2015 | d'Aligny |
| 9,103,669 B2 | 8/2015 | Giacotto et al. |
| 9,121,703 B1 | 9/2015 | Droz et al. |
| 9,160,140 B2 | 10/2015 | Gusev et al. |
| 9,170,333 B2 | 10/2015 | Mheen et al. |
| 9,199,641 B2 | 12/2015 | Ferguson et al. |
| 9,213,085 B2 | 12/2015 | Kanter |
| 9,239,260 B2 | 1/2016 | Bayha et al. |
| 9,246,041 B1 | 1/2016 | Clausen et al. |
| 9,285,464 B2 | 3/2016 | Pennecot et al. |
| 9,285,477 B1 | 3/2016 | Smith et al. |
| 9,297,901 B2 | 3/2016 | Bayha et al. |
| 9,299,731 B1 | 3/2016 | Lenius et al. |
| 9,304,154 B1 | 4/2016 | Droz et al. |
| 9,304,203 B1 | 4/2016 | Droz et al. |
| 9,304,316 B2 | 4/2016 | Weiss et al. |
| 9,310,471 B2 | 4/2016 | Sayyah et al. |
| 9,335,255 B2 | 5/2016 | Retterath et al. |
| 9,360,554 B2 | 6/2016 | Retterath et al. |
| 9,368,933 B1 | 6/2016 | Nijjar et al. |
| 9,383,201 B2 | 7/2016 | Jachman et al. |
| 9,383,445 B2 | 7/2016 | Lu et al. |
| 9,383,753 B1 | 7/2016 | Templeton et al. |
| RE46,672 E | 1/2018 | Hall |
| 2006/0209376 A1* | 9/2006 | Yamakawa ......... G02B 26/124 359/216.1 |
| 2006/0290920 A1 | 12/2006 | Kampchen et al. |
| 2009/0273770 A1 | 11/2009 | Bauhahn et al. |
| 2010/0034221 A1 | 2/2010 | Dragic |
| 2012/0227263 A1 | 9/2012 | Leclair et al. |
| 2013/0033742 A1 | 2/2013 | Rogers et al. |
| 2014/0111805 A1 | 4/2014 | Albert et al. |
| 2014/0168631 A1 | 6/2014 | Haslim et al. |
| 2014/0176933 A1 | 6/2014 | Haslim et al. |
| 2014/0211194 A1 | 7/2014 | Pacala et al. |
| 2014/0293263 A1 | 10/2014 | Justice et al. |
| 2014/0293266 A1 | 10/2014 | Hsu et al. |
| 2015/0131080 A1 | 5/2015 | Retterath et al. |
| 2015/0177368 A1 | 6/2015 | Bayha et al. |
| 2015/0185244 A1 | 7/2015 | Inoue et al. |
| 2015/0185313 A1 | 7/2015 | Zhu |
| 2015/0192676 A1 | 7/2015 | Kotelnikov et al. |
| 2015/0192677 A1 | 7/2015 | Yu et al. |
| 2015/0204978 A1 | 7/2015 | Hammes et al. |
| 2015/0214690 A1 | 7/2015 | Savage-Leuchs et al. |
| 2015/0301182 A1 | 10/2015 | Geiger et al. |
| 2015/0323654 A1 | 11/2015 | Jachmann et al. |
| 2015/0378023 A1 | 12/2015 | Royo Royo et al. |
| 2015/0378241 A1 | 12/2015 | Eldada |
| 2016/0025842 A1 | 1/2016 | Anderson et al. |
| 2016/0047896 A1 | 2/2016 | Dussan |
| 2016/0047901 A1 | 2/2016 | Pacala et al. |
| 2016/0047903 A1* | 2/2016 | Dussan .................. G01S 7/484 356/5.01 |
| 2016/0049765 A1 | 2/2016 | Eldada |
| 2016/0146939 A1 | 5/2016 | Shpunt et al. |
| 2016/0146940 A1 | 5/2016 | Koehler |
| 2016/0161600 A1 | 6/2016 | Eldada et al. |
| 2016/0245919 A1 | 8/2016 | Kalscheur et al. |
| 2017/0188355 A1 | 12/2017 | Wilton et al. |
| 2018/0032042 A1 | 2/2018 | Turpin et al. |

OTHER PUBLICATIONS

Non-Final Office Action dated Oct. 9, 2018 for U.S. Appl. No. 15/974,153.

* cited by examiner

LIDAR SYSTEM WITH A POLYGON MIRROR AND A NOISE-REDUCING FEATURE

CROSS-REFERENCE TO RELATED APPLICATIONS

This application claims priority to provisional U.S. Application Ser. No. 62/653,452, filed on Apr. 5, 2018, entitled "Multi-Beam Lidar System with Polygon Mirror," the entire disclosure of which is hereby expressly incorporated by referenced herein.

FIELD OF TECHNOLOGY

This disclosure relates generally to lidar systems and, more specifically, to a lidar system that uses multiple beams concurrently to scan a field of regard.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Light detection and ranging (lidar) is a technology that can be used to measure distances to remote targets. Typically, a lidar system includes a light source and an optical receiver. The light source can be, for example, a laser which emits light having a particular operating wavelength. The operating wavelength of a lidar system may lie, for example, in the infrared, visible, or ultraviolet portions of the electromagnetic spectrum. The light source emits light toward a target which then scatters the light. Some of the scattered light is received back at the receiver. The system determines the distance to the target based on one or more characteristics associated with the returned light. For example, the system may determine the distance to the target based on the time of flight of a returned light pulse.

While the precision and efficacy of lidar scanners have continually improved, the power requirements, heat dissipation, and physical dimensions of existing lidar scanners have posed obstacles to designers of lidar systems. Other design considerations include the rate at which a lidar system can scan a field of regard, as well as the density of data produced during a scan. With the increasing prevalence of the use of lidar systems in vehicles, such considerations are of increased concern to designers of lidar systems.

SUMMARY

A lidar system of this disclosure includes a light emitting light source (i.e., a laser) that produces two beams of light, a scanner configured to scan a field of regard concurrently with the two beams of light, and a receiver that detects light from the two beams scattered by one or more remote targets. The scanner includes a polygon mirror that rotates during operation, so that the output beams reflect off of different reflective surfaces of the polygon mirror. Each reflection from a reflective surface can produce one scan line of the scan pattern, in an example implementation.

The scanner can include planar mirrors (referred to below as "scan mirrors") that rotate about axes orthogonal to the axis of rotation of the polygon mirror. Respective galvanometer scanners or motors can impart oscillating motion to the planar mirrors. In operation, an output beam first reflects off the corresponding scan mirror and then reflects off the rotating polygon mirror. The polygon mirror thus can scan the output beams in one direction (e.g., horizontal), and the galvanometer scanners can scan each of the output beams along the orthogonal direction (e.g., vertical). Each scan mirror can correspond to an "eye" of the lidar system. Accordingly, when two scan mirrors are used, the lidar system operates in a two-eye configuration. If desired, the lidar system also can include only one scan mirror and operate in an one-eye, or single-eye, configuration.

The lidar system can generate one or two output beams per eye. When two output beams per eye used, the output beams can be angularly offset, vertically and/or horizontally, so that each ranging event yields two different pixels. In this case, each receiver can have two separate detectors (such as avalanche photodiodes (APDs), for example), one for each output beam.

The lidar system also can include stationary mirrors, or "folding mirrors," that "fold" the input and output beams at a certain angle to reduce the overall size of the lidar system by directing input and output beams. The stationary mirrors do not rotate or oscillate. In an example implementation, the lidar system includes stationary mirrors oriented at 45 degrees relative to incident input and output beams to provide a 90-degree fold to the beams. As a result, the light source and the lens of the receiver in one example implementation are oriented so that the axis along which the beams are transmitted or received at these components are parallel to the axis of the galvanometer scanner.

The polygon mirror may be in the form of a block having a first wall, a second wall spaced away from and parallel to the first wall, and multiple reflective surfaces extending between the first and second walls and angularly offset from one another along the polygon periphery of the block. The polygon mirror can have any suitable number of reflective sides, e.g., three, four, five, etc. In an example implementation, the polygon mirror has six reflective sides. The polygon mirror also can be provided with a motor to power its rotation that is disposed at least partially, but preferably substantially or entirely, within the block. By arranging the motor for the polygon mirror within the rotatable block of the polygon mirror, the overall three-dimensional footprint of the scanner can be further reduced.

Because the polygon block rotates at a high speed, it produces a significant amount of acoustic noise. To reduce the acoustic noise, the polygon block in some implementations includes chamfered edges or corners. In other implementations, the housing partially enclosing the polygon mirror, and/or the bracket adjacent to which the polygon mirror is mounted, includes tapered features on the interior surface. These tapered features effectively spread out pressure wave in time, thereby reducing the energy of the acoustic waves generated by the rotating polygon mirror.

The light source of the lidar system can be a single laser, where the output pulses from the laser are split between the eyes of the lidar system. For example, the light source can be a fiber laser that includes a seed laser diode followed by one or more optical amplifiers. In another implementation, the light source includes multiple direct-emitter laser diodes (e.g., high-power laser diodes) that directly emit the pulses without requiring optical amplification. Each eye of the lidar system in this implementation can include its own direct-emitted laser diode.

The lidar system also can include a controller to regulate, stabilize, or adjust the rotational speed of the polygon mirror as needed. When the lidar system includes motors to impart oscillation to the scan mirrors, the controller can similarly regulate, stabilize, or adjust the movement of the scan mirrors.

At least the scanner and the receiver may be disposed inside a housing of a lidar sensor unit (or "sensor head"), and the lidar system can include one or several lidar sensor units. The housing can include respective windows for each eye.

One example embodiment of these techniques is a lidar system comprising a light source configured to produce a beam of light, a scanner configured to scan a field of regard of the lidar system, and a receiver configured to detect light from the beam of light scattered by a remote target. The scanner includes a polygon mirror having a block with a first wall, a second wall, and several reflective surfaces angularly offset from one another along a periphery of the block, the polygon mirror configured to rotate about a scan-mirror rotation axis to scan the beam of light across the field of regard. The scanner further includes a bracket adjacent to the polygon mirror, where at least one of the polygon mirror or the bracket includes a noise-reducing feature configured to reduce acoustic noise produced when pressure waves generated by the polygon mirror during rotation are incident on one or more components of the scanner.

Another example embodiment of these techniques is a method for manufacturing a scanner for use in a lidar system. The method includes forming a polygon mirror having a block with a first wall, a second wall, and multiple reflective surfaces angularly offset from one another along a periphery of the block; forming a bracket including a cavity to partially enclose the polygon mirror, the cavity including a first edge and a second edge; mounting the polygon mirror on a polygon mirror axle, so that the bracket is adjacent to the polygon mirror, to configure the polygon mirror to scan a beam of light from a light source across a field of regard of the scanner; forming a noise-reducing feature on one of the polygon mirror or the bracket to reduce acoustic noise produced when pressure waves generated by the polygon mirror during rotation are incident on one or more components of the scanner and coupling a receiver to the scanner to detect light from the beam of light scattered by a remote target.

DETAILED DESCRIPTION

Figure 1:
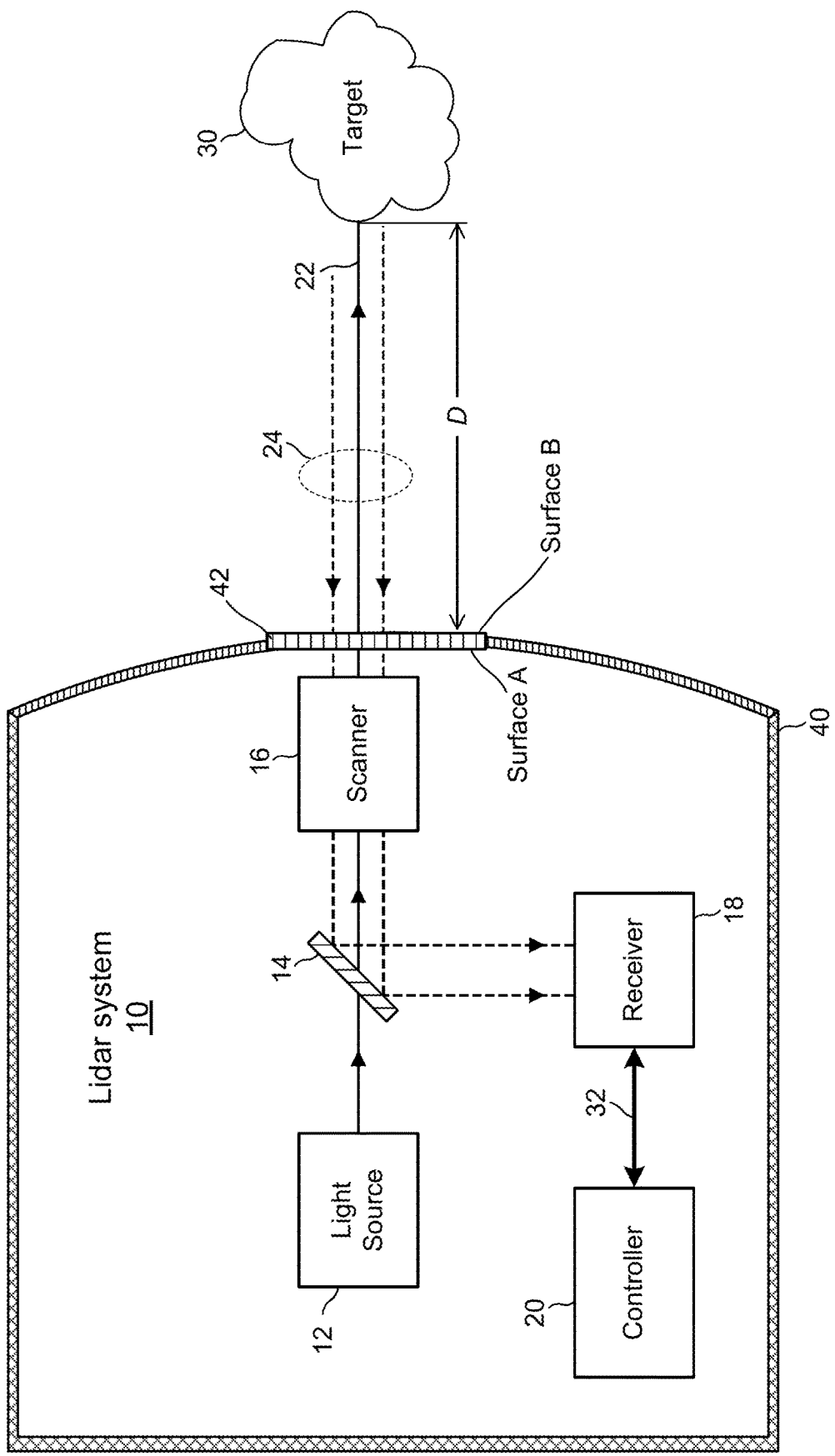
FIG. 1 is a block diagram of an example lidar system configured to scan a target.

Generally speaking, a lidar system of this disclosure can scan a field of regard (FOR) using multiple beams. The scanner of the lidar system directs the output beams outward using multiple reflective surfaces of a polygon mirror during each ranging event. Certain components of the lidar system allow the physical size of the lidar system to be reduced.
Overview of an Example Lidar System Configured to Scan a Remote Target FIG. 1 illustrates an example light detection and ranging (lidar) system 10. The lidar system 10 may be referred to as a laser ranging system, a laser radar system, a LIDAR system, a lidar sensor, or a laser detection and ranging (LADAR or ladar) system. The lidar system 10 may include a light source 12, a mirror 14 (which may be referred to as an overlap mirror, superposition mirror, or beam-combiner mirror), a scanner 16 (which may be referred to as a beam scanner, optical scanner, or laser scanner), a receiver 18, and a controller 20. In some implementations, the lidar system 10 also can include one or more sensors such as a temperature sensor, a moisture sensor, etc., none of which is shown in FIG. 1 to avoid clutter.

The light source 12 may be, for example, a laser which emits light having a particular operating wavelength in the infrared, visible, or ultraviolet portions of the electromagnetic spectrum. As a more specific example, the light source 12 may include a laser with an operating wavelength between approximately 0.9 μm and 1.7 μm.

In operation, the light source 12 emits an output beam of light 22 which may be continuous-wave, pulsed, or modulated in any suitable manner for a given application. The output beam of light 22 is directed downrange toward a remote target 30 located a distance D from the lidar system 10 and at least partially contained within a field of regard of the system 10. Depending on the scenario and/or the implementation of the lidar system 10, D can be between 1 m and 1 km, for example.

Once the output beam 22 reaches the downrange target 30, the target 30 may scatter or, in some cases, reflect at least a portion of light from the output beam 22, and some of the scattered or reflected light may return toward the lidar system 10. In the example of FIG. 1, the scattered or reflected light is represented by input beam 24, which passes through the scanner 16. The input beam 24 passes through the scanner 16 to the mirror 14. The mirror 14 in turn directs the input beam 24 to the receiver 18. The input beam 24 may contain only a relatively small fraction of the light from the output beam 22. For example, the ratio of average power, peak power, or pulse energy of the input beam 24 to average power, peak power, or pulse energy of the output beam 22 may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of the output beam 22 has a pulse energy of 1 microjoule (μJ), then the pulse energy of a corresponding pulse of the input beam 24 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, or 1 aJ.

The output beam 22 may be referred to as a laser beam, light beam, optical beam, emitted beam, or just beam; and the input beam 24 may be referred to as a return beam, received beam, return light, received light, input light, scattered light, or reflected light. As used herein, scattered light may refer to light that is scattered or reflected by the target 30. The input beam 24 may include light from the output beam 22 that is scattered by the target 30, light from the output beam 22 that is reflected by the target 30, or a combination of scattered and reflected light from target 30.

The operating wavelength of a lidar system 10 may lie, for example, in the infrared, visible, or ultraviolet portions of the electromagnetic spectrum. The Sun also produces light in these wavelength ranges, and thus sunlight can act as background noise which can obscure signal light detected by the lidar system 10. This solar background noise can result in false-positive detections or can otherwise corrupt measurements of the lidar system 10, especially when the receiver 18 includes SPAD detectors (which can be highly sensitive).

Generally speaking, the light from the Sun that passes through the Earth's atmosphere and reaches a terrestrial-based lidar system such as the system 10 can establish an optical background noise floor for this system. Thus, in order for a signal from the lidar system 10 to be detectable, the signal must rise above the background noise floor. It is generally possible to increase the signal-to-noise (SNR) ratio of the lidar system 10 by raising the power level of the output beam 22, but in some situations it may be desirable to keep the power level of the output beam 22 relatively low. For example, increasing transmit power levels of the output beam 22 can result in the lidar system 10 not being eye-safe.

In some implementations, the lidar system 10 operates at one or more wavelengths between approximately 1400 nm and approximately 1600 nm. For example, the light source 12 may produce light at approximately 1550 nm.

In some implementations, the lidar system 10 operates at wavelengths at which atmospheric absorption is relatively low. For example, the lidar system 10 can operate at wavelengths in the approximate ranges from 980 nm to 1110 nm or from 1165 nm to 1400 nm.

In other implementations, the lidar 10 operates at wavelengths at which atmospheric absorption is high. For example, the lidar system 10 can operate at wavelengths in the approximate ranges from 930 nm to 980 nm, from 1100 nm to 1165 nm, or from 1400 nm to 1460 nm.

According to some implementations, the lidar system 10 can include an eye-safe laser, or the lidar system 10 can be classified as an eye-safe laser system or laser product. An eye-safe laser, laser system, or laser product may refer to a system with an emission wavelength, average power, peak power, peak intensity, pulse energy, beam size, beam divergence, exposure time, or scanned output beam such that emitted light from the system presents little or no possibility of causing damage to a person's eyes. For example, the light source 12 or lidar system 10 may be classified as a Class 1 laser product (as specified by the 60825-1 standard of the International Electrotechnical Commission (IEC)) or a Class I laser product (as specified by Title 21, Section 1040.10 of the United States Code of Federal Regulations (CFR)) that is safe under all conditions of normal use. In some implementations, the lidar system 10 may be classified as an eye-safe laser product (e.g., with a Class 1 or Class I classification) configured to operate at any suitable wavelength between approximately 1400 nm and approximately 2100 nm. In some implementations, the light source 12 may include a laser with an operating wavelength between approximately 1400 nm and approximately 1600 nm, and the lidar system 10 may be operated in an eye-safe manner. In some implementations, the light source 12 or the lidar system 10 may be an eye-safe laser product that includes a scanned laser with an operating wavelength between approximately 1530 nm and approximately 1560 nm. In some implementations, the lidar system 10 may be a Class 1 or Class I laser product that includes a fiber laser or solid-state laser with an operating wavelength between approximately 1400 nm and approximately 1600 nm.

The light source 12 may include a pulsed laser configured to produce or emit pulses of light with a certain pulse duration. In an example implementation, the pulse duration or pulse width of the pulsed laser is approximately 10 picoseconds (ps) to 100 nanoseconds (ns). In another implementation, the light source 12 is a pulsed laser that produces pulses with a pulse duration of approximately 1-4 ns. In yet another implementation, the light source 12 is a pulsed laser that produces pulses at a pulse repetition frequency of less 10 MHz. In yet another implementation, the light source 12 is a pulsed laser that produces pulses at a pulse repetition frequency of approximately 100 kHz to 5 MHz or a pulse period (e.g., a time between consecutive pulses) of approximately 200 ns to 10 µs. The light source 12 may have a substantially constant or a variable pulse repetition frequency, depending on the implementation. As an example, the light source 12 may be a pulsed laser that produces pulses at a substantially constant pulse repetition frequency of approximately 640 kHz (e.g., 640,000 pulses per second), corresponding to a pulse period of approximately 1.56 µs. As another example, the light source 110 may have a pulse repetition frequency that can be varied from approximately 500 kHz to 3 MHz. As used herein, a pulse of light may be referred to as an optical pulse, a light pulse, or a pulse, and a pulse repetition frequency may be referred to as a pulse rate. In some implementations, the light source 12 is a pulsed laser that produces pulses the duty cycle of less than 5%.

In general, the lidar source 12 can generate the output beam 22 with any suitable average optical power, and the output beam 22 may include optical pulses with any suitable pulse energy or peak optical power. Some examples of the average power of the output beam 22 include the approximate values of 1 mW, 10 mW, 100 mW, 1 W, and 10 W. Example values of pulse energy of the output beam 22 include the approximate values of 0.1 µJ, 1 µJ, 10 µJ, 100 µJ, and 1 mJ. Examples of peak power values of pulses included in the output beam 22 are the approximate values of 10 W, 100 W, 1 kW, 5 kW, 10 kW. An example optical pulse with a duration of 1 ns and a pulse energy of 1 µJ has a peak power of approximately 1 kW. If the pulse repetition frequency is 500 kHz, then the average power of the output beam 22 with 1-µJ pulses is approximately 0.5 W, in this example.

The light source 12 may include a laser diode, such as a Fabry-Perot laser diode, a quantum well laser, a distributed Bragg reflector (DBR) laser, a distributed feedback (DFB) laser, or a vertical-cavity surface-emitting laser (VCSEL). The laser diode operating in the light source 12 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable diode. In some implementations, the light source 12 includes a pulsed laser diode with a peak emission wavelength of approximately 1400-1600 nm. Further, the light source 12 may include a laser diode that is current-modulated to produce optical pulses.

In some implementations, the light source 12 includes a pulsed laser diode followed by one or more optical-amplification stages. For example, the light source 12 may be a fiber-laser module that includes a current-modulated laser diode with a peak wavelength of approximately 1550 nm, followed by a single-stage or a multi-stage erbium-doped fiber amplifier (EDFA). As another example, the light source 12 may include a continuous-wave (CW) or quasi-CW laser diode followed by an external optical modulator (e.g., an electro-optic modulator), and the output of the modulator may be fed into an optical amplifier. In other implementations, the light source 12 may include a laser diode which produces optical pulses that are not amplified by an optical amplifier. As an example, a laser diode (which may be referred to as a direct emitter or a direct-emitter laser diode) may emit optical pulses that form an output beam 22 that is directed downrange from a lidar system 10. In yet other implementations, the light source 12 may include a pulsed solid-state laser or a pulsed fiber laser.

In some implementations, the output beam of light 22 emitted by the light source 12 is a collimated optical beam with any suitable beam divergence, such as a divergence of approximately 0.1 to 3.0 milliradian (mrad). Divergence of the output beam 22 may refer to an angular measure of an increase in beam size (e.g., a beam radius or beam diameter) as the output beam 22 travels away from the light source 12 or the lidar system 10. The output beam 22 may have a substantially circular cross section with a beam divergence characterized by a single divergence value. For example, the output beam 22 with a circular cross section and a divergence of 1 mrad may have a beam diameter or spot size of approximately 10 cm at a distance of 100 m from the lidar system 10. In some implementations, the output beam 22 may be an astigmatic beam or may have a substantially elliptical cross section and may be characterized by two divergence values. As an example, the output beam 22 may have a fast axis and a slow axis, where the fast-axis divergence is greater than the slow-axis divergence. As another example, the output beam 22 may be an astigmatic beam with a fast-axis divergence of 2 mrad and a slow-axis divergence of 0.5 mrad.

The output beam of light 22 emitted by light source 12 may be unpolarized or randomly polarized, may have no specific or fixed polarization (e.g., the polarization may vary with time), or may have a particular polarization (e.g., the output beam 22 may be linearly polarized, elliptically polarized, or circularly polarized). As an example, the light source 12 may produce linearly polarized light, and the lidar system 10 may include a quarter-wave plate that converts this linearly polarized light into circularly polarized light. The lidar system 10 may transmit the circularly polarized light as the output beam 22, and receive the input beam 24, which may be substantially or at least partially circularly polarized in the same manner as the output beam 22 (e.g., if the output beam 22 is right-hand circularly polarized, then the input beam 24 may also be right-hand circularly polarized). The input beam 24 may pass through the same quarter-wave plate (or a different quarter-wave plate), resulting in the input beam 24 being converted to linearly polarized light which is orthogonally polarized (e.g., polarized at a right angle) with respect to the linearly polarized light produced by light source 12. As another example, the lidar system 10 may employ polarization-diversity detection where two polarization components are detected separately. The output beam 22 may be linearly polarized, and the lidar system 10 may split the input beam 24 into two polarization components (e.g., s-polarization and p-polarization) which are detected separately by two photodiodes (e.g., a balanced photoreceiver that includes two photodiodes).

The output beam 22 and input beam 24 may be substantially coaxial. In other words, the output beam 22 and input beam 24 may at least partially overlap or share a common propagation axis, so that the input beam 24 and the output beam 22 travel along substantially the same optical path (albeit in opposite directions). As the lidar system 100 scans the output beam 22 across a field of regard, the input beam 24 may follow along with the output beam 22, so that the coaxial relationship between the two beams is maintained.

The lidar system 10 also may include one or more optical components configured to condition, shape, filter, modify, steer, or direct the output beam 22 and/or the input beam 24. For example, lidar system 10 may include one or more lenses, mirrors, filters (e.g., bandpass or interference filters), beam splitters, polarizers, polarizing beam splitters, wave plates (e.g., half-wave or quarter-wave plates), diffractive elements, or holographic elements. In some implementations, lidar system 10 includes a telescope, one or more lenses, or one or more mirrors to expand, focus, or collimate the output beam 22 to a desired beam diameter or divergence. As an example, the lidar system 10 may include one or more lenses to focus the input beam 24 onto an active region of the receiver 18. As another example, the lidar system 10 may include one or more flat mirrors or curved mirrors (e.g., concave, convex, or parabolic mirrors) to steer or focus the output beam 22 or the input beam 24. For example, the lidar system 10 may include an off-axis parabolic mirror to focus the input beam 24 onto an active region of receiver 18.

With continued reference to FIG. 1, the mirror 14 which may be a metallic or dielectric mirror. The mirror 14 may be configured so that the output beam 22 passes through the mirror 14. As an example, the mirror 14 may include a hole, slot, or aperture through which the output light beam 22 passes. As another example, the mirror 14 may be configured so that at least 80% of the output beam 22 passes through the mirror 14 and at least 80% of the input beam 24 is reflected by the mirror 14. In some implementations, the mirror 14 may provide for the output beam 22 and the input beam 24 to be substantially coaxial, so that the beams 22 and 24 travel along substantially the same optical path, in opposite directions.

Generally speaking, the scanner 16 steers the output beam 22 in one or more directions downrange. The scanner 16 may include one or more scanning mirrors and one or more actuators driving the mirrors to rotate, tilt, pivot, or move the mirrors in an angular manner about one or more axes, for example. For example, the first mirror of the scanner may scan the output beam 22 along a first direction, and the second mirror may scan the output beam 22 along a second direction that is substantially orthogonal to the first direction. The scanner 16 may be implemented as discussed below with reference to FIGS. 2-19 and include rotating and/or oscillating mirrors to scan the FOR of the lidar system 10 along a horizontal and vertical dimensions.

The scanner 16 may be configured to scan the output beam 22 over a 5-degree angular range, 20-degree angular range, 30-degree angular range, 60-degree angular range, or any other suitable angular range. For example, a scanning mirror may be configured to periodically rotate over a 15-degree range, which results in the output beam 22 scanning across a 30-degree range (e.g., a Θ-degree rotation by a scanning mirror results in a 2Θ-degree angular scan of the output beam 22). The FOR the lidar system 10 may refer to an area, region, or angular range over which the lidar system 10 may be configured to scan or capture distance information. When the lidar system 10 scans the output beam 22 within a 30-degree scanning range, the lidar system 10 may be referred to as having a 30-degree angular field of regard. As another example, a lidar system 10 with a scanning mirror that rotates over a 30-degree range may produce the output beam 22 that scans across a 60-degree range (e.g., a 60-degree FOR). In various implementations, the lidar system 10 may have a FOR of approximately 10°, 20°, 40°, 60°, 120°, or any other suitable FOR. The FOR also may be referred to as a scan region.

The scanner 16 may be configured to scan the output beam 11 horizontally and vertically, and the lidar system 100 may have a particular FOR along the horizontal direction and another particular FOR along the vertical direction. For example, the lidar system 10 may have a horizontal FOR of 10° to 120° and a vertical FOR of 2° to 45°.

The one or more scanning mirrors of the scanner 16 may be communicatively coupled to the controller 20 which may control the scanning mirror(s) so as to guide the output beam 22 in a desired direction downrange or along a desired scan pattern. In general, a scan pattern may refer to a pattern or path along which the output beam 22 is directed, and also may be referred to as an optical scan pattern, optical scan path, or scan path. As an example, the scanner 16 may include two scanning mirrors configured to scan the output beam 22 across a 60° horizontal FOR and a 20° vertical FOR. The two scanner mirrors may be controlled to follow a scan path that substantially covers the 60°×20° FOR. The lidar system 10 can use the scan path to generate a point cloud with pixels that substantially cover the 60°×20° FOR. The pixels may be approximately evenly distributed across the 60°×20° FOR. Alternately, the pixels may have a particular non-uniform distribution (e.g., the pixels may be distributed across all or a portion of the 60°×20° FOR, and the pixels may have a higher density in one or more particular regions of the 60°×20° FOR).

In operation, the light source 12 may emit pulses of light which the scanner 16 scans across a FOR of lidar system 10. The target 130 may scatter one or more of the emitted pulses. The receiver 18 may receive or detect photons from the input beam 24 and generate one or more representative signals. For example, the receiver 18 may generate an output electrical signal 32 that is representative of the input beam 24. The receiver may send the electrical signal 32 to the controller 20.

The receiver 18 may be referred to as (or may include) a photoreceiver, optical receiver, optical sensor, detector, photodetector, or optical detector. The receiver 18 in some implementations receives or detects at least a portion of the input beam 24 and produces an electrical signal that corresponds to the input beam 24. For example, if the input beam 24 includes an optical pulse, then the receiver 18 may produce an electrical current or voltage pulse that corresponds to the optical pulse detected by the receiver 18. In an example implementation, the receiver 18 includes one or more avalanche photodiodes (APDs) or one or more single-photon avalanche diodes (SPADs). In another implementation, the receiver 18 includes one or more PN photodiodes (e.g., a photodiode structure formed by a p-type semiconductor and a n-type semiconductor) or one or more PIN photodiodes (e.g., a photodiode structure formed by an undoped intrinsic semiconductor region located between p-type and n-type regions).

The receiver 18 may have an active region or an avalanche-multiplication region that includes silicon, germanium, or InGaAs. The active region of receiver 18 may have any suitable size, such as for example, a diameter or width of approximately 50-500 μm. The receiver 18 may include circuitry that performs signal amplification, sampling, filtering, signal conditioning, analog-to-digital conversion, time-to-digital conversion, pulse detection, threshold detection, rising-edge detection, or falling-edge detection. For example, the receiver 18 may include a transimpedance amplifier that converts a received photocurrent (e.g., a current produced by an APD in response to a received optical signal) into a voltage signal. The receiver 18 may direct the voltage signal to pulse-detection circuitry that produces an analog or digital output signal 32 that corresponds to one or more characteristics (e.g., rising edge, falling edge, amplitude, or duration) of a received optical pulse. For example, the pulse-detection circuitry may perform a time-to-digital conversion to produce a digital output signal 32. The receiver 18 may send the electrical output signal 18 to the controller 20 for processing or analysis, e.g., to determine a time-of-flight value corresponding to a received optical pulse.

Depending on the implementation, the controller 20 may include one or more processors, an application-specific integrated circuit (ASIC), a field-programmable gate array (FPGA), and/or other suitable circuitry. The controller 20 also may include non-transitory computer-readable memory to store instructions executable by the controller 20 as well as data which the controller 20 can produce based on the signals from the components of the lidar system 10 and/or provide to these components. The memory can include volatile (e.g., RAM) and/or non-volatile (e.g., flash memory, a hard disk) components. The data the controller 20 generates during operation and stores in the memory can include pixel data and other results of analyzing characteristics of the target 30, alarm data (e.g., readings from the sensors that exceed certain predefined thresholds), and the configuration data the controller 30 can retrieve from the memory during operation can include definitions of various scan patterns, for example. Alternatively or additionally to its local memory, the controller 130 can be configured to access memory disposed remotely relative to the lidar system 10 in a vehicle controller (see below) or even memory disposed remotely relative to the vehicle, such as on a network server. In addition to collecting data from receiver 18, the controller 20 can provide control signals to and, in some implementations, receive diagnostics data from, the light source 12 and the scanner 16.

The controller 20 may be electrically coupled or otherwise communicatively coupled to one or more of the light source 12, the scanner 16, and the receiver 18. The controller 20 may receive electrical trigger pulses or edges from the light source 12, where each pulse or edge corresponds to the emission of an optical pulse by the light source 12. The controller 20 may provide instructions, a control signal, or a trigger signal to the light source 12 indicating when the light source 12 should produce optical pulses. For example, the controller 20 may send an electrical trigger signal that includes electrical pulses, where the light source 12 emits an optical pulse in response to each electrical pulse. Further, the controller 20 may cause the light source 12 to adjust one or more of the frequency, period, duration, pulse energy, peak power, average power, or wavelength of the optical pulses produced by light source 12.

The controller 20 may determine a time-of-flight value for an optical pulse based on timing information associated with when the pulse was emitted by light source 12 and when a portion of the pulse (e.g., the input beam 24) was detected or received by the receiver 18. The controller 20 may include circuitry that performs signal amplification, sampling, filtering, signal conditioning, analog-to-digital conversion, time-to-digital conversion, pulse detection, threshold detection, rising-edge detection, or falling-edge detection.

In particular, the controller 20 can be configured to analyze one or more characteristics of the electrical signal 32 to determine one or more characteristics of the target 30, such as its distance downrange from the lidar system 10. More particularly, the controller 20 may analyze the time of flight or phase modulation for the beam of light 22 transmitted by the light source 12. If the lidar system 10 measures a time of flight of T (e.g., T represents a round-trip time of flight for an emitted pulse of light to travel from the lidar system 10 to the target 30 and back to the lidar system 10), then the distance D from the target 30 to the lidar system 10 may be expressed as D=c·T/2, where c is the speed of light (approximately $3.0 \times 10^8$ m/s).

As a more specific example, if the lidar system 100 measures the time of flight to be T=300 ns, then the lidar system 100 can determine the distance from the target 130 to the lidar system 100 to be approximately D=45.0 m. As another example, the lidar system 100 measures the time of flight to be T=1.33 μs and accordingly determines that the distance from the target 130 to the lidar system 100 is approximately D=199.5 m. The distance D from lidar system 100 to the target 130 may be referred to as a distance, depth, or range of the target 130. As used herein, the speed of light c refers to the speed of light in any suitable medium, such as for example in air, water, or vacuum. The speed of light in vacuum is approximately $2.9979 \times 10^8$ m/s, and the speed of light in air (which has a refractive index of approximately 1.0003) is approximately $2.9970 \times 10^8$ m/s.

The target 30 may be located a distance D from the lidar system 10 that is less than or equal to a maximum range $R_{MAX}$ of the lidar system 10. The maximum range $R_{MAX}$ (which also may be referred to as a maximum distance) of the lidar system 10 may correspond to the maximum distance over which the lidar system 10 is configured to sense or identify targets that appear in a field of regard of the lidar system 10. The maximum range of lidar system 10 may be any suitable distance, such as for example, 25 m, 50 m, 100 m, 200 m, 500 m, or 1 km. As a specific example, a lidar system with a 200-m maximum range may be configured to sense or identify various targets located up to 200 m away. For a lidar system with a 200-m maximum range ($R_{MAX}$=200 m), the time of flight corresponding to the maximum range is approximately $2 \cdot R_{MAX}/c \cong 1.33$ μs.

In some implementations, the light source 12, the scanner 16, and the receiver 18 are packaged together within a single housing 40, which may be a box, case, or enclosure that holds or contains all or part of a lidar system 10. The housing 40 includes a window through which the beams 22 and 24 pass. In one example implementation, the lidar-system housing 40 contains the light source 12, the overlap mirror 14, the scanner 16, and the receiver 18 of the lidar system 10. The controller 20 may reside within the same housing 40 or remotely from the housing. Example implementations of the housing 40 are discussed in more detail below with reference to FIG. 18.

The housing 40 may be an airtight or watertight structure that prevents water vapor, liquid water, dirt, dust, or other contaminants from getting inside the housing 40. The housing 40 may be filled with a dry or inert gas, such as for example dry air, nitrogen, or argon. The housing 40 may include one or more electrical connections for conveying electrical power or electrical signals to and/or from the housing. The housing 40 includes openings for one or more windows, which may have the properties discussed below with reference to FIG. 5.

The housing 40 may include a window 42 made from any suitable substrate material, such as for example, glass or plastic (e.g., polycarbonate, acrylic, cyclic-olefin polymer, or cyclic-olefin copolymer). The window 42 may include an interior surface (surface A) and an exterior surface (surface B), and surface A or surface B may include a dielectric coating having particular reflectivity values at particular wavelengths. A dielectric coating (which may be referred to as a thin-film coating, interference coating, or coating) may include one or more thin-film layers of dielectric materials (e.g., $SiO_2$, $TiO_2$, $Al_2O_3$, $Ta_2O_5$, $MgF_2$, $LaF_3$, or $AlF_3$) having particular thicknesses (e.g., thickness less than 1 μm) and particular refractive indices. A dielectric coating may be deposited onto surface A or surface B of the window 42 using any suitable deposition technique, such as for example, sputtering or electron-beam deposition.

The dielectric coating may have a high reflectivity at a particular wavelength or a low reflectivity at a particular wavelength. A high-reflectivity (HR) dielectric coating may have any suitable reflectivity value (e.g., a reflectivity greater than or equal to 80%, 90%, 95%, or 99%) at any suitable wavelength or combination of wavelengths. A low-reflectivity dielectric coating (which may be referred to as an anti-reflection (AR) coating) may have any suitable reflectivity value (e.g., a reflectivity less than or equal to 5%, 2%, 1%, 0.5%, or 0.2%) at any suitable wavelength or combination of wavelengths. In particular embodiments, a dielectric coating may be a dichroic coating with a particular combination of high or low reflectivity values at particular wavelengths. For example, a dichroic coating may have a reflectivity of less than or equal to 0.5% at approximately 1550-1560 nm and a reflectivity of greater than or equal to 90% at approximately 800-1500 nm.

In some implementations, surface A or surface B has a dielectric coating that is anti-reflecting at an operating wavelength of one or more light sources 12 contained within the housing 40. An AR coating on surface A and surface B may increase the amount of light at an operating wavelength of light source 12 that is transmitted through the window 42. Additionally, an AR coating at an operating wavelength of the light source 110 may reduce the amount of incident light from output beam 22 that is reflected by the window 42 back into the housing 40. In an example implementation, each of surface A and surface B has an AR coating with reflectivity less than 0.5% at an operating wavelength of light source 12. As an example, if the light source 12 has an operating wavelength of approximately 1550 nm, then surface A and surface B may each have an AR coating with a reflectivity that is less than 0.5% from approximately 1547 nm to approximately 1553 nm. In another implementation, each of surface A and surface B has an AR coating with reflectivity less than 1% at the operating wavelengths of the light source 12. For example, if the housing 40 encloses two sensor heads with respective light sources, the first light source emits pulses at a wavelength of approximately 1535 nm and the second light source emits pulses at a wavelength of approximately 1540 nm, then surface A and surface B may each have an AR coating with reflectivity less than 1% from approximately 1530 nm to approximately 1545 nm.

The window 42 may have an optical transmission that is greater than any suitable value for one or more wavelengths of one or more light sources 12 contained within the housing 40. As an example, the window 42 may have an optical transmission of greater than or equal to 70%, 80%, 90%, 95%, or 99% at a wavelength of light source 12. In one example implementation, the window 42 can transmit greater than or equal to 95% of light at an operating wavelength of the light source 12. In another implementation, the window 42 transmits greater than or equal to 90% of light at the operating wavelengths of the light sources enclosed within the housing 40.

Surface A or surface B may have a dichroic coating that is anti-reflecting at one or more operating wavelengths of one or more light sources 12 and high-reflecting at wavelengths away from the one or more operating wavelengths. For example, surface A may have an AR coating for an operating wavelength of the light source 12, and surface B may have a dichroic coating that is AR at the light-source operating wavelength and HR for wavelengths away from the operating wavelength. A coating that is HR for wavelengths away from a light-source operating wavelength may prevent most incoming light at unwanted wavelengths from being transmitted through the window 42. In one implementation, if light source 12 emits optical pulses with a wavelength of approximately 1550 nm, then surface A may have an AR coating with a reflectivity of less than or equal to 0.5% from approximately 1546 nm to approximately 1554 nm. Additionally, surface B may have a dichroic coating that is AR at approximately 1546-1554 nm and HR (e.g., reflectivity of greater than or equal to 90%) at approximately 800-1500 nm and approximately 1580-1700 nm.

Surface B of the window 42 may include a coating that is oleophobic, hydrophobic, or hydrophilic. A coating that is oleophobic (or, lipophobic) may repel oils (e.g., fingerprint oil or other non-polar material) from the exterior surface (surface B) of the window 42. A coating that is hydrophobic may repel water from the exterior surface. For example, surface B may be coated with a material that is both oleophobic and hydrophobic. A coating that is hydrophilic attracts water so that water may tend to wet and form a film on the hydrophilic surface (rather than forming beads of water as may occur on a hydrophobic surface). If surface B has a hydrophilic coating, then water (e.g., from rain) that lands on surface B may form a film on the surface. The surface film of water may result in less distortion, deflection, or occlusion of an output beam 22 than a surface with a non-hydrophilic coating or a hydrophobic coating.

Moreover, in some implementations, the housing 40 includes multiple lidar sensors, each including a respective scanner and a receiver. Depending on the particular implementation, each of the multiple sensors can include a separate light source or a common light source. The multiple sensors can be configured to cover non-overlapping adjacent fields of regard or partially overlapping fields of regard, depending on the implementation.

Thus, as discussed above, the lidar system 10 may be used to determine the distance to one or more downrange targets 30. By scanning the output beam 22 across a field of regard, the lidar system 10 can be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. For example, a depth map may cover a field of regard that extends 60° horizontally and 15° vertically, and the depth map may include a frame of 100-2000 pixels in the horizontal direction by 4-400 pixels in the vertical direction.

The lidar system 10 may be configured to repeatedly capture or generate point clouds of a field of regard at any suitable frame rate between approximately 0.1 frames per second (FPS) and approximately 1,000 FPS. For example, the lidar system 10 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. In an example implementation, the lidar system 10 is configured to produce optical pulses at a rate of $5 \times 10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). The point-cloud frame rate may be substantially fixed or dynamically adjustable, depending on the implementation. For example, the lidar system 10 may capture one or more point clouds at a particular frame rate (e.g., 1 Hz) and then switch to capture one or more point clouds at a different frame rate (e.g., 10 Hz). In general, the lidar system 10 can use a slower frame rate (e.g., 1 Hz) to capture one or more high-resolution point clouds, and use a faster frame rate (e.g., 10 Hz) to rapidly capture multiple lower-resolution point clouds.

The field of regard of the lidar system 10 can overlap, encompass, or enclose at least a portion of the target 30, which may include all or part of an object that is moving or stationary relative to lidar system 10. For example, the target 30 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Example Lidar Systems with Scanners in One-Eye and Two-Eyes Configurations

Figure 2:
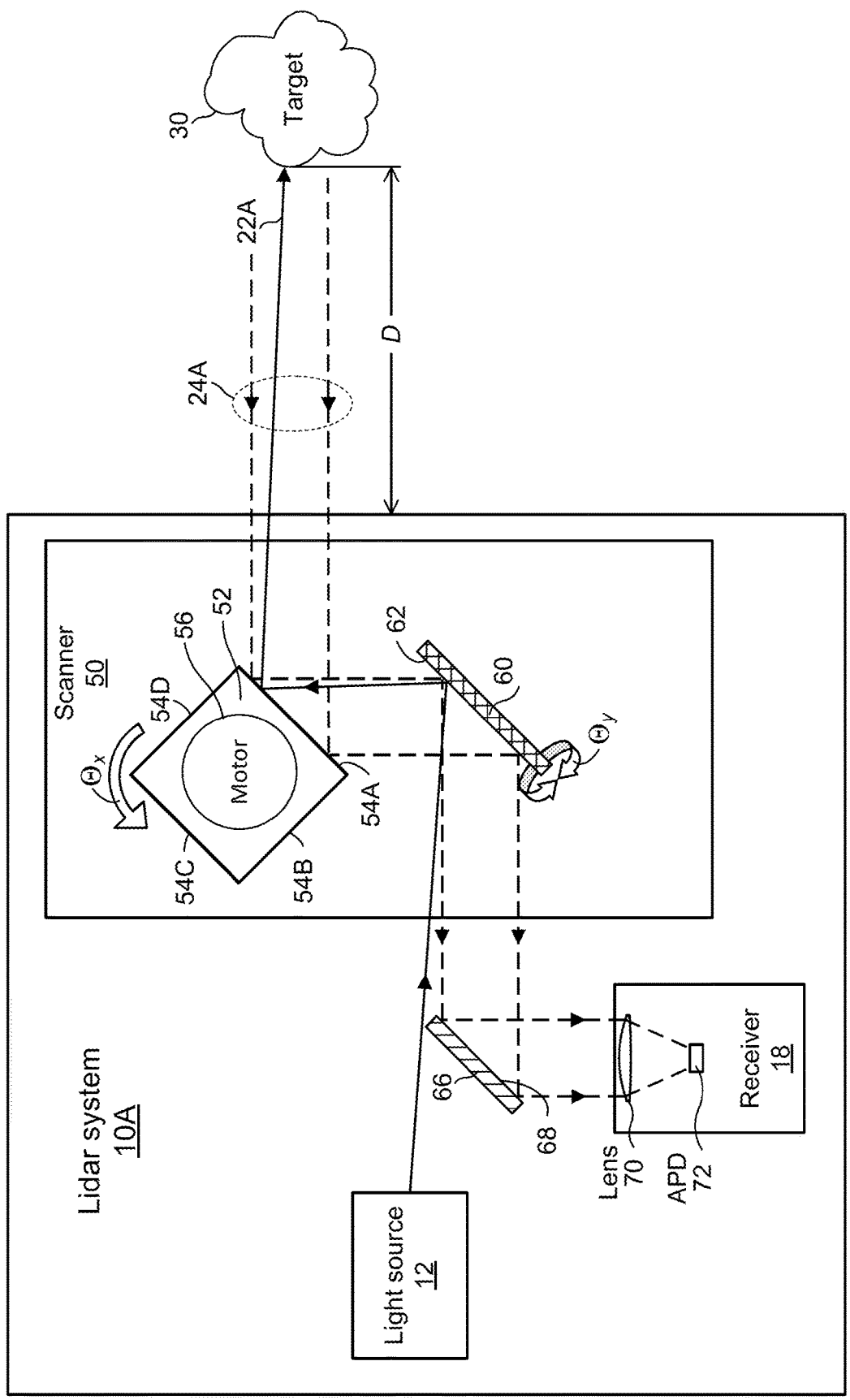
FIG. 2 is a block diagram of an example lidar system in which a scanner equipped with a polygon mirror is configured to operate in an one-eye configuration.

Referring first to FIG. 2, a lidar system 10A is generally similar to the lidar system 10 of FIG. 1. However, the lidar system 10A includes a scanner 50 that includes a polygon mirror 52 along with a scan mirror 60 and operates in a one-eye configuration.

The polygon mirror 52 may be in the form of a rotatable block with multiple reflective surfaces angularly offset from one another along the polygon periphery of the rotatable block. In this example implementation, the polygon mirror 52 has four reflective surfaces 54A, 54B, 54C, and 54D.

The polygon mirror 52 may be provided with one or more tabs (see FIG. 7) that pass through a stationary photo-interrupter as the polygon mirror rotates. The photo-interrupter provides feedback data indicative of the rotational speed of the polygon mirror, which feedback data can then be processed by a controller associated with the motor of the polygon mirror to regulate, stabilize, or adjust the rotational speed of the polygon mirror as needed.

A motor 56 imparts rotation to the rotatable polygon mirror 52. The scan mirror 60 rotates, in an oscillatory manner within a certain angular range, about an axis orthogonal to an axis of rotation of the polygon mirror. The scan mirror 60 can be considered a pivotable oscillating planar mirror.

Further, the lidar system 10A includes an aperture-free overlap mirror 66 to implement an off-axis illumination technique. More specifically, unlike the overlap mirror 14 of FIG. 1, the overlap mirror 60 need not include an aperture because the light source 12 in this implementation directs an outbound beam 22A toward the scanner 50 along a path adjacent to the overlap mirror 66. A reflective surface 62 of the scan mirror 60 reflects the output beam 22A toward one of the reflective surfaces 54A-D of the polygon mirror 52. In this implementation, the polygon mirror 52 directs the output beam 22A toward the target 30 at a horizontal angle defined by the current rotational position of the polygon mirror 52, and a vertical angle defined by the current rotational position of the scan mirror 60. In another implementation, the rotational position of the polygon mirror 52 defines the vertical angle, and the rotational position of the scan mirror 60 defines the horizontal angle.

The outbound beam 22A and an input beam 24A thus are not entirely coaxial. As illustrated in FIG. 2 in an exaggerated manner, the beams 22A and 24A have a small spatial offset or, in some implementations, a small angular offset. This configuration allows return pulses from nearby targets to arrive at the mirror 66 along an axis that is not parallel to the output beam 22A, while return pulses from far-away targets arrive at the mirror 66 along an axis that is substantially parallel to the output beam 22A.

The input beam 24A may pass through the lens 70 which focuses the beam onto an active region 72 of the receiver 18. The active region 72 may refer to an area over which receiver 18 may receive or detect input light. The active region 18 may have any suitable size or diameter d, such as for example, a diameter of approximately 25 µm, 50 µm, 80 µm, 100 µm, 200 µm, 500 µm, 1 mm, 2 mm, or 5 mm. The overlap mirror 66 may have a reflecting surface 68 that is substantially flat or the reflecting surface 68 may be curved (e.g., the mirror 66 may be an off-axis parabolic mirror configured to focus the input beam 22A onto an active region of the receiver 18).

Figure 3:
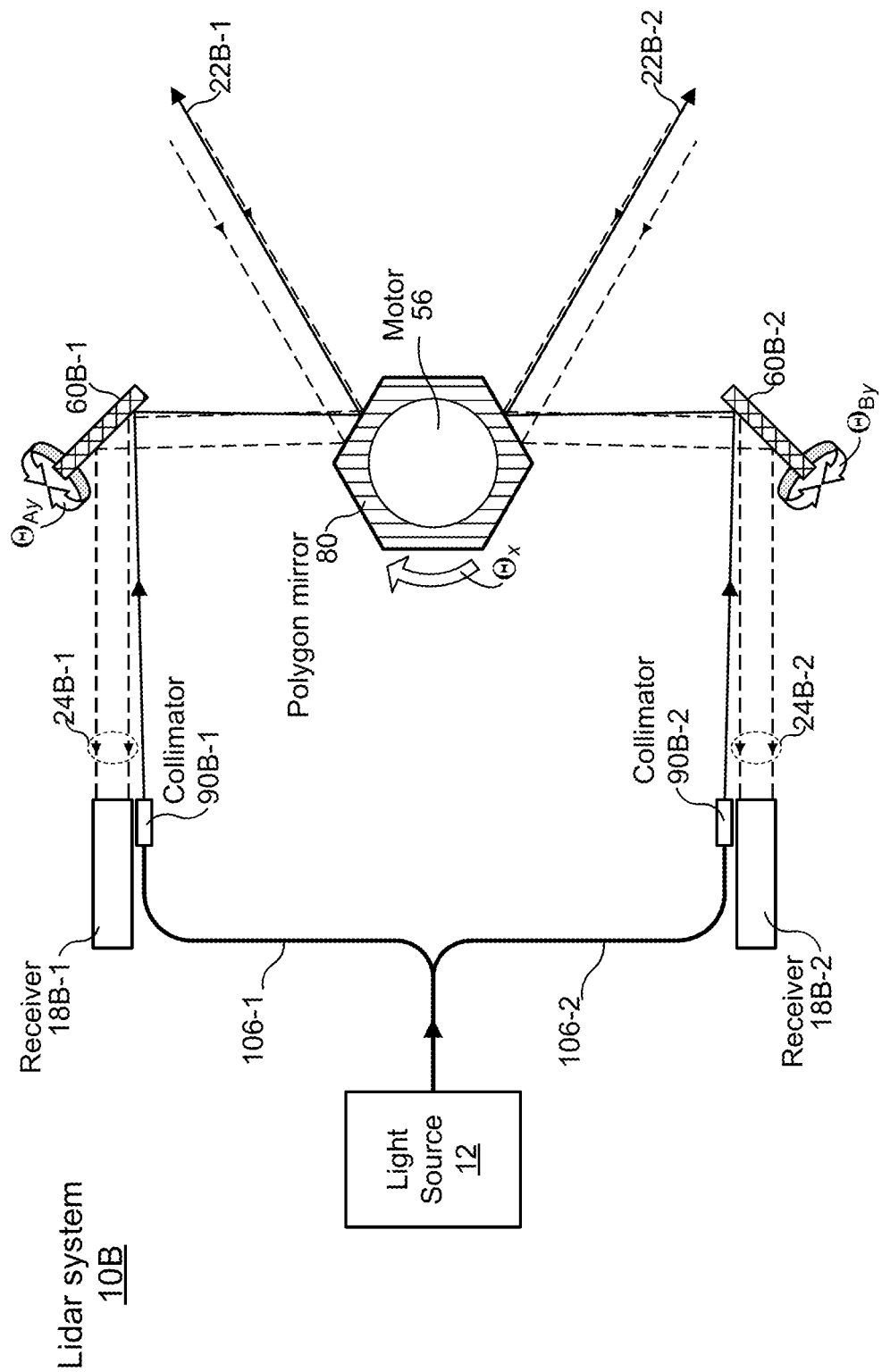
FIG. 3 is a block diagram of an example lidar system in which a scanner equipped with a polygon mirror is configured to operate in a two-eye configuration.

FIG. 3 illustrates another example implementation of a lidar system. Unlike the lidar system 10A discussed above, the lidar system 10B operates in a two-eye configuration. In particular, the lidar system 10B includes a polygon mirror 80 that directs two output beams, 22B-1 and 22B-2, toward different regions within the field of regard of the lidar system 10B. The field of regard of the lidar system 10B in a sense is made of respective fields of regard of the two eyes, corresponding to the output beams 22B-1 and 22B-2.

Each of the two eyes of the lidar system 10B includes a collimator, a receiver, and a scan mirror. Thus, one eye of the lidar system 10B includes a collimator 90B-1 coupled to the light source 12 to direct the output beam 22B-1 toward a scan mirror 60B-1, which then directs the output beam 22B-1 toward a first surface of the polygon mirror 80, while the other eye of the lidar system 10B includes a collimator 90B-2 coupled to the light source 12 to direct the output beam 22B-1 toward a scan mirror 60B-2, which then directs the output beam 22B-2 toward a second surface of the polygon mirror 80.

In this example implementation, the polygon mirror 80 includes six reflective surfaces, and the output beams 22B-1 and 22B-2 are incident on non-adjacent reflective surfaces. More generally, the polygon mirror 80 can include any suitable number of surfaces, e.g., three, four, five, six, etc.

An input beam 22B-1 is reflected off the first surface of the polygon mirror 80 toward the scan mirror 60B-1 and, ultimately, toward a receiver 18B-1. An input beam 22B-2 is reflected off the second surface of the polygon mirror 80 toward the scan mirror 60B-2 and toward a receiver 18B-2. Each of the receivers 18B-1 and 18B-2 can be implemented similar to the receiver 18 discussed with reference to FIG. 2.

The light source 12 can be a fiber laser that includes a seed laser diode. The output of the light source 12 can be provided to the collimators 90B-1 and 90B-2 via fiber-optic cables 106-1 and 106-2, free-space coupling, or in any other suitable manner. While the lidar system 10B uses collimators coupled to a shared light source, in other implementations of this system each eye can include its own direct-emitted laser diode. The light source 12 in this case can be made of multiple direct-emitter laser diodes (e.g., high-power laser diodes) that directly emit the pulses without requiring optical amplification.

Figure 4:
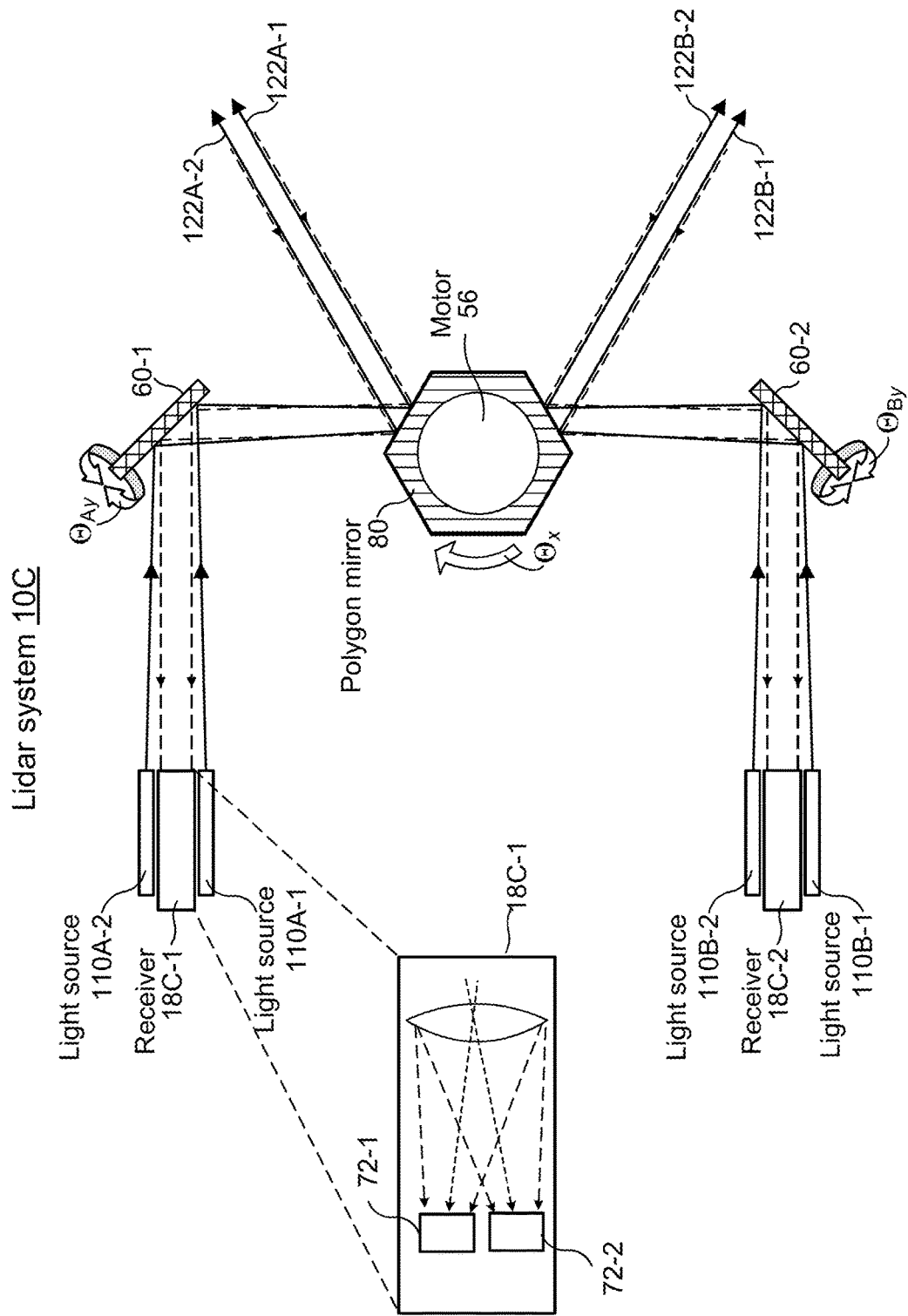
FIG. 4 is a block diagram of an example lidar system in which a scanner equipped with a polygon mirror is configured to operate in a two-eye configuration, with two light beams per "eye"

Now referring to FIG. 4, a lidar system 10C is generally similar to the lidar system 10B discussed above, but each of two eyes of the lidar system 10C is equipped with two light sources to generate respective output beams. The lidar system 10C thus outputs two beams per eye, and a total of four beams. In particular, the first eye of the lidar system 10C includes a light source 110A-1 and a light source 110A-2, and the second eye of the lidar system 10C includes a light source 110B-1 and a light source 110B-2. The light sources 110A-1 and 110A-2 generate output beams 122A-1 and 122A-2, respectively; and the light sources light sources 110B-1 and 110B-2 generate output beams 122B-1 and 122B-2, respectively. Example spatial arrangement of the footprints of the output beams relative to the footprints of the corresponding input beams is discussed below with reference to FIG. 12.

As illustrated in FIG. 4, each of the receivers 18C-1 and 18C-2 can be equipped with a shared receiver lens but separate detectors, such as APDs, for the different output beams associated with the same eye. For example, the detector 72-1 this implementation is configured to detect light from the output beam 122A-1, and the detector 72-2 is configured to detect light from the output beam 122A-2.

Figure 5:
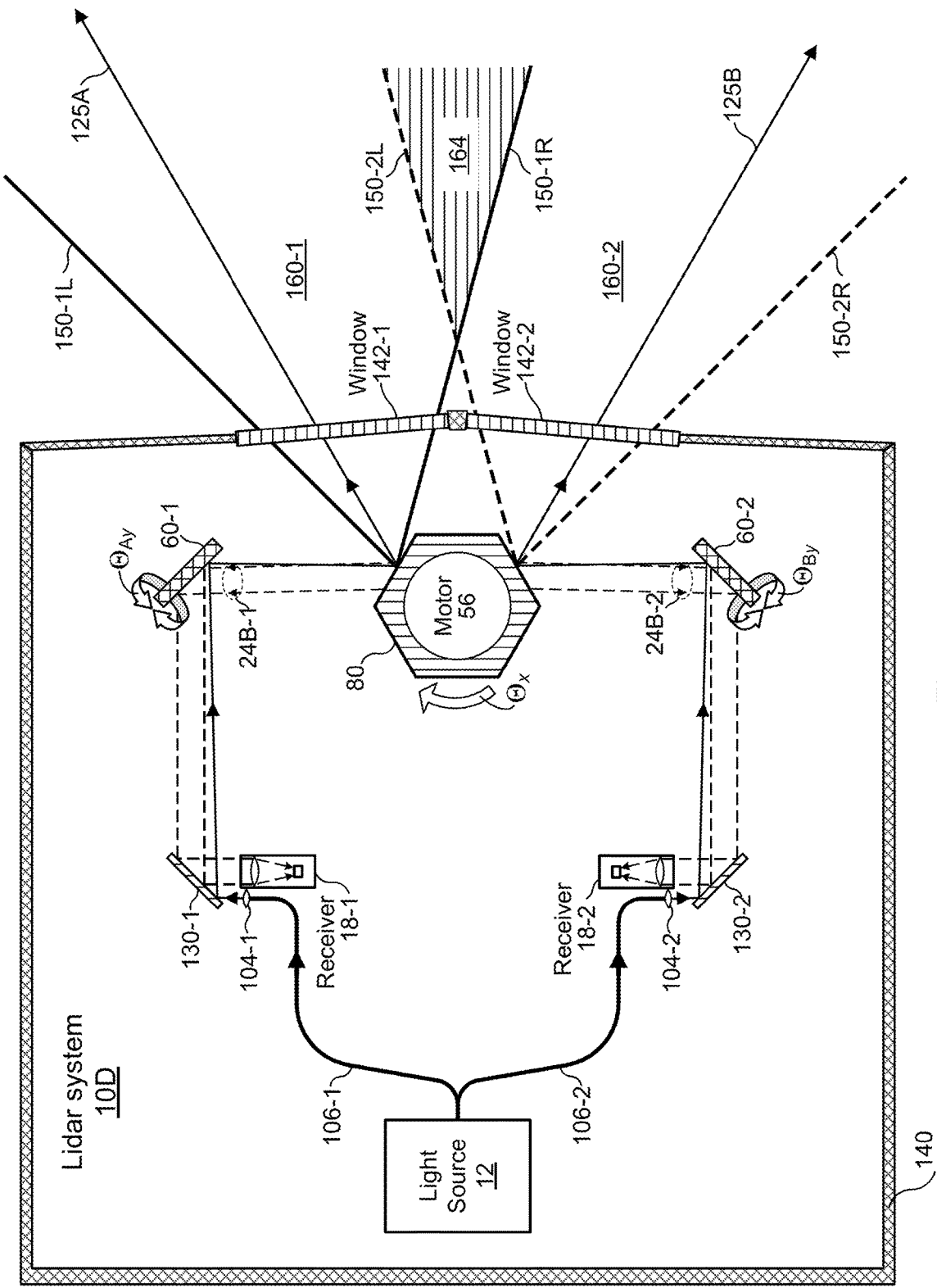
FIG. 5 is a block diagram of another example lidar system in which a scanner equipped with a polygon mirror is configured to operate in a two-eye configuration.

Next, FIG. 5 illustrates an example lidar system 10D that is also similar to the lidar system 10B discussed with reference to FIG. 3, but the lidar system 10D includes stationary mirrors 130-1 and 130-2 to provide folds to the input and output beams in the corresponding eyes of the lidar system 10D. The stationary mirrors 130-1 and 130-2 thereby can reduce the overall three-dimensional size of the lidar system 10D, as discussed in further detail below.

The lidar system 10D includes a housing 140 with two windows 142-1 and 142-2. The components 140, 142-1, and 142-2 can have properties similar to those of the components 40 and 42 discussed above with reference to FIG. 1.

FIG. 5 further illustrates an example field of regard (FOR) of a lidar system in which a scanner equipped with a polygon mirror operates in a two-eye configuration, similar to the lidar systems 10B (FIG. 3), 10C (FIG. 4), or 10D (FIG. 5). The range from the left boundary 150-1L to the right boundary 150-1R defines the FOR 160-1 of the first eye, and the range from the left boundary 150-2L to the right boundary 150-2R defines the FOR 160-2 of the second eye. The FORs 160-1 and 160-2 include a region of overlap 164, in which the lidar system generates a higher density of information.

Figure 6A:
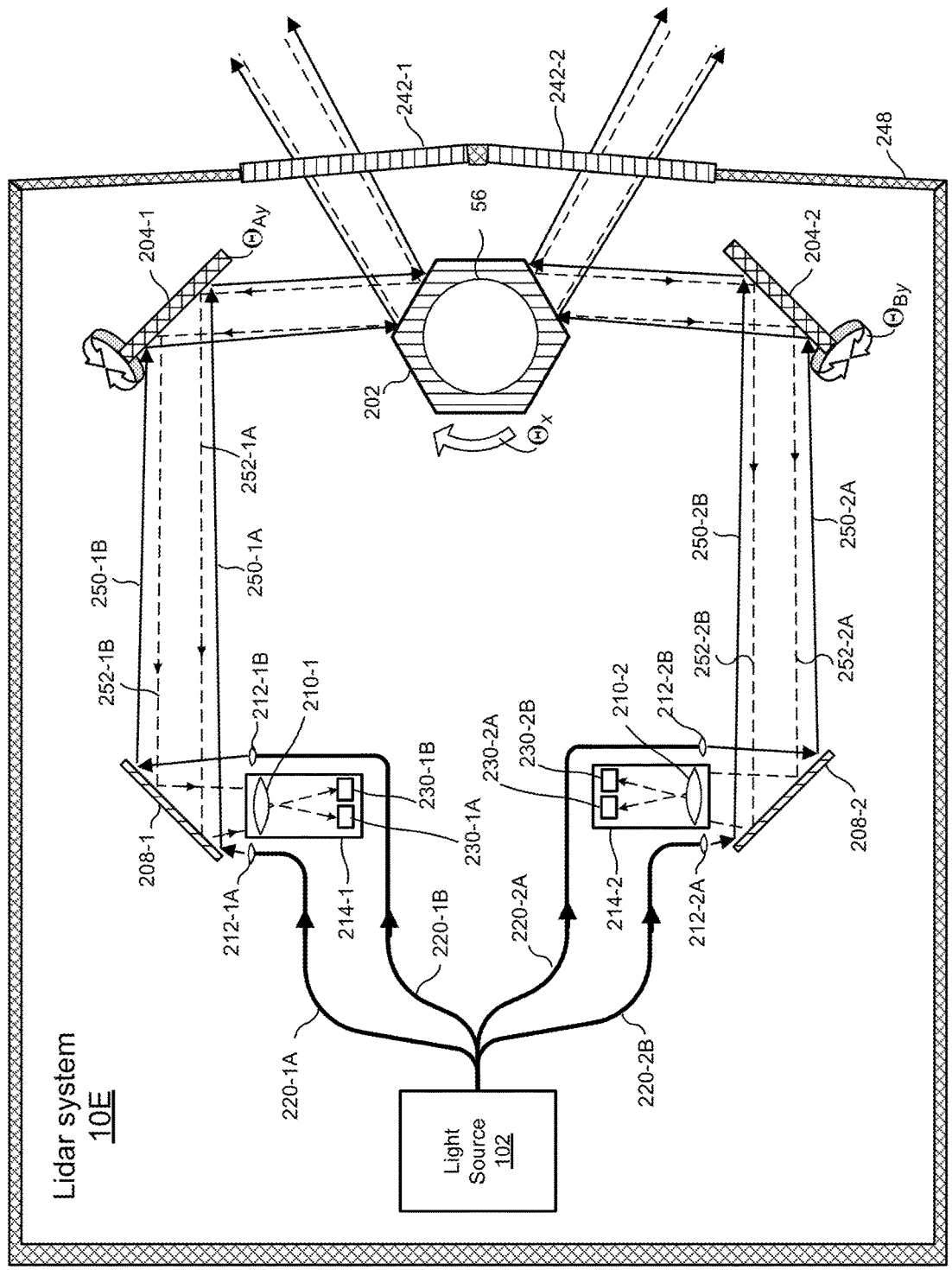
FIG. 6A is a block diagram of another example lidar system in which a scanner equipped with a polygon mirror is configured to operate in a two-eye configuration, with two output beams per eye.

Example Implementation of a Scanner in a Two-Eye, Two-Beams-Per-Eye Configuration FIG. 6A schematically illustrates another implementation of a lidar system in which several techniques discussed above are implemented, and some of the components of this system are illustrated in perspective views in FIGS. 7-18. To avoid clutter, a control sub-system of the lidar system of FIG. 6A is illustrated separately in FIG. 6B. Generally speaking, the lidar system 10E generates two output beams for each of the two eyes, similar to the lidar system 10C. Further, similar to the lidar system 10D, the lidar system 10E includes stationary mirrors to fold input and output beams and thereby reduce the overall size of the lidar system. Still further, the lidar system 10E includes a single seed laser that supplies pulses to multiple collimators.

Figure 9:
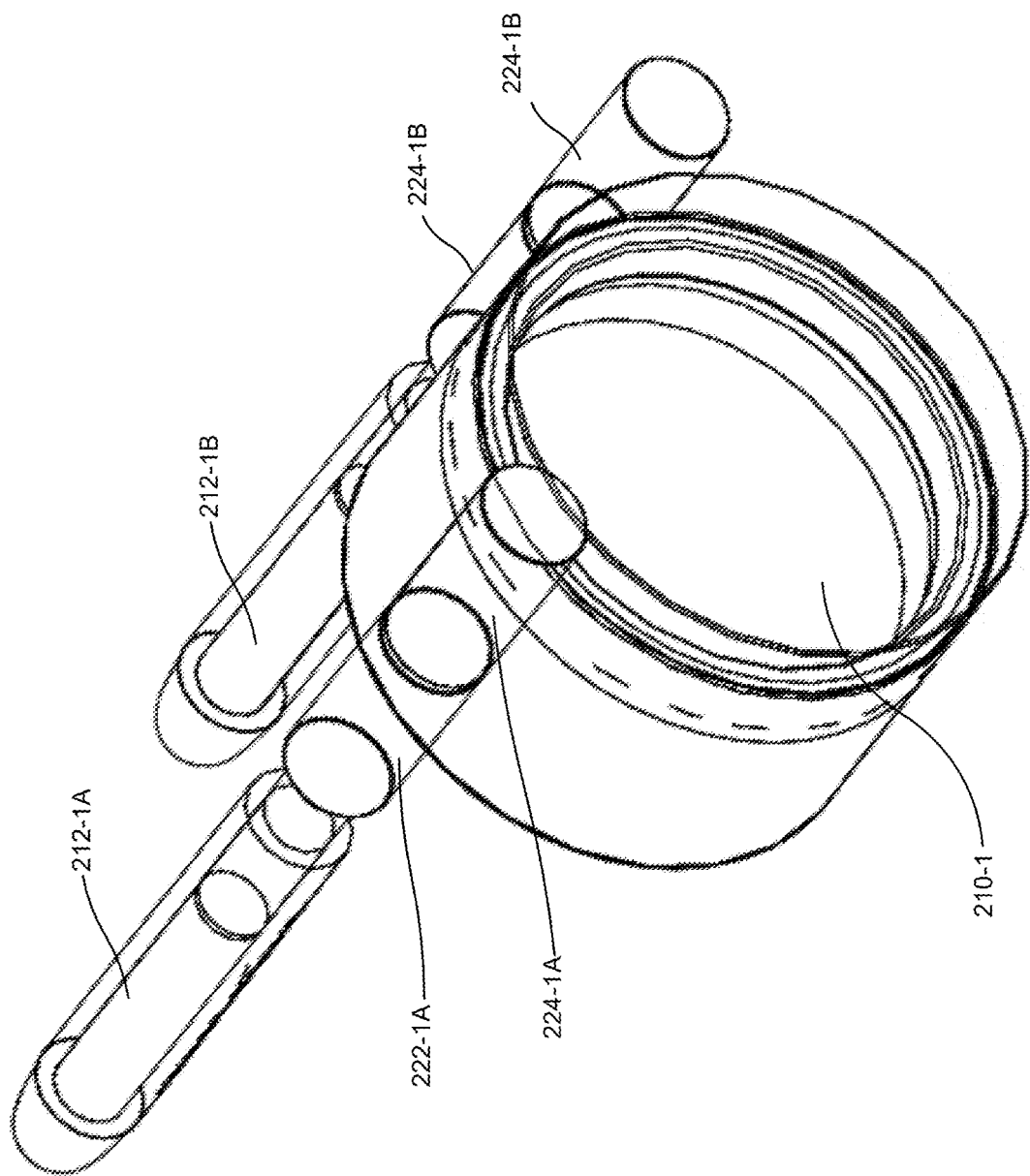
FIG. 9 is a front perspective view of two light sources and an optical lens of a receiver associated with the light sources, implemented in the lidar system of FIGS. 6A-B.
Figure 10:
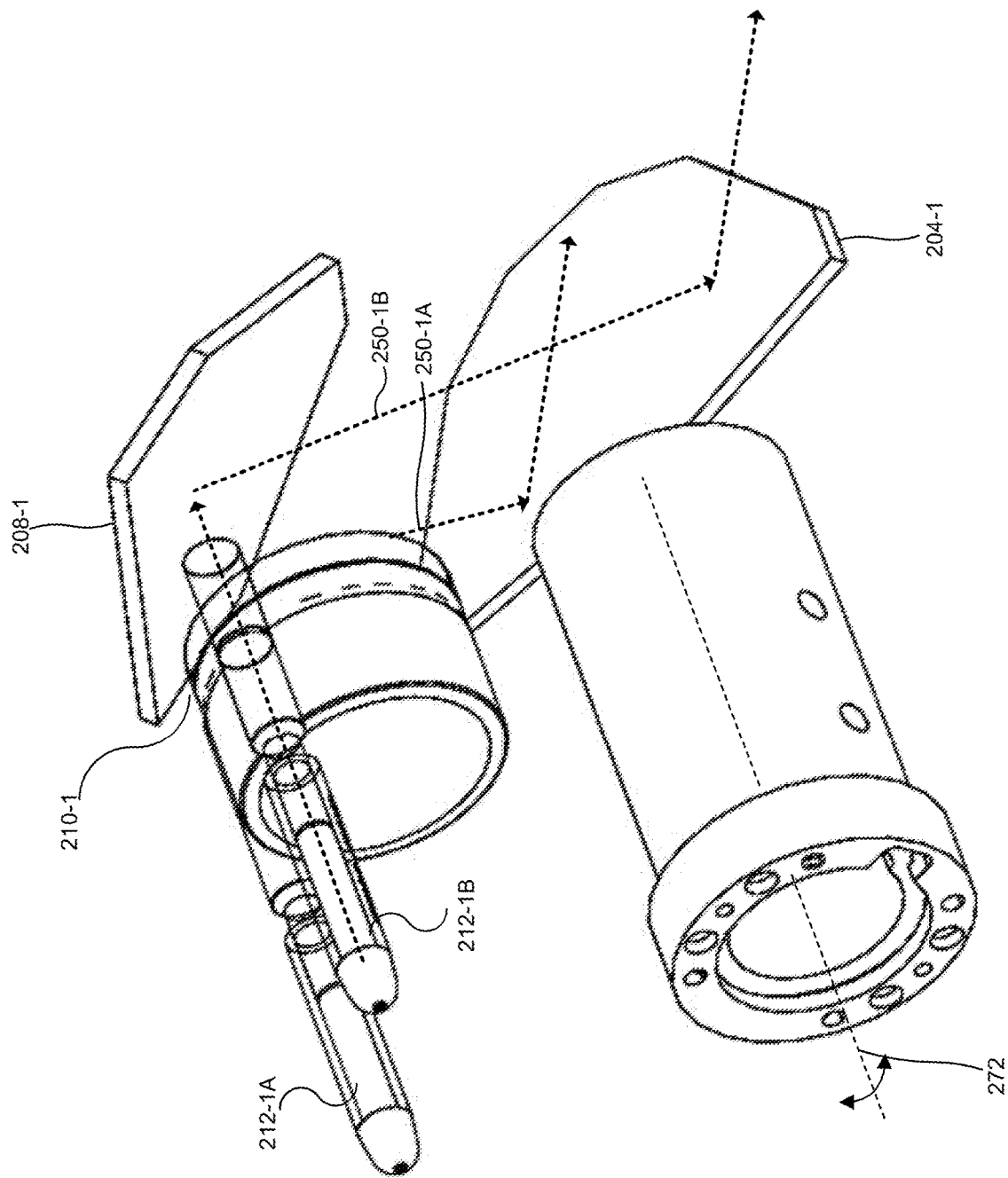
FIG. 10 is a side perspective view of a several components of one eye of the lidar system of FIGS. 6A-B, with paths of output beams schematically illustrated over the perspective view.

More specifically, the scanner of the lidar system 10E includes a polygon mirror 202 to scan output beams in a first (e.g., horizontal) direction, with a motor 56 at least partially embedded in the polygon block, and scan mirrors 204-1 and 204-2 that oscillate the scan the output beams in a second (e.g., vertical) dimension for the first eye and the second eye, respectively. A light source 102 includes a laser that provides pulses of light to collimators 212-1A and 212-1B operating as a part of the first eye of the lidar system 10E, and collimators 212-2A and 212-2B operating as a part of the second eye. The light source 102 and/or the fiber-optic cables 220-1A, 220-1B, 220-2A, and 220-B coupling the light source 102 to the respective collimators can amplify the light pulses. As best illustrated in FIG. 9, the collimators can be attached to lenses 222-1A, 224-1A, 222-1B, 224-1B, etc. which can variously condition, shape, and steer the output beams. For example, these lenses can provide the angular offset between the output beams 250-1A and 250-1B, and between the output beams 250-2A and 250-2B.

Components of the first eye of the lidar system 10E thus generate outbound beams 250-1A and 250-1B, and components of the second eye generate outbound beams 250-2A and 250-2B. Stationary mirrors 208-1 and 208-2 fold these beams at 90 degrees to reduce the overall size of the lidar system 10E. Each outbound beam first strikes a folding mirror, which then reflects the outbound beam toward a scan mirror whose current rotary position defines the vertical scan angle, and the scan mirror in turn reflects the outbound beam toward the polygon mirror, whose current rotary position defines the horizontal scan angle of the pulse.

The polygon mirror 202 reflects inbound beam 252-1A and 252-1B corresponding to the first eye toward the scan mirror 204-1, which reflects the inbound beams 252-1A and 252-1B toward the stationary mirror 208-1, which in turn directs the inbound beams 252-1A and 252-1B to a receiver 214-1. Inbound beams 252-2A and 252-2B corresponding to the second eye travels along a similar path. The receiver 214-1 includes a receiver lens 210-1 and two APDs or other suitable detectors, 230-1A and 230-1B, to generate separate pixels for the output beams 250-1A and 250-1B. Similarly, the receiver 214-2 corresponding to the second eye includes a receiver lens 210-2 and detectors 230-2A and 230-2B corresponding to the output beams 250-2A and 250-2B. Although the paths of inbound and outbound beams are illustrated in FIG. 6 with exaggerated incident angles, the output beam 250-1A and the corresponding inbound beam 252-1A can be parallel to within 1°. Similarly, each output beam/inbound beam pair can be parallel to within 1° relative to each other.

The receiver lens 210-1 is disposed at an end of a sheath 216-1, facing the stationary mirror 208-2. An optic base 218-1 with light detectors is disposed at the opposite end of the sheath 216-1. The optic base 218-1 can include respective detectors for the output beams and the associated circuitry. The other eye of the lidar system 10E has a similar structure.

Figure 7:
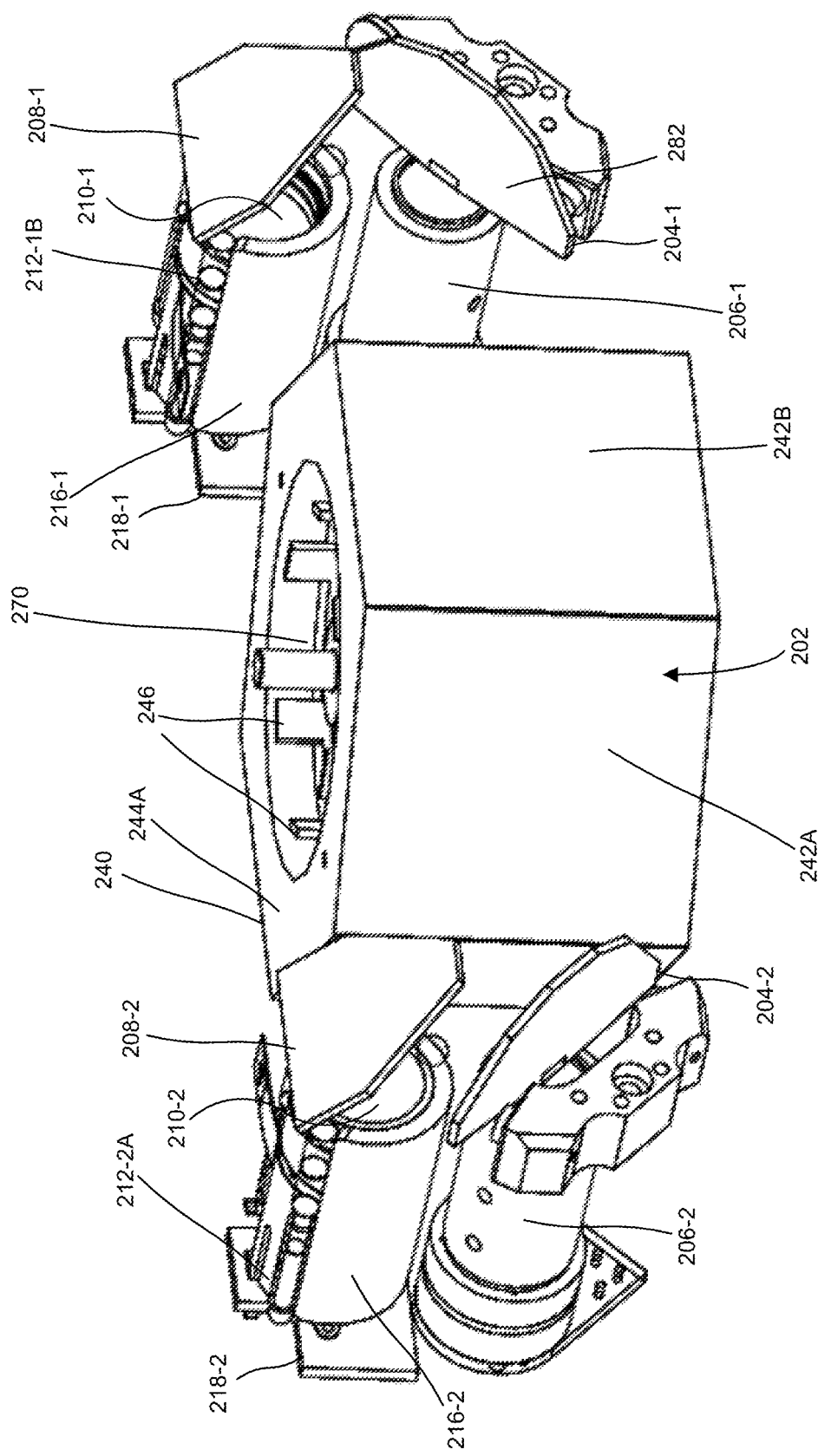
FIG. 7 is a front perspective view of a scanner, a receiver, and a light source of an example lidar system configured to operate in a two-eye configuration.
Figure 8:
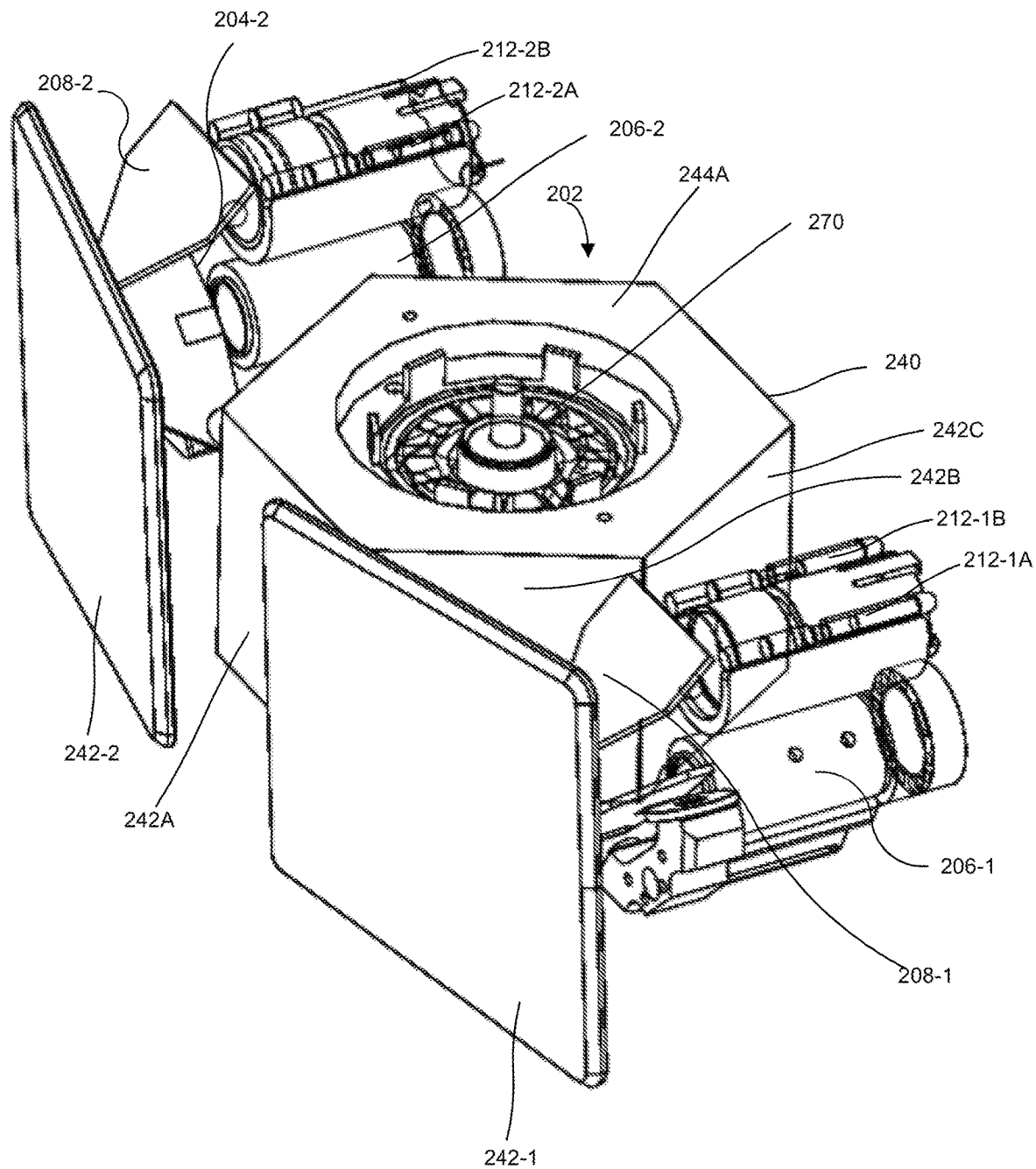
FIG. 8 is side perspective view of the components of FIGS. 6A-B and windows of a housing enclosing the lidar system.

As best illustrated in FIGS. 7 and 8, the rotatable polygon mirror 202 includes a block 240 of hexagonal shape with six finished reflective surfaces 242A, 242B, etc. It is possible, however, to a use a triangle-shaped rotatable polygon mirror with three reflective surfaces, a square shape with four reflective surfaces, an octagonal shape with eight reflective surfaces, etc. In another implementation, not every surface of the rotatable polygon mirror oriented toward the scan mirrors 204-1 and 204-2 is reflective (e.g., the rotatable polygon mirror can be a flat substrate with reflective surfaces on the front and back sides). More generally, the rotatable polygon mirror 202 may have any suitable number of reflective surfaces, such as for example 3, 4, 5, 6, 7, 8, 9, 10, 11, or 12 reflective surfaces.

The polygon mirror 202 may be made from any suitable material, such as for example, glass, plastic (e.g., polycarbonate), metal (e.g., aluminum or beryllium), metal foam, carbon fiber, ceramic, or any suitable combination thereof. The reflective surfaces 242A, 242B, etc. of the polygon mirror 202 can be manufactured using surface replication techniques, and coarse as well as fine balancing techniques can be applied to the polygon mirror 202.

Figure 15:
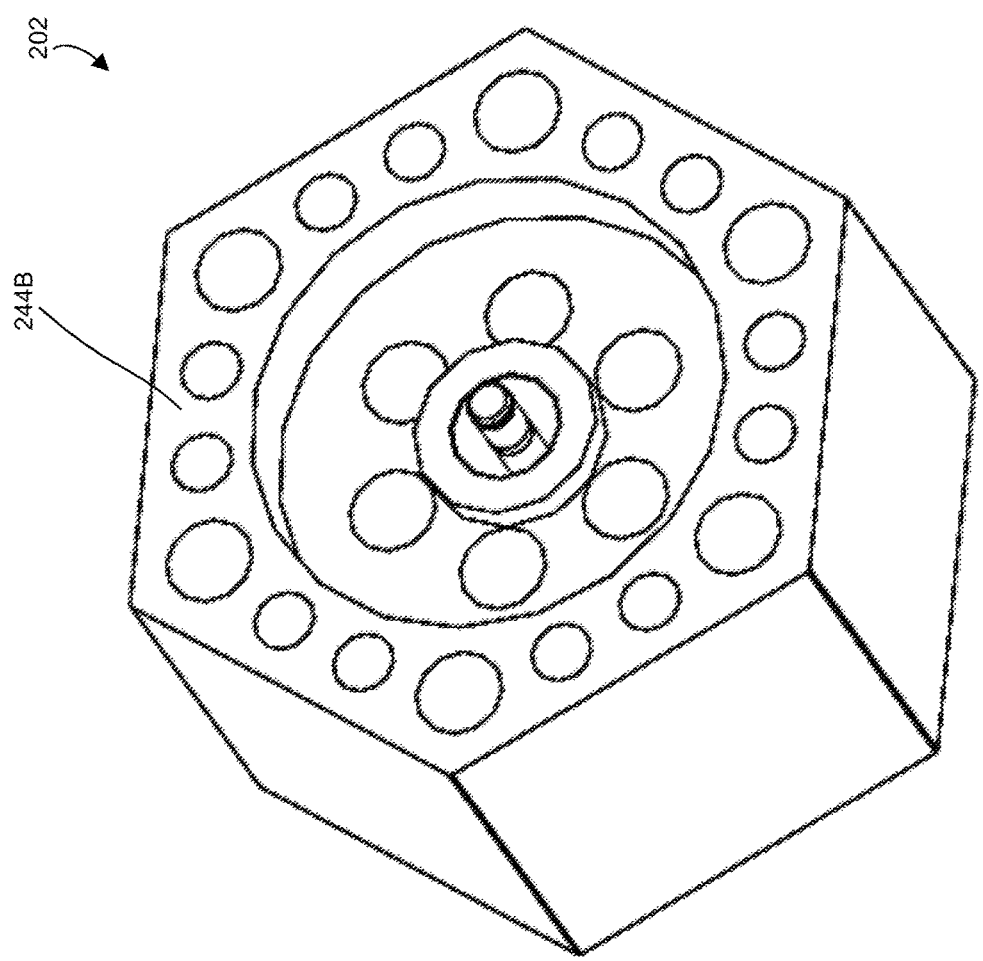
FIG. 15 is a bottom perspective view of the polygon mirror of FIG. 11.

The rotatable polygon mirror 202 further includes a first wall 244A (best illustrated in FIG. 14) and a second wall 244B (best illustrated in FIG. 15). Each of the reflective surfaces 242A, 242B, etc. extends between the first and second walls 244A and 244B. The reflective surfaces 242A, 242B, etc. are angularly offset from one another along a periphery of the block 240.

Generally speaking, as the polygon mirror 202 rotates, the scanner produces one scan line for each reflective surface of the polygon mirror 202, for each eye of the lidar system 10E. The scan mirror 204-1 pivots to distribute the scan lines across the FOR of the first eye, and the scan mirror 204-2 pivots to distribute the scan lines across the FOR of the second eye. Thus, if the scan lines are directed horizontally, the polygon mirror 202 is responsible primarily for the horizontal dimension of the field of regard ($FOR_H$), and the scan mirrors 204-1 and 204-2 accordingly are responsible for vertical dimension of the corresponding field of regard ($FOR_V$). In other implementations or orientations, however, the polygon mirror 202 can be responsible for $FOR_V$, and the scan mirrors 204-1 and 204-2 can be responsible for $FOR_H$.

Figure 16:
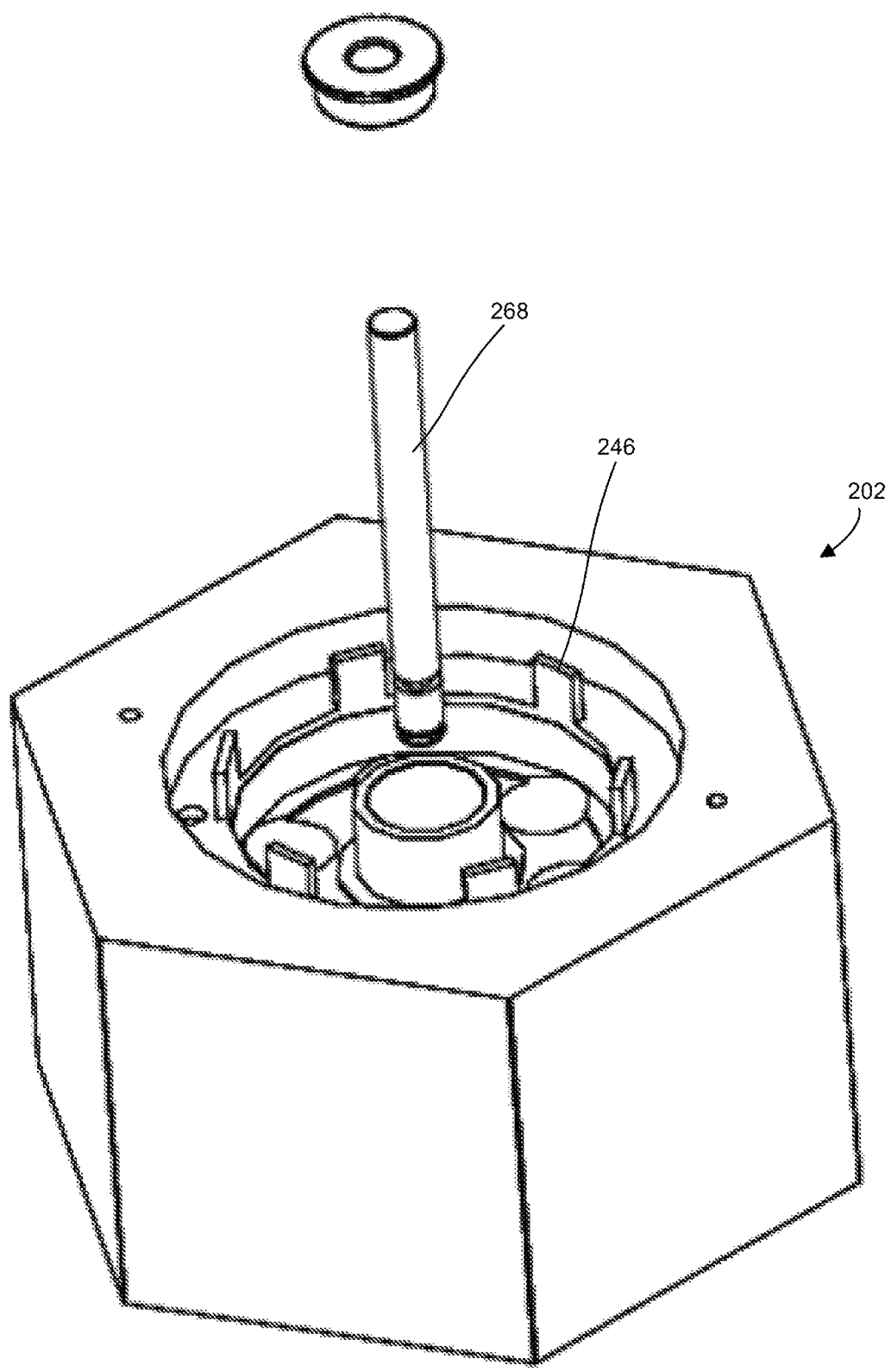
FIG. 16 is an exploded view of the polygon mirror of the lidar system of FIGS. 6A-B.
Figure 17:
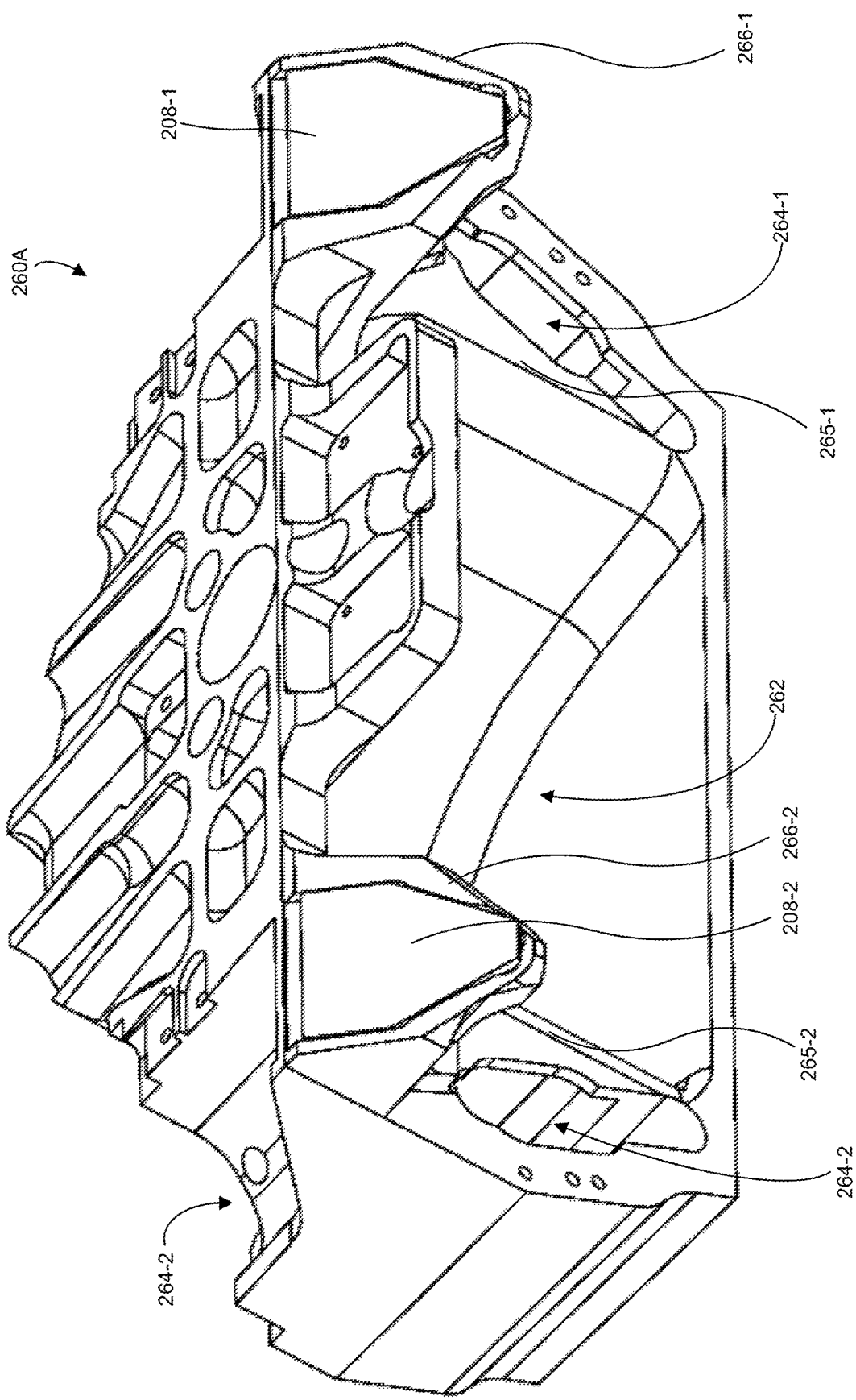
FIG. 17 is front perspective view of a bracket that supports several components including the folding mirrors in the lidar system of FIGS. 6A-B.
Figure 22:
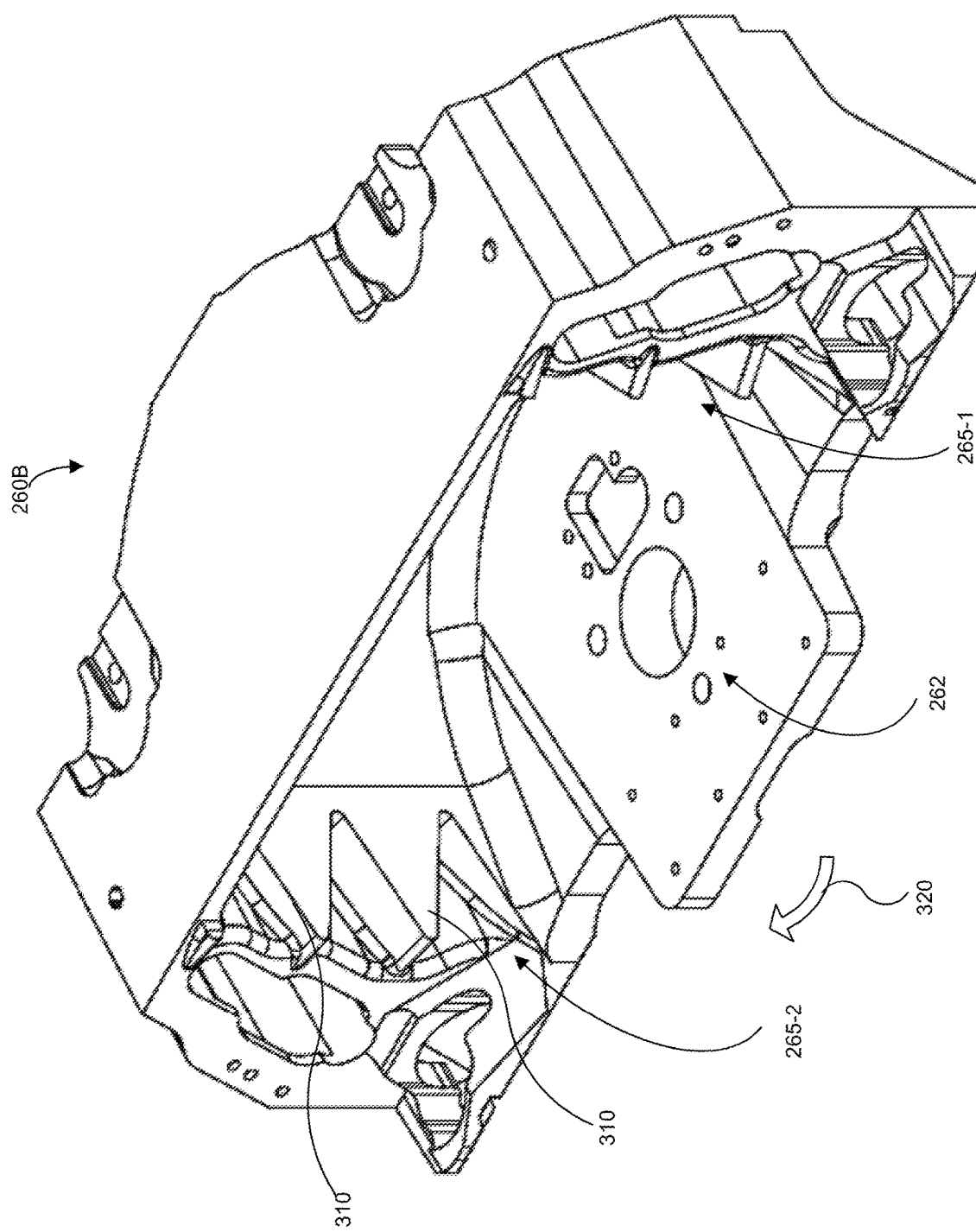
FIG. 22 is a perspective view of a bracket that supports several components of a lidar system and provides acoustic noise reduction through tapered features on the interior surface.
Figure 23:
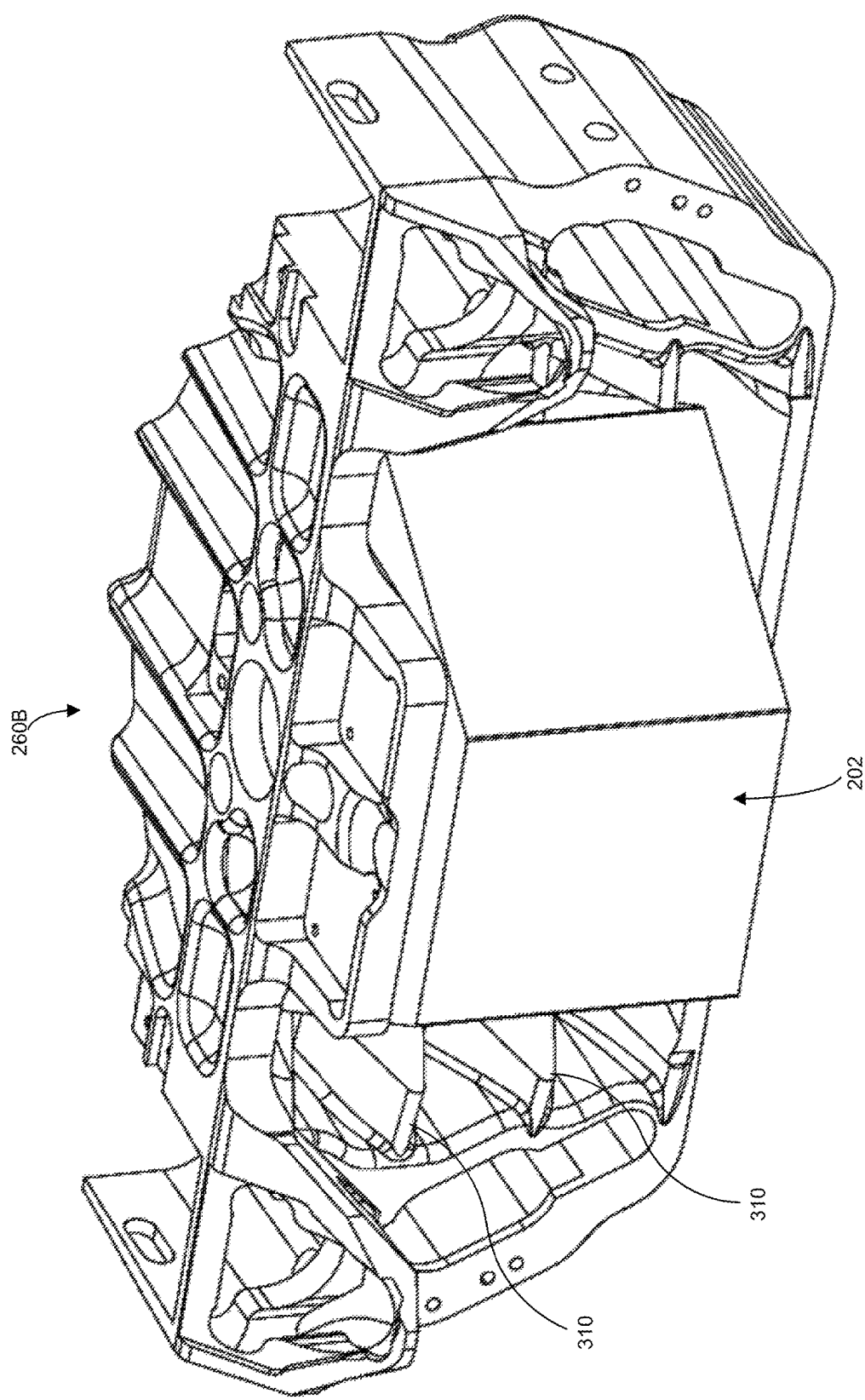
FIG. 23 is a perspective view of the bracket of FIG. 22 and a polygon mirror partially enclosed by the bracket.

The polygon mirror 202 is mounted adjacent to a bracket 260A illustrated in FIG. 17 or a bracket 260B with improved noise reduction illustrated in FIGS. 22 and 23. In various implementations, the bracket 260A can partially surround the polygon mirror 202 or provide cantilevered support to the polygon mirror 202, for example. The polygon mirror axle 268 (see FIG. 16) can extend through one or several walls of the bracket 260A. The bracket 260B being located adjacent to the polygon mirror 202 may correspond to an interior surface of the bracket 260B being located within a distance of 2R of the polygon mirror axle 268, where R is a distance from the center of the polygon mirror 202 to one of the reflective surfaces of the polygon mirror 202. The bracket 260A has a compact profile that allows the lidar system 10E to be packaged inside the low-profile housing 248 illustrated in FIG. 18. The bracket 260 provides protection as well as rigid positioning of several components that define optical paths within the lidar system 10E. In particular, with reference to FIG. 17, the polygon mirror 202 and the associated motor can be mounted in a cavity 262, the galvanometer scanners 206-1 and 206-2 can be positioned inside cavities 264-1 and 264-2, respectively (thereby defining positioning of the scan mirrors 204-1 and 204-2 relative to the other components), and the stationary mirrors 208-1 and 208-2 can be mounted on overhangs 266-1 and 266-2, respectively. Further, cavities 264-1 and 264-2 can receive the sheaths 261-1 and 216-2. The cavity 262 partially enclosing the polygon mirror terminates at edges 265-1 and 265-2.

Figure 18:
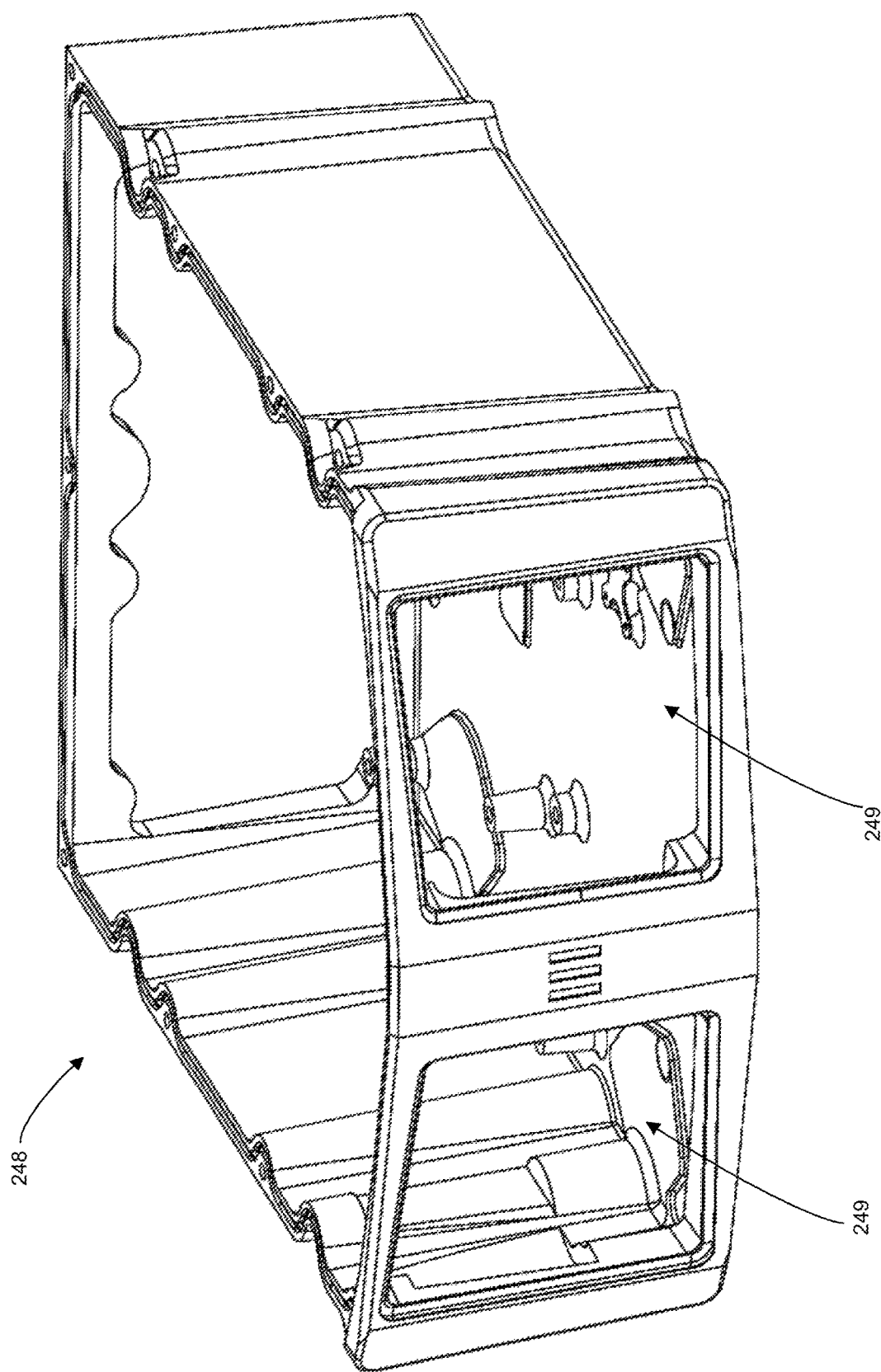
FIG. 18 is a front perspective view of an example housing that can enclose the components of the lidar system of this disclosure.
Figure 19:
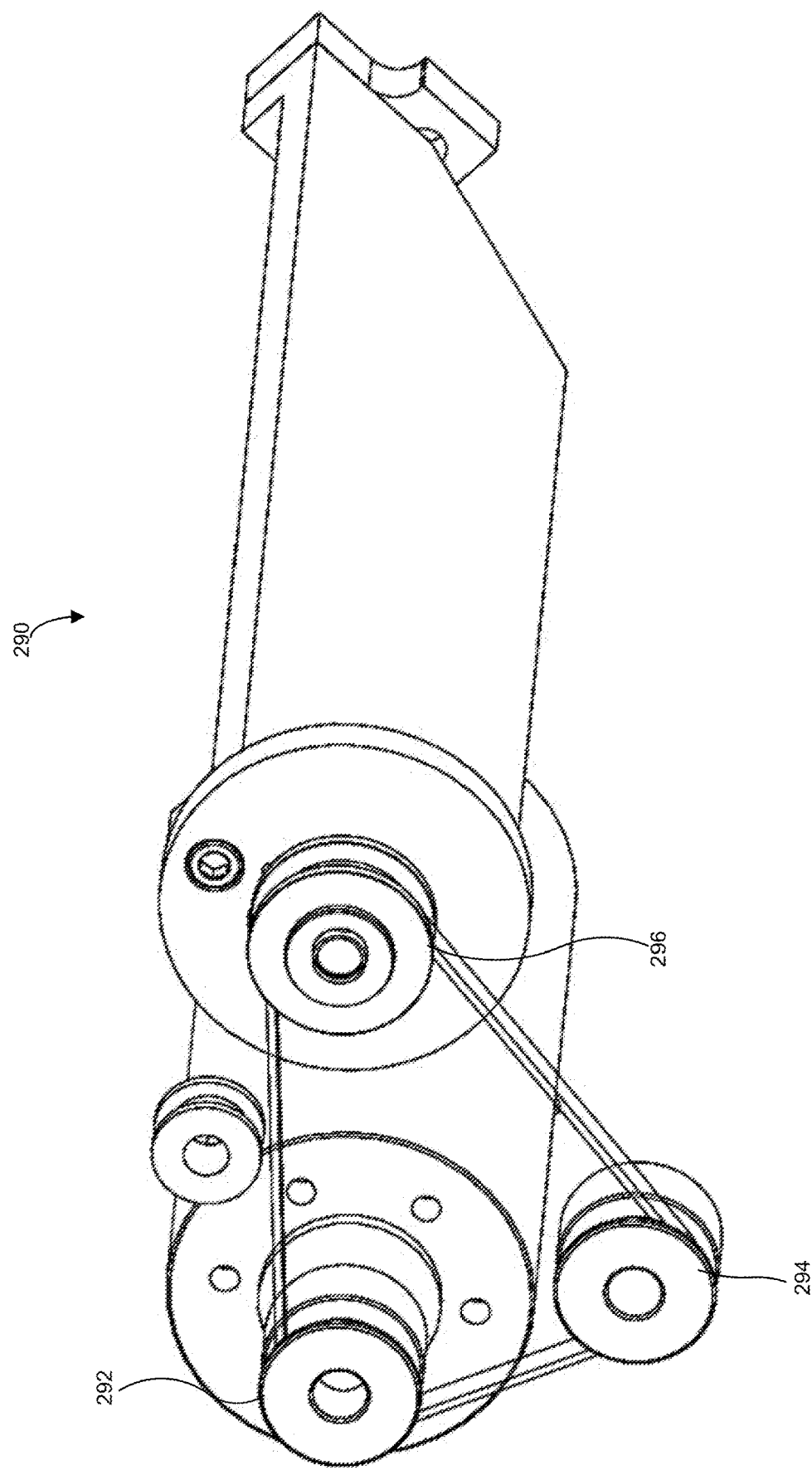
FIG. 19 a front perspective view of a planar mirror and motor assembly that can be used in a lidar system similar to the lidar system of FIGS. 6A-B.

As best illustrated in FIG. 18, the housing 248 includes openings 249 to receive windows 242-1 and 242-2 (see FIG. 8). The windows 242-1 and 242-2 can have properties similar to those of the components window 42 discussed above with reference to FIG. 1.

In some implementations, the housing 248 is configured so that rotation of the polygon mirror 202 imparts a flow of air through the housing to provide cooling to components enclosed within the housing. The air flow may be a laminar flow, a turbulent flow, or any suitable combination thereof. Such cooling need not be the exclusive means of cooling of the interior components of the lidar sensor unit 10E. For instance, one or more of a fan, cooling fins, or a heat exchanger can be used to moderate the temperature of the components of the lidar sensor unit 10E. However, the air flow within the housing and the aerodynamic construction of the components of the polygon mirror 202 of the lidar sensor unit 10E preferably account for a substantial portion of the temperature mitigation of the lidar sensor unit 10E, even when any one or more of a fan, cooling fins, or a heat exchanger are additionally provided in the housing to supplement cooling. A substantial portion of the temperature mitigation of the lidar sensor unit may be a majority of the cooling, at least 75% of the cooling, at least 80% of the cooling, at least 85% of the cooling, at least 90% of the cooling, at least 95% of the cooling, at least 98% of the cooling, or at least 99% of the cooling. Alternatively, the air flow within the housing and the aerodynamic construction of the components of the polygon mirror 202 of the lidar system 10E may be relied upon to supply all of the cooling when at least one of the temperature within the housing of the lidar system 10E or the ambient temperature is below a certain predefined temperature, and if the at least one of the temperature within the housing 248 or the ambient temperature exceeds the predefined temperature, the air flow within the housing and the aerodynamic construction of the components of the polygon mirror 202 may be supplemented by at least one or more of a fan, cooling fins, or a heat exchanger to provide cooling. In some implementations, the polygon mirror 202 may be at least partially surrounded or enclosed by a shroud that may act to aid or direct the air circulation provided by the polygon mirror 12. The shroud may include a dust collector (e.g., a filter) configured to remove dust from circulating air.

In some implementations, only some of the components of the lidar system 10E are placed inside the housing 248, while other components are provided outside the housing 248. For example, referring to FIG. 6, a single light source 12 including a seed laser can be provided in a separate housing and disposed outside the housing 248. The light source 12 can be coupled, via fiber-optical cables, to multiple sub-systems each enclosed within a respective instance of the housing 248. The sub-systems can be referred as "lidar sensor units" or "sensor heads."

The polygon mirror 202 can be mounted on a polygon mirror axle 268 (best illustrated in FIG. 16). The polygon mirror axle 268 can extend through at least one of the first and second walls 244A and 244B. A motor drives the polygon mirror axle 268, thereby imparting rotational oscillation to the rotatable polygon mirror 202. The motor may be a synchronous brushless DC motor in driving relationship with the axle 268. The motor may drive rotation of the rotatable polygon mirror 202 in an open-loop or closed-loop fashion. In general, the motor can be any actuator or mechanism suitable for rotating the polygon mirror 202.

In this example implementation, the block 240 accommodates a stator 270 of the motor (best illustrated in FIG. 8), thereby reducing the overall size of the system. In general, any suitable portion of the motor can be embedded in the block 240, substantially the entire motor can be embedded in the block 240, or the motor can be external to the block 240. In another implementation, the motor is attached to the surface 244A or 244B of the polygon mirror 202 with epoxy or mechanical fasteners. In yet other implementation, a magnetic ring can be placed inside the block 240 by press-fitting, and/or the bearings of the motor can be disposed within the block 240.

The rotatable polygon mirror 202 may additionally employ an optical beam, the presence or absence of which is detectable by a stationary photo-interrupter 207 (see FIG. 6B), to collect data indicative of the rotational speed of the rotatable polygon mirror 202. One or more tabs 246 may be provided on the polygon mirror axle 268 or an interior surface of the block 240, which tab(s) pass through the stationary photo-interrupter during rotation of the polygon mirror 202. Upon receiving from the photo-interrupter 207 feedback data indicative of the rotational speed of the polygon mirror 202, the feedback data can then be processed by a controller 205 associated with the motor 56 of the polygon mirror 202 to make any necessary adjustments to the rotational speed of the polygon mirror 202, for example. In particular, the controller 205 may regulate or stabilize the rotational speed of the polygon mirror 202 so that the rotational speed is substantially constant. For example, the polygon mirror 202 may be rotated at a rotational speed of approximately 150 Hz (150 revolutions per second), and the rotational speed may be stabilized so that it varies by less than or equal to 1% (e.g., 150 Hz±1.5 Hz), 0.1%, 0.05%, 0.01%, or 0.005%.

Figure 6B:
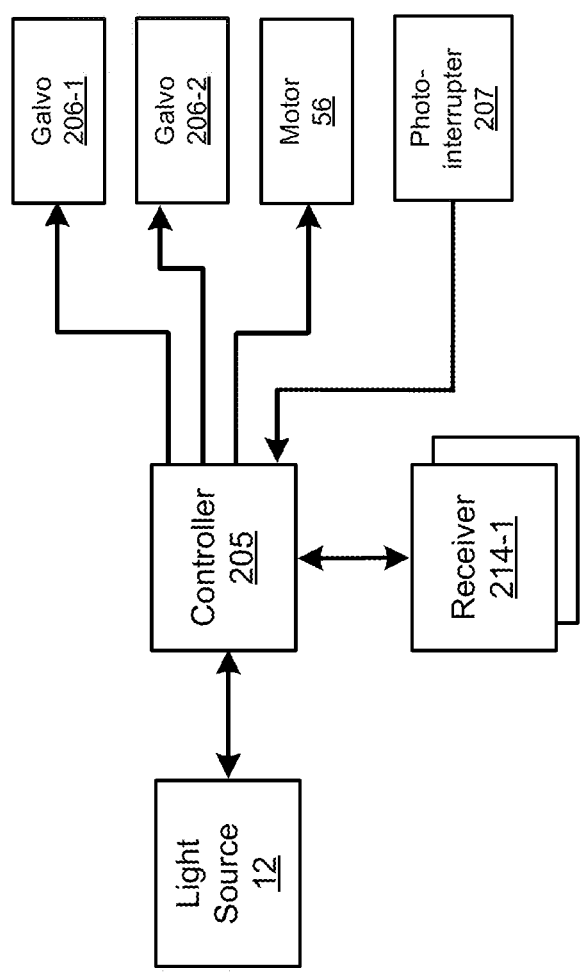
FIG. 6B is a block diagram of the control sub-system of the lidar system of FIGS. 6A-B.

The controller 205 can be generally similar to the controller 20 of FIG. 1. In addition to controlling the rotational speed of the polygon mirror 202, the controller 205 can provide control signals to the galvanometer scanners 206-1 and 206-2 to adjust the pivot angle, the range of oscillation, the speed of rotation or oscillation, etc. In some implementations and/or scenarios, the controller 205 controls the galvanometer scanners 206-1 and 206-2 so as to generate different scan patterns in different eyes of the lidar system 10E. Still further, as illustrated in FIG. 6B, the controller 205 can receive signals from the receivers 214-1 and 214-2 and determine the distance to the target based at least in part on a time of flight for a pulse of light of an output beam of light to travel from the lidar system 10E to the target and back to the lidar system 10E.

A galvanometer scanner 206-1 drives the scan mirror 204-1, and a galvanometer scanner 206-2 drives the scan mirror 204-2. As discussed below, this allows the controller 205 to independently control certain operational parameters (e.g., the frequency of oscillation, the range of oscillation) of each scam mirror individually. In other implementations, however, the same galvanometer scanner or the same motor assembly can be used to impart oscillation to both scan mirrors via an appropriate belt drive, for example, to reduce the number of components and improve registration between the two scan mirrors. In this case, the controller 205 controls the scan mirrors 204-1 and 204-2 together rather than individually. The scan mirror 204-1 can be pivotally mounted along a shaft that extends along a scan-mirror pivot axis 272 (see FIGS. 10 and 11). The scan-mirror pivot axis 272 is orthogonal or, at least, substantially orthogonal to the polygon-mirror rotation axis 274 with which the polygon mirror axle 268 is coincident. The scan mirror 204-1 can be mounted in a similar manner, with a scan-mirror pivot axis parallel to that of the scan mirror 204-2.

In other implementations, the scan mirror 204-1 or 204-2 can be parts of a microelectromechanical systems (MEMS) device. In yet other implementations, the scan mirror 204-1 or 204-2 is actuated by a drive system 290 such as that illustrated in FIG. 19. The example drive system 290 includes a drive motor, which, by way of example, may be a brushless FAULHABER (trademark) drive motor, several pulleys, and a drive belt translating rotational motion of one of the pulleys 292 driven directly by the drive motor to the other two pulleys 294, 296.

Figure 20:
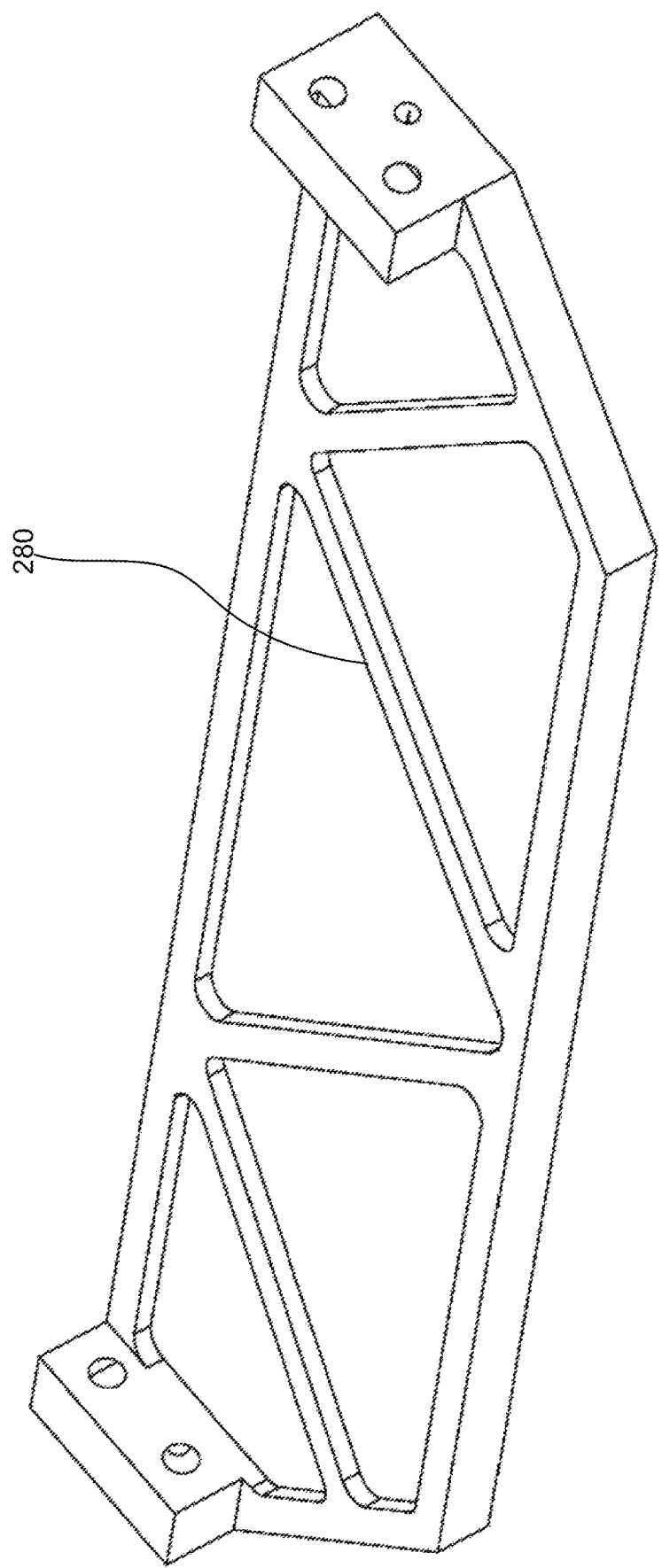
FIG. 20 is a rear perspective view of the planar mirror of FIG. 20.

The scan mirrors 204-1 and 204-2 in some implementations have bodies defined by multiple rib-like members 280 (see FIG. 20) that form a honeycomb-like structure, supporting a finished planar reflective surface 282 (see FIG. 7). The center of gravity of each of the scan mirrors 204-1 and 204-2 is closer to the reflective surface 282 than to an edge of the ribbed or honeycomb body opposite the reflective surface 282. The scan mirrors 204-1 and 204-2 may be made from any suitable material, such as for example, metal (e.g., aluminum), ceramic polymer, or carbon fiber.

While the lidar system 10E of FIGS. 6-18 uses two collimators at each eye to generate a pair of output beams, in other implementations the lidar system can use a diffractive optical element (DOE) beam splitter to split a single output beam into two or more beams. The beams may have distinct wavelengths from one another, $\lambda_1$ and $\lambda_2$. The DOE in this case may split the pulse before directing the resulting output beams to the stationary mirror, or the DOE may be disposed downrange of the stationary mirror, the scan mirror, and the polygon mirror, and split a pulse after propagation through the scanner. The DOE in general can be any suitable holographic element, a pixelator, diffractive element, etc.

The scan mirrors 204-1 and 204-2 may be configured so as to pivot over a range of allowable motion larger than a range corresponding to the vertical angular dimension of the field of regard, so as to define a maximum range of allowable motion larger than a range within which the scan mirrors 204-1 and 204-2 pivot during a scan. The controller 205 associated with the scan mirrors 204-1 and 204-2 selects different portions of the maximum range of allowable motion as the range within which the second mirror pivots, in accordance with modifications of the scan pattern. In particular, to modify at least one of a scan pattern or a scan rate, the controller associated with the motor of the polygon mirror 202 can be configured to cause the motor to vary the speed of rotation of the polygon mirror 202, cause the drive motor to vary the vary the oscillation of the scan mirrors 204-1 and 204-2, or both. The controller 205 may be configured to modify the scan pattern on a frame-by-frame basis, each frame corresponding to a complete scan of the field of regard of the lidar system 10E. In some implementations, the oscillation of the scan mirrors 204-1 and 204-2 may be varied (e.g., to change the vertical angular dimension of the field of regard), and the rotational speed of the polygon mirror 202 may be regulated or stabilized so that the polygon mirror 202 rotates at a substantially constant speed.

Further, the controller 205 can modify operational parameters of the scan mirrors 204-1 and 204-2 together in the same manner or independently of each other. For example, the controller 205 can receive a request from a vehicle controller (see FIG. 29 below) to increase the scan rate for a certain region within the FOR of the lidar system 10E. The controller 205 can determine that this region of interest is within the FOR of the first eye and outside the FOR of the second eye. Accordingly, the controller 205 can control the galvanometer scanner 204-1 to modify the rotational speed and/or the range of motion, for example, to cause the scan mirror 204-1 to produce a scan pattern different from the scan pattern of the second eye. Although the controller 205 also can modify the rotation of the polygon mirror 202, such modifications affect the scan patterns of both eyes of the lidar system 10E.

Propagation of Output and Input Beams in a Lidar System

For clarity, propagation of output and input beams through the lidar system 10E is schematically illustrated in FIGS. 10-13. The collimators 212-1A and 212-1B are mechanically aimed to direct the output beams 250-1A and 250-1B by the side of the receiver lens 210-1 and toward a reflective surface of the stationary mirror 208-1.

Depending on the implementation, the output collimators 212-1A and 212-1B can be configured to emit pulses having the same wavelength or different wavelengths, and the respective detectors 230-1A and 230-1B can be configured to detect the corresponding return pulses in the input beams reflected by the surface 12-1 and, accordingly, generate values for two pixels within a same ranging event. The two pixels can be in a certain scan line (e.g., an odd pixel and an even pixel). Alternatively, the output collimators 212-1A and 212-1B can launch the output beams 230-1A and 230-1B with a particular spatial or angular offset, and the two input beams have a corresponding spatial or angular offset, with the wavelength of the pulses emitted by the output collimators 212-1A and 212-1B being the same.

In the example implementation of FIGS. 6-1, the input beams 252-1A and 252-1B have the same wavelength and are substantially overlapped spatially, but have a small angular offset (e.g., between approximately 0.1 and 2 degrees) with respect to one another. When the two input beams 252-1A and 252-1B pass through the lens 210-1, the angular offset results in the two beams being focused on two separate spots, which may be separated by approximately 0.4 to 2 mm. The detectors 230-1A and 230-1B accordingly are disposed at these spots. In this manner, the angular offset between the beams results in a spatial separation after passing through the lens.

As discussed above, an input beam typically contains only a relatively small portion of the energy of an output beam. A receiver field of view (FOV) may define a larger angular cone over which the receiver detects light as compared to the light-source FOV, or the angular cone illuminated by the light source. Accordingly, FIG. 13 illustrates input and output beams of as cones of different sizes, but neither the sizes of the cones nor the degrees of divergence of these cones are drawn to scale.

Figure 12:
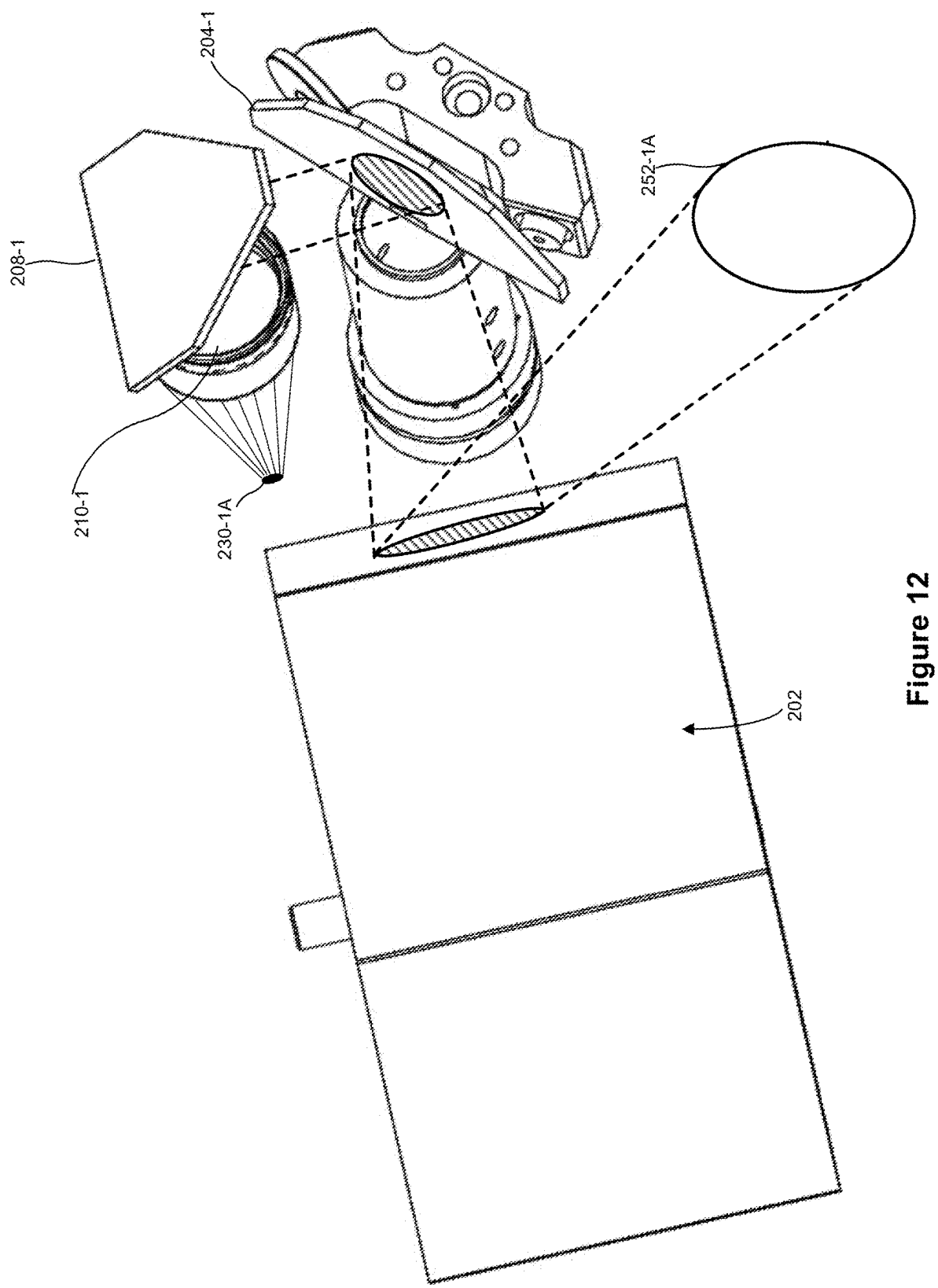
FIG. 12 is a front perspective view of the components of FIG. 8 along with the polygon mirror, with paths of input beams schematically illustrated over the perspective view.
Figure 13:
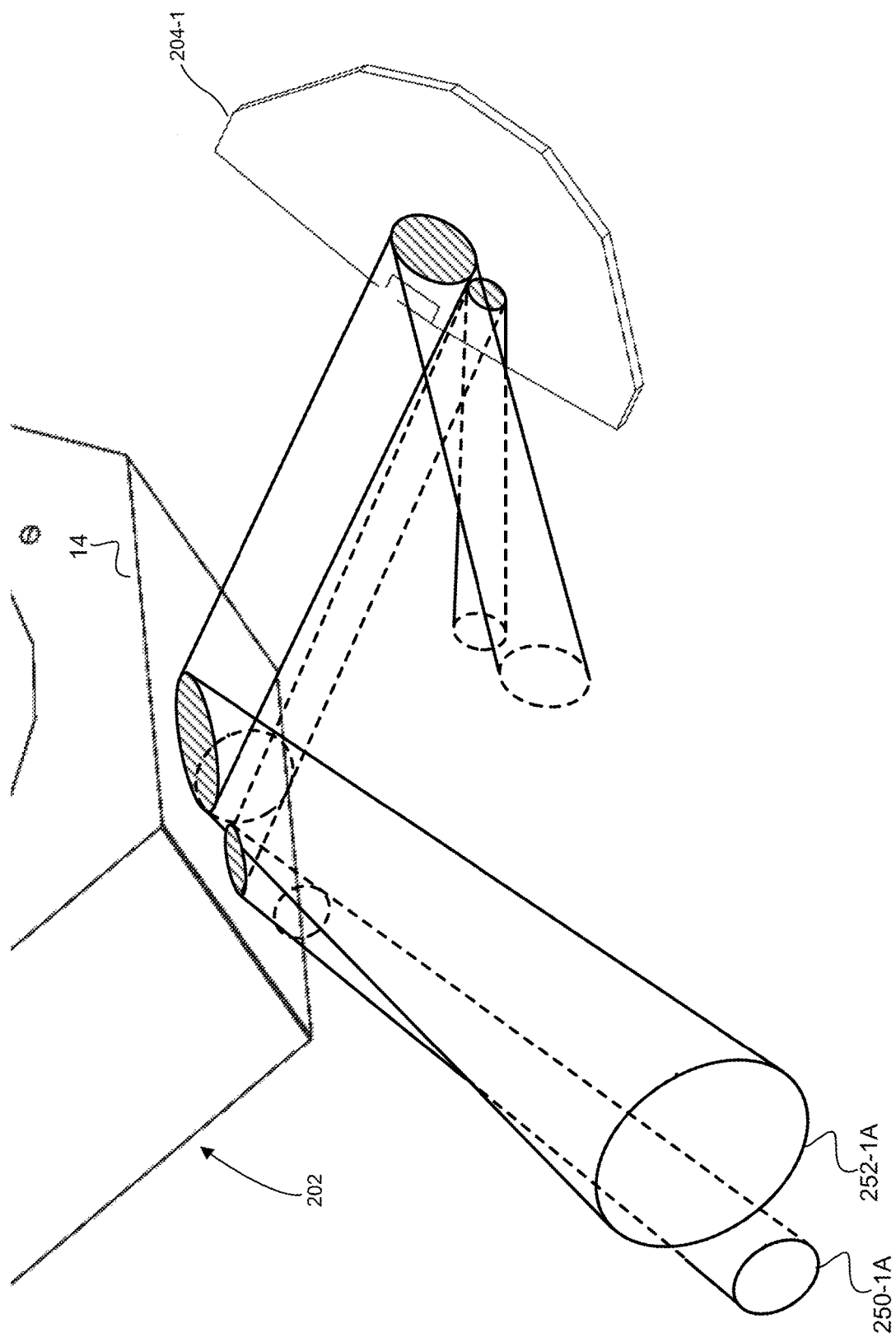
FIG. 13 is perspective view of paths of an input beam and output beams relative to the scan mirror and the polygon mirror of the lidar system of this disclosure, according to one implementations.
Figure 14:
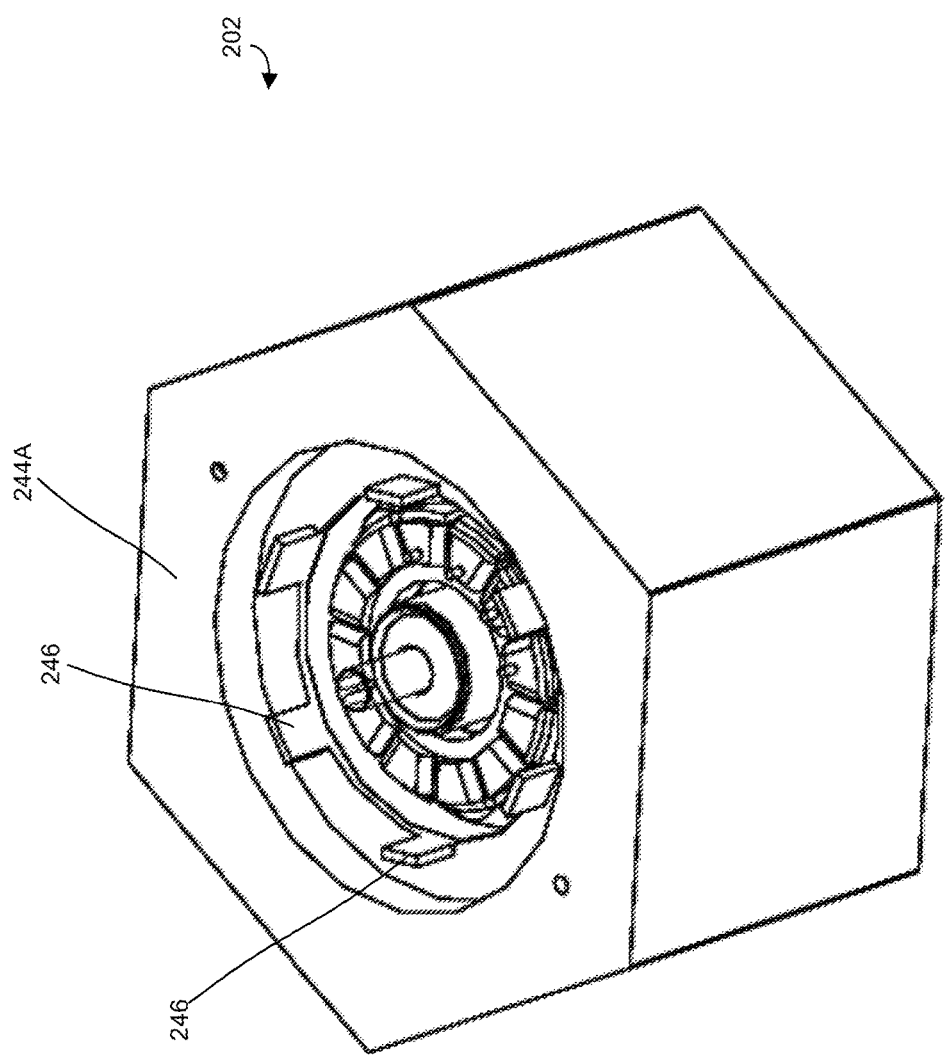
FIG. 14 is a top perspective view of the polygon mirror of the lidar system of FIGS. 6A-B, implemented as a block with reflective surfaces and an embedded stator.

In the scenario of FIGS. 12 and 13, the input beam 252-1A first impinges on one of the reflective surfaces of the polygon mirror 202, which reflects the input beam 252-1A toward the reflective surface of the scan mirror 204-1, which in turn reflects the input beam 102B toward the stationary mirror 208-1. The stationary mirror 208-1 then directs the input beam 252-1A toward the receiver lens 210-1, which focuses the input beam 252-1A on the active region (detector) 230-1A of the receiver 214-1. For a given operational state, the current orientation of the polygon mirror 202 defines the horizontal position of the receiver field of view $FOV_R$ within the FOR of lidar system 10E, and the current orientation of the scan mirror 204-1 defines the vertical position of the $FOV_R$ within the FOR. The input beam 252-1B in meantime impinges on the same reflective surface of the polygon mirror 202 at a different location than the input beam 252-1A, and impinges on the reflective surface of the scan mirror 204-1 at a different location than the input beam 252-1B.

Output beams associated with the same eye according to these implementations are scanned synchronously because these beams reflect off the same surfaces of the mirrors 202 and 204-1. In other words, the output beams are scanned at the same scanning rate across the field of regard, and the corresponding input beams maintain the same angular separation. In addition to the two output beams being scanned synchronously with respect to each other, each receiver FOV is also scanned synchronously with its respective light-source FOV. Further, output associated with different eyes also can be scanned at the same scanning rate across the field of regard, provided the scan mirrors 204-1 and 204-2 are properly synchronized. For example, both the output beams can scan horizontally across the field of regard at approximately 600 radians/sec, and the two output beams of the first eye may have a substantially fixed angular separation of approximately 20 degrees from the two output beams of the second eye.

The lidar system 10E can use the input beams 252-1A and 252-1B, associated with the same eye, to generate two pixels during the same ranging event, with an integer or non-integer separation between the pixels. The lidar system 10E thus can produce the total of four pixels per ranging event using two eyes.

As a more specific example, a DOE or another suitable element can impart to a pulse of light a relatively small angular separation into pulses of wavelengths $\lambda_1$ and $\lambda_2$, so that the distance between the light pulses of wavelengths $\lambda_1$ and $\lambda_2$ at the maximum range of the lidar system corresponds to the width of multiple pixels.

FIG. 13 illustrates an example spatial arrangement of the fields of view of the input beam 102A and output beam 250-1A and the input beam 252-1A. The output beams are mechanically aimed so as to minimize the resulting "footprints" on the scan mirrors and the polygon mirror. Thus, the footprints of the beams 250-1A and 252-1A are adjacent or nearly adjacent to each other on the reflective surfaces of the mirrors 204-1 and 202. Further, in accordance with off-axis illumination techniques, output beams associated with the same eye (e.g., the beams 250-1A and 250-1B) are directed at a reflective surfaces of the mirrors so as to be not entirely coaxial with the corresponding input beams, as illustrated in FIG. 13.

Reducing Acoustic Noise in a Lidar System

Figure 11:
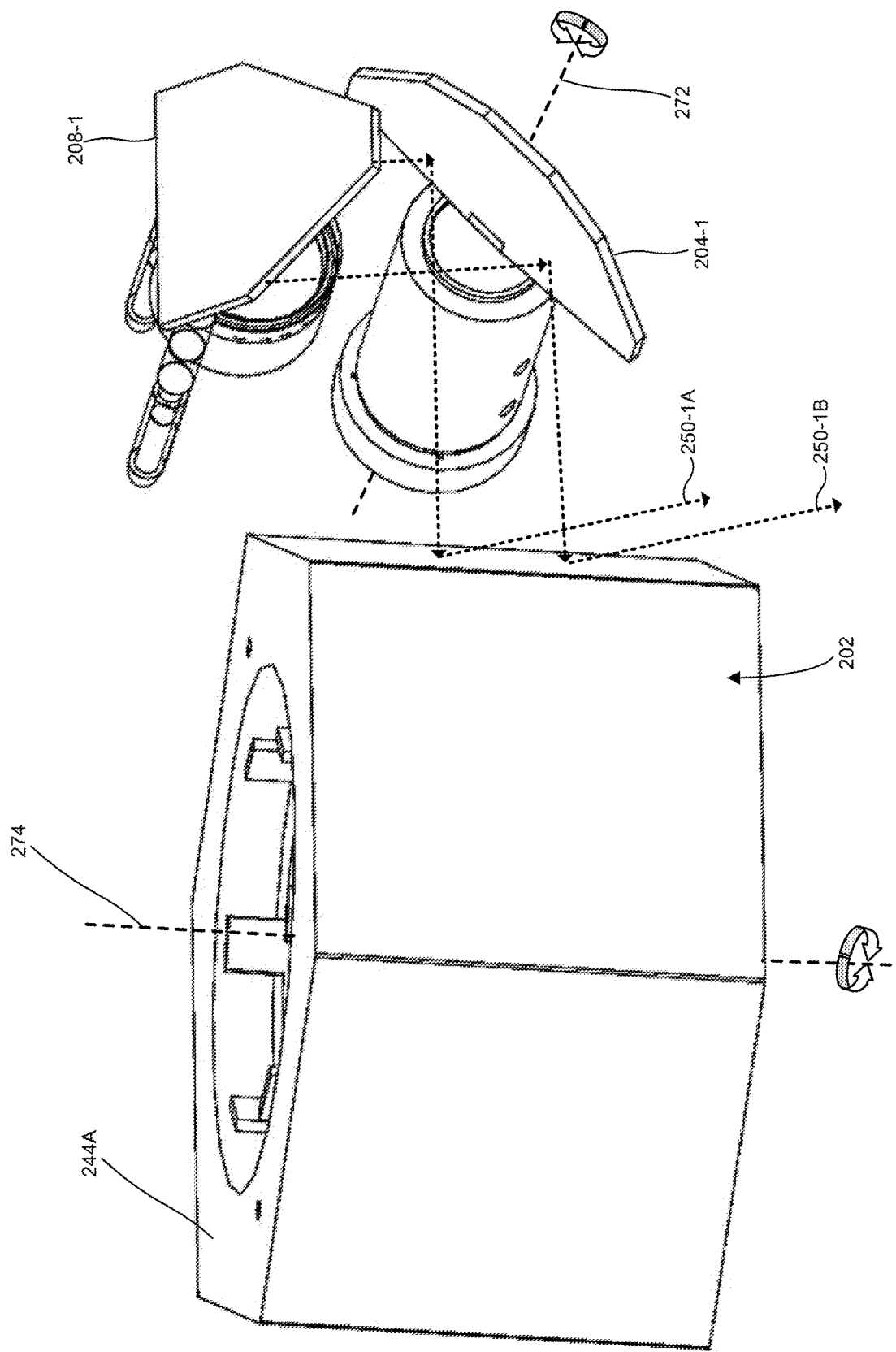
FIG. 11 is a front perspective view of the components of FIG. 8 along with the polygon mirror, with paths of output beams schematically illustrated over the perspective view.

In operation, the polygon mirror 202 rotates at a relatively high rate (e.g., at about 150 Hz, or 9000 rpm) and accordingly generates a significant amount of acoustic noise. In particular, the reflective surfaces 242A, 242B, etc. and the corners between pairs of reflective generate pressure waves as the polygon mirror 202 rotates, and these pressure waves hit components within the housing as well as the interior walls of the housing. The bracket 260A of FIG. 17 encloses the polygon mirror 202 only partially because one or more reflective surfaces must be exposed to input and output beams, as illustrated in FIGS. 7, 8, 11, etc. Thus, although the interior wall of the cavity 262 can define a concave wall that creates a substantially laminar flow within the portion of the bracket 260A, the pressure waves generate acoustic noise when hitting the edges 265-1 and 265-2.

Figure 21:
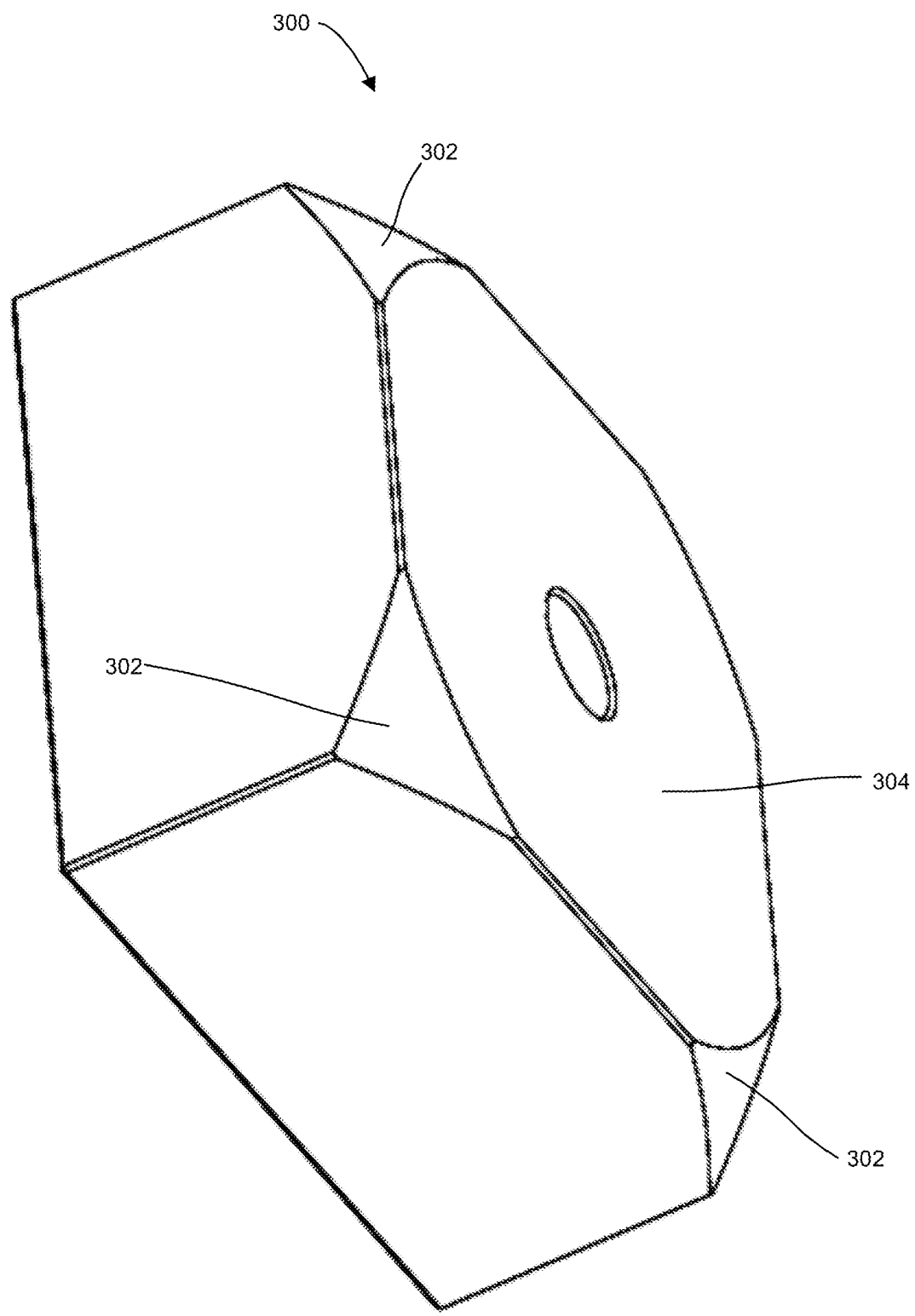
FIG. 21 is a perspective view of another polygon mirror that can be used in a lidar system similar to the lidar system of FIGS. 6A-B to reduce acoustic noise.

According to one approach, the lidar system 10E or a similar system can include a polygon mirror 300 of FIG. 21. The polygon mirror 300 includes a block with adjacent reflective surfaces joined to one another along a drag-reducing, non-sharp edge to promote aerodynamic efficiency and reduce acoustic noise. In the example of FIG. 21, the block includes rounded or chamfered edges or corners bounded by a pair of adjacent reflective surfaces and a non-reflective wall 304. Each of these chamfers 302 is preferably cut at an angle of 45° to the adjacent finished reflective surfaces and the wall 304. However, the chamfers may be formed at a different angle to these adjacent surfaces. As another example, the block may include edges with texturing, grooves, riblets, or a sawtooth pattern. Although the polygon mirror 300 is illustrated with four reflective surfaces, the polygon mirror 300 in general can include any suitable number of reflective surfaces.

Although the geometry of the polygon mirror 300 reduces the amount of acoustic noise generated during operation of the lidar system, the chamfered or rounded corners reduce the amount of reflective surface available to the scanner. The polygon mirror 300 can be increased in size, but that of course results in a larger profile of the overall lidar system.

FIG. 22 illustrates a bracket 260B that is generally similar to the bracket 260A of FIG. 17. However, the bracket 260B includes tapered (or "chevron") features 310 at one or both edges of the cavity 262 that accommodates a polygon mirror. FIG. 22 illustrates several such features, but in general, an edge of the cavity 262 can include one or several tapered features 310. For clarity, FIG. 23 illustrates the polygon mirror 202 positioned within the bracket 260B. The bracket 260B partially encloses the polygon mirror 202. An arrow 320 in FIG. 22 illustrates the direction in which the polygon mirror 202 rotates, in an example implementation of the scanner. In some implementations, the bracket 260B can be integral with the housing enclosing the lidar system or the sensor head or, conversely, the bracket 260B can be made up of multiple components.

Figure 24:
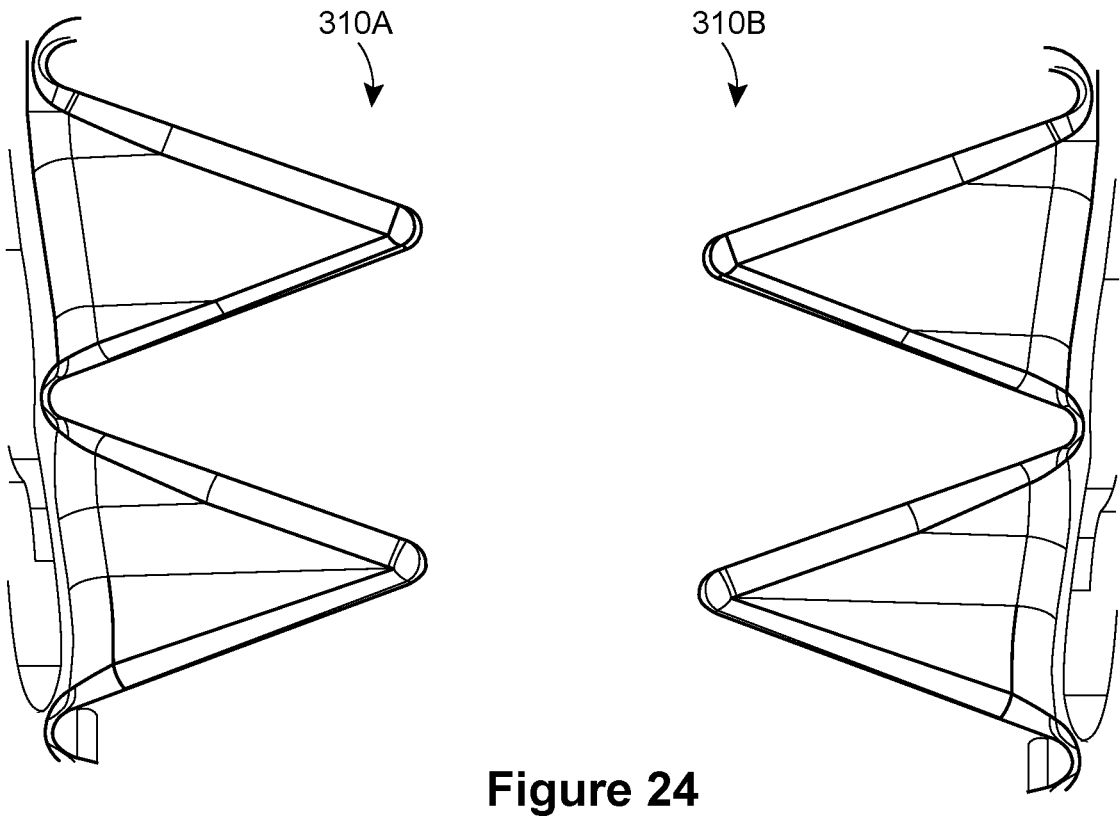
FIG. 24 illustrates in more detail the tapered noise-reducing features of FIG. 23.
Figure 25:
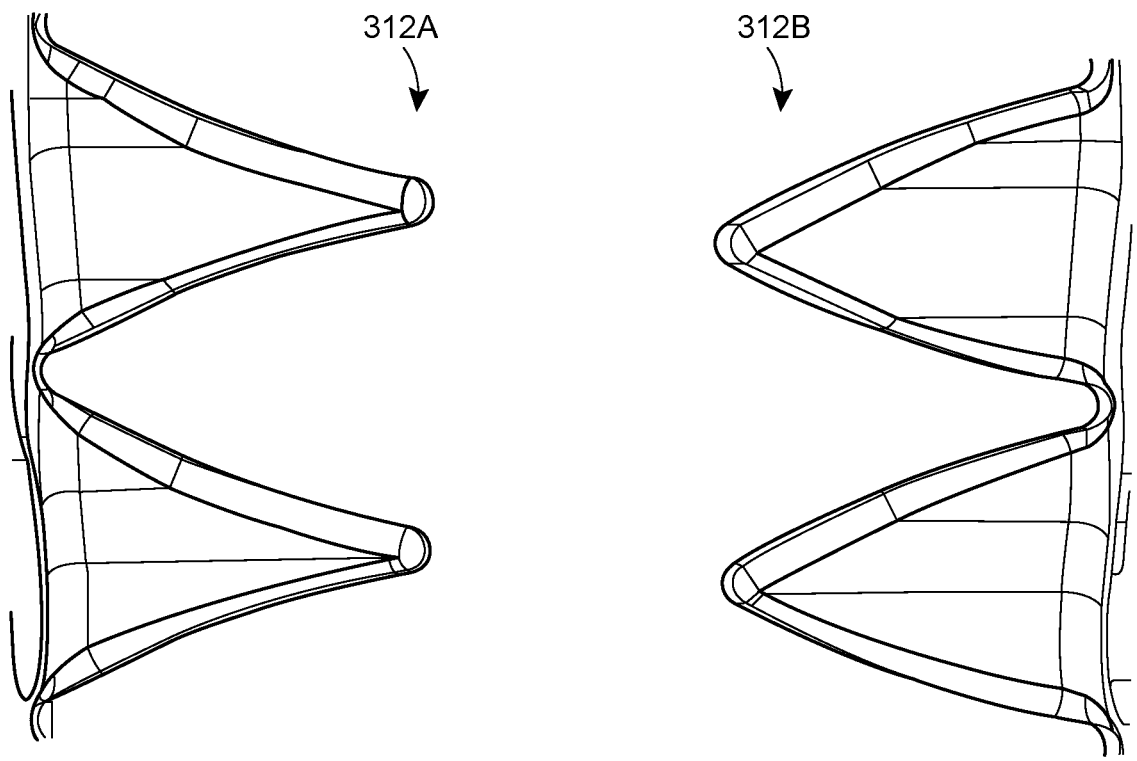
FIG. 25 illustrates another example implementation of the tapered noise-reducing features.

FIG. 24 illustrates the tapered features 310 in more detail. The tapered features 310A are disposed on the left side of the bracket 260B, and the tapered features 310B are disposed on the right side of the bracket 260B. The tapered features 310A and 310B are shaped as triangles with straight edges. In this example implementation, the tapered features 310A and 310B are shaped the same. In another implementation illustrated in FIG. 25, tapered features 312A and 312B are shaped as pseudo-triangles with concave (312A) or convex (312B) edges. Further, in the example implementation of FIG. 25, different tapered features are provided on the opposite sides of the corresponding bracket: for example, the tapered features 312A can be disposed on the left side of the bracket 260B, and tapered features 312B can be disposed on the right side of the bracket 260B. However, in other implementations that involve tapered features shaped as pseudo-triangles, the tapered features on both sides can have convex edges, or the tapered features on both sides can have concave edges. The tapered features 310 are disposed on the edges of the cavity 262 to "face" pressure waves generated by the polygon mirror 202 so as to effectively spread out the pressure waves in time instead of producing a sudden impulse. In particular, the shape of the tapered features 310 causes different parts of a pressure wave to hit different parts of the bracket and/or housing at different times. Experiments have shown that the tapered features 310 provide a 3 dB reduction in noise produced by the polygon mirror.

In other implementations, a bracket partially enclosing the polygon mirror 202 has noise-reducing features shaped differently that the tapered features 310, but in any case causing an incident pressure wave to hit different parts of the bracket at different times. For example, the noise-reducing features can be rounded protrusions from the edge of the cavity 216. Further, the number of chevrons or other protrusions can vary in different implementations.

In some implementations, the tapered features 310 are oriented as illustrated in FIGS. 22 and 23 only in the direction opposite to that indicated by the arrow 320 (the direction of the pressure waves), and are oriented in the opposite direction on the opposite edge of the cavity 262. The direction and/or shape of the noise-reducing features thus can be selected in accordance with the direction of the pressure waves. As another alternative, the tapered features 310 can be provided on only edge of the cavity 262.

Figure 26:
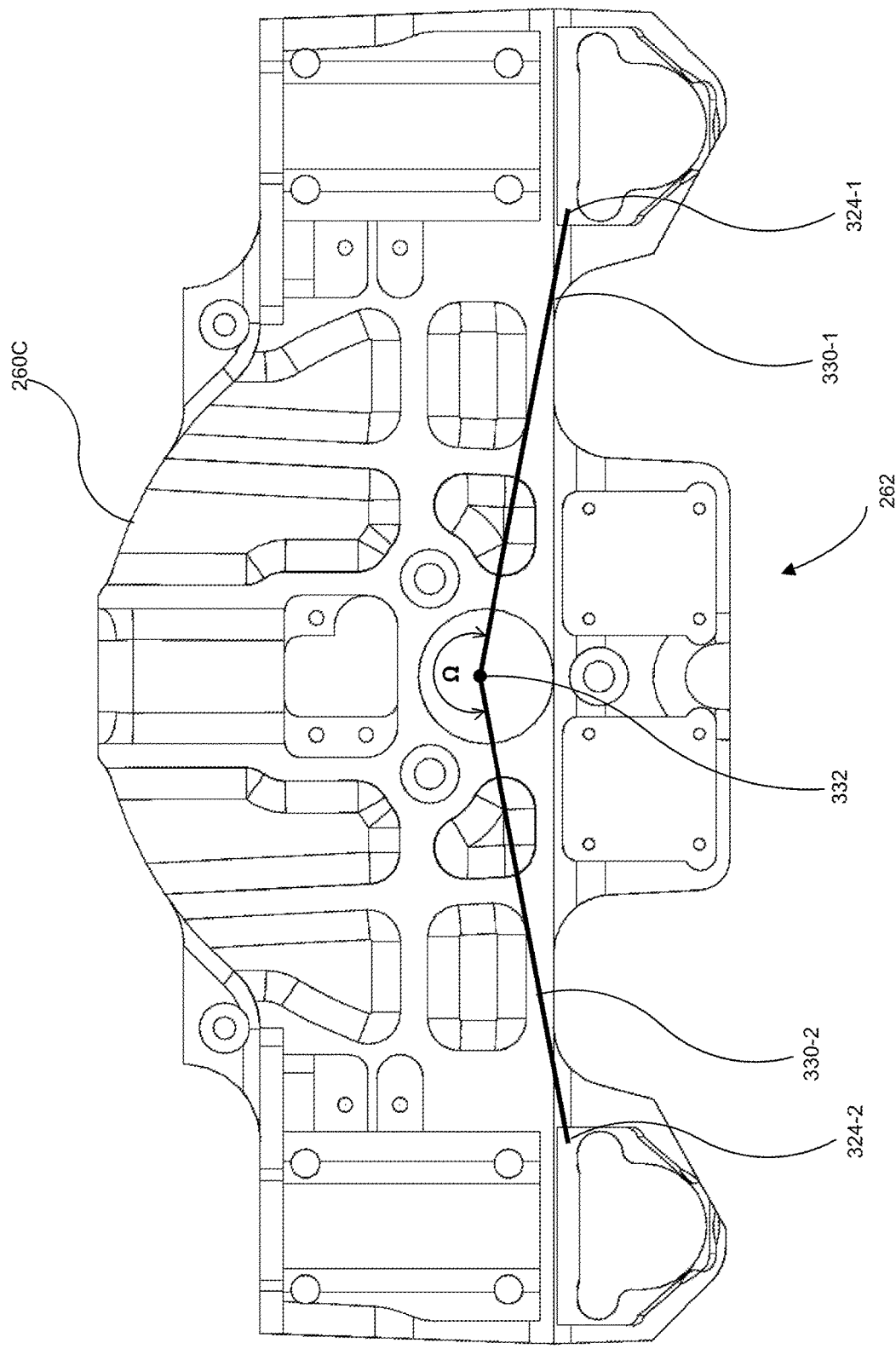
FIG. 26 is a top view of the bracket of FIG. 22, with an indication of where the tapered features are placed in one of the implementations of the bracket.

Experiments further have shown that the locations of edges of the cavity partially enclosing the polygon mirror, relative to the edges the polygon mirror and thus to pressure waves, also have an impact on the amount of acoustic noise. FIG. 26 illustrates a top view of a bracket 260C in which edges 324-1 and 324-2 of the cavity 262 are placed so as to reduce the amount of acoustic noise. The bracket 260C is generally similar to the bracket 260B discussed above. A polygon mirror rotates around a polygon-mirror rotation axis 332. Segments of lines 330-1 and 330-2 are drawn from the point where the polygon-mirror rotation axis 332 intersects the plane of FIG. 26 to the right and left edges 324-1 and 324-2. These lines are virtual and are provided for clarity. As schematically illustrated in FIG. 26, the lines 324-1 and 324-2 form an angle $\Omega$.

In operation, a pressure wave each edge/corner of the polygon mirror rotating about the polygon-mirror rotation axis 332 produces pressure waves which in turn produce acoustic noise or impulses when they hit the edges 324-1 and 324-2. When the edges 324-1 and 324-2 are located at the "wrong" position, the acoustic impulses can add together in phase and produce a larger amount of acoustic noise. If, on the other hand, the edges 324-1 and 324-2 are located in an optimal position, the acoustic impulses are out of phase with one another, which greatly reduces the noise.

The "wrong" position of the edges 324-1 and 324-2 corresponds to the angle $\Omega=(360/N)*m$, where N is the number of sides (reflective surfaces) of the polygon mirror, and m is an integer. When this equality is satisfied, two pressure waves from two different parts of the polygon mirror are "in phase" and hit the left and right edges at the same time. Thus, for the hexagonal polygon mirror 202 (N=6), the "wrong" angles include 60, 120, and 180 degrees. Similarly, some of the "good" angles for the polygon mirror 202 can be expressed as angle $\Omega=(360/N)*(m+\frac{1}{3})$. Thus, for N=6, the "good" angles are 60 m+20 degrees, or 80, 140, and 200 degrees. In this case, the two pressure waves are out of phase, so each pressure wave hits an edge at different times. The "good" angles however can vary at least in view of the overall shape of the interior of the bracket 260C and/or the shapes of other components disposed within the housing 248 (see FIG. 18).

The angle at which the edges 324-1 and 324-2 are spaced apart along the lines 330-1 and 330-2 can be used with non-tapered, substantially vertical edges 265-1 and 265-2 of the bracket 260A, or the selection of the angle can be combined with the tapered features 310 of FIGS. 22 and 23. Further, these techniques can be further combined with other techniques for reducing noise, such as using noise-reducing materials such as foam inside the housing 248 (see FIG. 18).

However, these additional techniques can result in an increase of the overall profile of the housing 248, the increase in cost, etc.

Overlapping Fields of Regard in a Lidar System

Referring back to FIG. 6A, the scanner of the lidar system 10E can scan each of the first pair of output beams and the second pair of output beams so as to define a respective field of regard approximately 60 degrees wide. Depending on the implementation, the fields of regard can have a relatively large overlap (e.g., 20 degrees, 30 degrees, 40 degrees), a relatively small overlap (e.g., one degree, two degrees, three degrees, four degrees, five degrees), or no overlap. The lidar system 10E in some implementations can dynamically modify the fields of regard.

Figure 27:
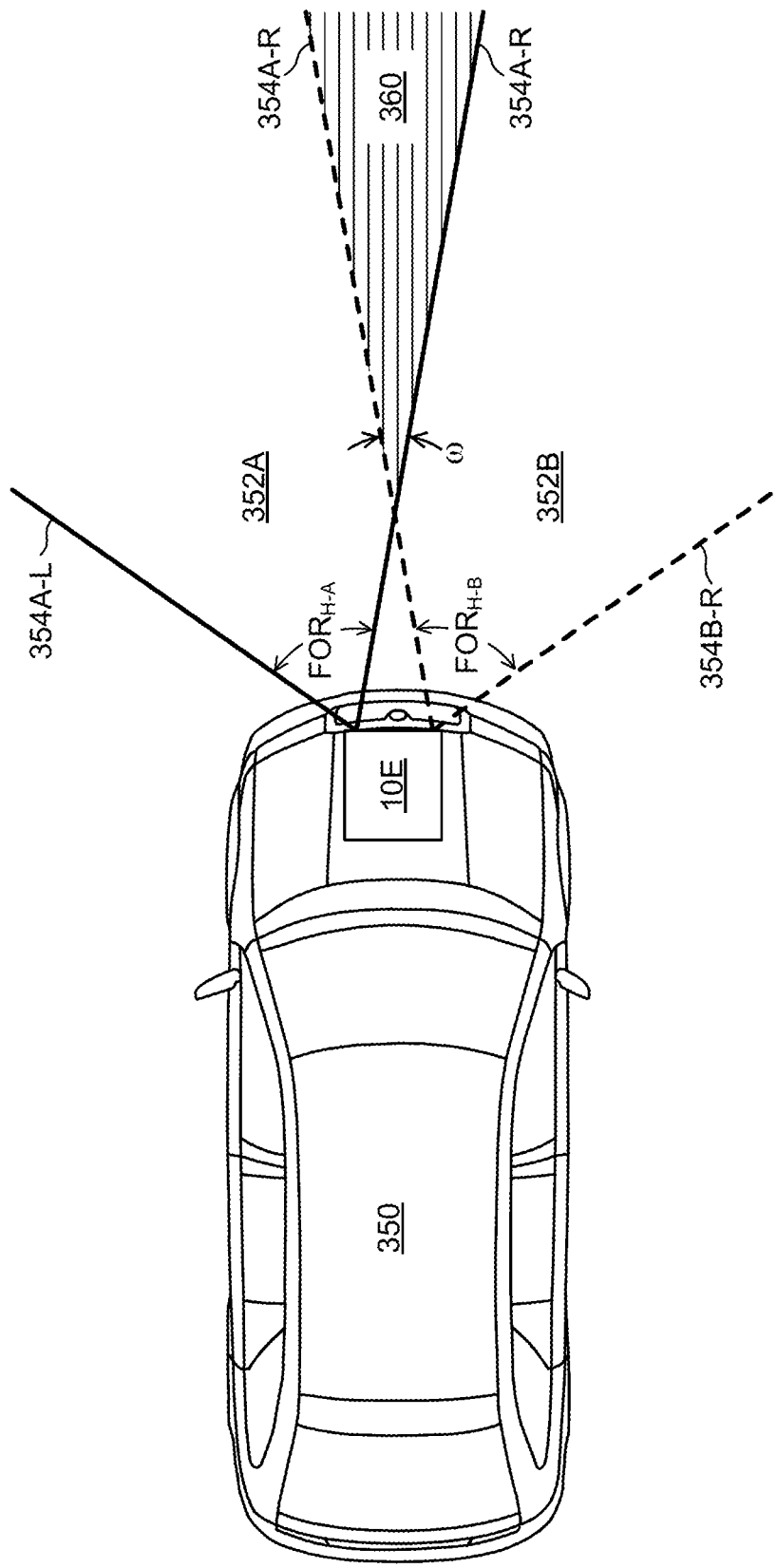
FIG. 27 illustrates partially overlapping fields of regard the lidar system of this disclosure can generate in the two-eye configuration, in an example implementation in a vehicle

The overlap region may be oriented in a direction of travel of a vehicle on which the lidar system 10E is deployed. For example, referring to FIG. 27, an instance of the lidar system 10E can be positioned at the center of vehicle 350, near the front. The first eye of the lidar system 10E scans the FOR region 352A between boundaries 354A-L and 354A-R, and the second eye scans the FOR region 352B between boundaries 354B-L and 354B-R. Together, the regions 352A and 352B define the FOR of the lidar system 10E, with an overlap region 360. In various embodiments, the overlap region 360 can correspond to angular overlap between the FOR regions 352A and 352B of between 0° and 40°.

Example Implementation of a Detector

Figure 28:
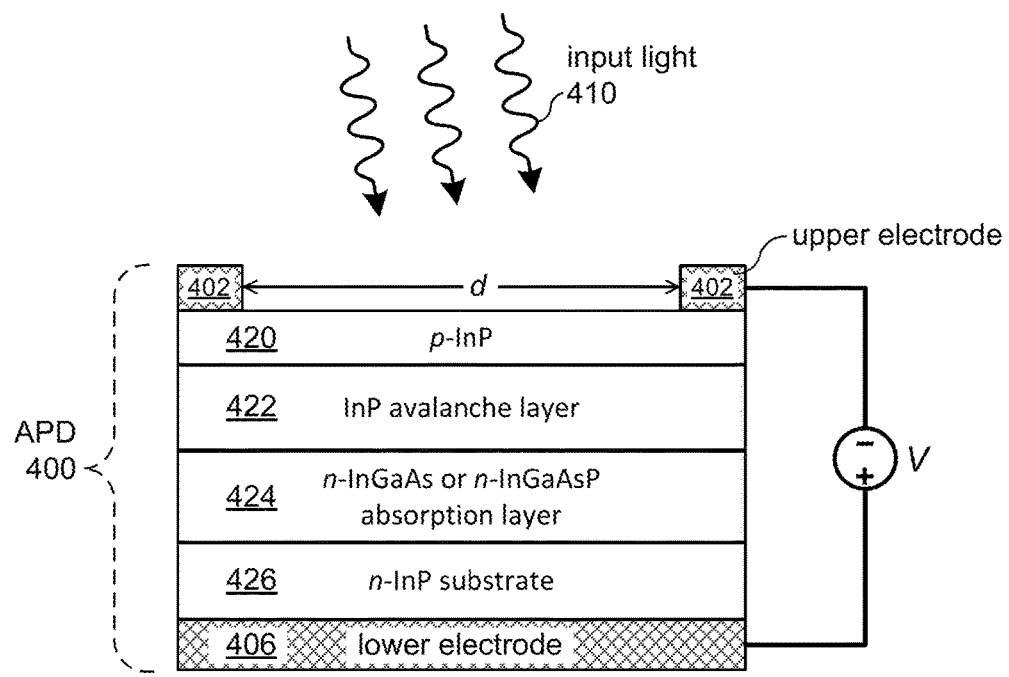
FIG. 28 illustrates an example InGaAs avalanche photodiode which can operate in a lidar system.

FIG. 28 illustrates an example InGaAs avalanche photodiode (APD) 400. A receiver of lidar system 10 or 10A-E may include one or more APDs 400 configured to receive and detect light from input light such as the beam 252-1A, for example. More generally, the APD 400 can operate in any suitable receiver of input light. The APD 400 may be configured to detect a portion of pulses of light which are scattered by a target located downrange from the lidar system in which the APD 400 operates. For example, the APD 400 may receive a portion of a pulse of light scattered by the target 30 depicted in FIGS. 1 and 2, and generate an electrical-current signal corresponding to the received pulse of light.

The APD 400 may include doped or undoped layers of any suitable semiconductor material, such as for example, silicon, germanium, InGaAs, InGaAsP, or indium phosphide (InP). Additionally, the APD 400 may include an upper electrode 402 and a lower electrode 406 for coupling the ADP 400 to an electrical circuit. The APD 400 for example may be electrically coupled to a voltage source that supplies a reverse-bias voltage V to the APD 400. Additionally, the APD 400 may be electrically coupled to a transimpedance amplifier which receives electrical current generated by the APD 400 and produces an output voltage signal that corresponds to the received current. The upper electrode 402 or lower electrode 406 may include any suitable electrically conductive material, such as for example a metal (e.g., gold, copper, silver, or aluminum), a transparent conductive oxide (e.g., indium tin oxide), a carbon-nanotube material, or polysilicon. In some implementations, the upper electrode 402 is partially transparent or has an opening to allow input light 410 to pass through to the active region of the APD 400. In FIG. 28, the upper electrode 402 may have a ring shape that at least partially surrounds the active region of the APD 400, where the active region refers to an area over which the APD 200 may receive and detect the input light 410. The active region may have any suitable size or diameter d, such as for example, a diameter of approximately 25 μm, 50 μm, 80 μm, 100 μm, 200 μm, 500 μm, 1 mm, 2 mm, or 5 mm.

The APD 400 may include any suitable combination of any suitable semiconductor layers having any suitable doping (e.g., n-doped, p-doped, or intrinsic undoped material). In the example of FIG. 28, the InGaAs APD 400 includes a p-doped InP layer 420, an InP avalanche layer 422, an absorption layer 424 with n-doped InGaAs or InGaAsP, and an n-doped InP substrate layer 426. Depending on the implementation, the APD 400 may include separate absorption and avalanche layers, or a single layer may act as both an absorption and avalanche region. The APD 400 may operate electrically as a PN diode or a PIN diode, and, during operation, the APD 400 may be reverse-biased with a positive voltage V applied to the lower electrode 406 with respect to the upper electrode 402. The applied reverse-bias voltage V may have any suitable value, such as for example approximately 5 V, 10 V, 20 V, 30 V, 50 V, 75 V, 100 V, or 200 V.

In FIG. 28, photons of the input light 410 may be absorbed primarily in the absorption layer 224, resulting in the generation of electron-hole pairs (which may be referred to as photo-generated carriers). For example, the absorption layer 424 may be configured to absorb photons corresponding to the operating wavelength of the lidar system 10E (e.g., any suitable wavelength between approximately 1200 nm and approximately 1600 nm). In the avalanche layer 422, an avalanche-multiplication process occurs where carriers (e.g., electrons or holes) generated in the absorption layer 424 collide with the semiconductor lattice of the absorption layer 424, and produce additional carriers through impact ionization. This avalanche process can repeat numerous times so that one photo-generated carrier may result in the generation of multiple carriers. As an example, a single photon absorbed in the absorption layer 424 may lead to the generation of approximately 10, 50, 100, 200, 500, 1000, 10,000, or any other suitable number of carriers through an avalanche-multiplication process. The carriers generated in an APD 400 may produce an electrical current that is coupled to an electrical circuit which may perform signal amplification, sampling, filtering, signal conditioning, analog-to-digital conversion, time-to-digital conversion, pulse detection, threshold detection, rising-edge detection, or falling-edge detection.

The number of carriers generated from a single photo-generated carrier may increase as the applied reverse bias V is increased. If the applied reverse bias V is increased above a particular value referred to as the APD breakdown voltage, then a single carrier can trigger a self-sustaining avalanche process (e.g., the output of the APD 400 is saturated regardless of the input light level). The APD 400 that is operated at or above a breakdown voltage may be referred to as a single-photon avalanche diode (SPAD) and may be referred to as operating in a Geiger mode or a photon-counting mode. The APD 400 that is operated below a breakdown voltage may be referred to as a linear APD, and the output current generated by the APD 400 may be sent to an amplifier circuit (e.g., a transimpedance amplifier). The receiver of the lidar system may include an APD configured to operate as a SPAD and a quenching circuit configured to reduce a reverse-bias voltage applied to the SPAD when an avalanche event occurs in the SPAD. The APD 400 configured to operate as a SPAD may be coupled to an electronic quenching circuit that reduces the applied voltage V below the breakdown voltage when an avalanche-detection event occurs. Reducing the applied voltage may halt the avalanche process, and the applied reverse-bias voltage may then be re-set to await a subsequent avalanche event. Additionally, the APD 400 may be coupled to a circuit that generates an electrical output pulse or edge when an avalanche event occurs.

In some implementations, the APD 400 or the APD 400 along with transimpedance amplifier have a noise-equivalent power (NEP) that is less than or equal to 100 photons, 50 photons, 30 photons, 20 photons, or 10 photons. For example, the APD 400 may be operated as a SPAD and may have a NEP of less than or equal to 20 photons. As another example, the APD 400 may be coupled to a transimpedance amplifier that produces an output voltage signal with a NEP of less than or equal to 50 photons. The NEP of the APD 400 is a metric that quantifies the sensitivity of the APD 400 in terms of a minimum signal (or a minimum number of photons) that the APD 400 can detect. The NEP may correspond to an optical power (or to a number of photons) that results in a signal-to-noise ratio of 1, or the NEP may represent a threshold number of photons above which an optical signal may be detected. For example, if the APD 400 has a NEP of 20 photons, then an input beam with 20 photons may be detected with a signal-to-noise ratio of approximately 1 (e.g., the APD 200 may receive 20 photons from the input beam 410 and generate an electrical signal representing the input beam 410 that has a signal-to-noise ratio of approximately 1). Similarly, an input beam with 100 photons may be detected with a signal-to-noise ratio of approximately 5. In some implementations, the lidar system 10E with the APD 400 (or a combination of the APD 400 and transimpedance amplifier) having a NEP of less than or equal to 100 photons, 50 photons, 30 photons, 20 photons, or 10 photons offers improved detection sensitivity with respect to a conventional lidar system that uses a PN or PIN photodiode. For example, an InGaAs PIN photodiode used in a conventional lidar system may have a NEP of approximately $10^4$ to $10^5$ photons, and the noise level in a lidar system with an InGaAs PIN photodiode may be $10^3$ to $10^4$ times greater than the noise level in the lidar system with the InGaAs APD detector 40.

An optical filter may be located in front of the receiver of lidar system and configured to transmit light at one or more operating wavelengths of the corresponding light source 1 and attenuate light at surrounding wavelengths. For example, an optical filter may be a free-space spectral filter located in front of APD 400. This spectral filter may transmit light at the operating wavelength of the light source (e.g., between approximately 1530 nm and 1560 nm) and attenuate light outside that wavelength range. As a more specific example, light with wavelengths of approximately 200-1530 nm or 1560-2000 nm may be attenuated by any suitable amount, such as for example, by at least 5 dB, 10 dB, 20 dB, 30 dB, or 40 dB.

Figure 29:
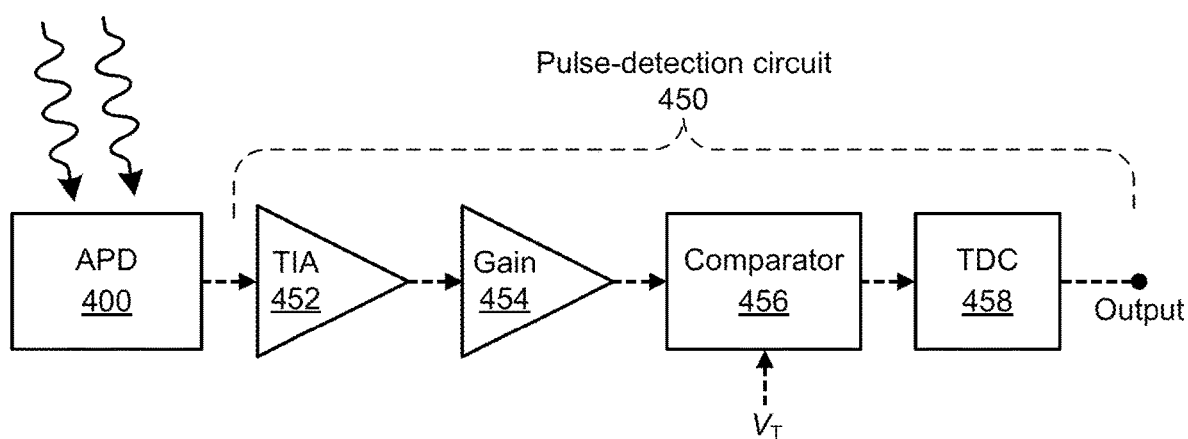
FIG. 29 illustrates an example photodiode coupled to a pulse-detection circuit, which can operate in a lidar system.

Next, FIG. 29 illustrates the APD 400 of FIG. 28 coupled to an example pulse-detection circuit 450. The pulse-detection circuit 450 can operate in the receivers 241-1 and 241-2 of the lidar system 10E, in the receivers of the lidar systems of FIGS. 1-5, or in any other suitable receiver. The pulse-detection circuit 450 alternatively can be implemented in a controller of a lidar system, such as the controller 205 of FIG. 6B. In some implementations, parts of the pulse-detection circuit 450 can operate in a receiver and other parts of the pulse-detection circuit 450 can operate in a controller. For example, components 452 and 454 may be a part of the receiver 140, and components 456 and 458 may be a part of the controller.

The pulse-detection circuit 450 may include circuitry that receives a signal from a detector (e.g., an electrical current from the APD 400) and performs current-to-voltage conversion, signal amplification, sampling, filtering, signal conditioning, analog-to-digital conversion, time-to-digital conversion, pulse detection, threshold detection, rising-edge detection, or falling-edge detection. The pulse-detection circuit 450 may determine whether an optical pulse has been received by the APD 400 or may determine a time associated with receipt of an optical pulse by the APD 400. Additionally, the pulse-detection circuit 450 may determine a duration of a received optical pulse. In an example implementation, the pulse-detection circuit 450 includes a transimpedance amplifier (TIA) 452, a gain circuit 454, a comparator 456, and a time-to-digital converter (TDC) 458.

The TIA 452 may be configured to receive an electrical-current signal from the APD 400 and produce a voltage signal that corresponds to the received electrical-current signal. For example, in response to a received optical pulse, the APD 400 may produce a current pulse corresponding to the optical pulse. The TIA 452 may receive the current pulse from the APD 400 and produce a voltage pulse that corresponds to the received current pulse. The TIA 452 may also act as an electronic filter. For example, the TIA 452 may be configured as a low-pass filter that removes or attenuates high-frequency electrical noise by attenuating signals above a particular frequency (e.g., above 1 MHz, 10 MHz, 20 MHz, 50 MHz, 100 MHz, 200 MHz, or any other suitable frequency).

The gain circuit 454 may be configured to amplify a voltage signal. As an example, the gain circuit 454 may include one or more voltage-amplification stages that amplify a voltage signal received from the TIA 452. For example, the gain circuit 454 may receive a voltage pulse from the TIA 452, and the gain circuit 454 may amplify the voltage pulse by any suitable amount, such as for example, by a gain of approximately 3 dB, 10 dB, 20 dB, 30 dB, 40 dB, or 50 dB. Additionally, the gain circuit 454 may also act as an electronic filter configured to remove or attenuate electrical noise.

The comparator 456 may be configured to receive a voltage signal from the TIA 452 or the gain circuit 454 and produce an electrical-edge signal (e.g., a rising edge or a falling edge) when the received voltage signal rises above or falls below a particular threshold voltage $V_T$. As an example, when a received voltage rises above $V_T$, the comparator 456 may produce a rising-edge digital-voltage signal (e.g., a signal that steps from approximately 0 V to approximately 2.5 V, 3.3 V, 5 V, or any other suitable digital-high level). As another example, when a received voltage falls below $V_T$, the comparator 456 may produce a falling-edge digital-voltage signal (e.g., a signal that steps down from approximately 2.5 V, 3.3 V, 5 V, or any other suitable digital-high level to approximately 0 V). The voltage signal received by the comparator 456 may be received from the TIA 452 or the gain circuit 454 and may correspond to an electrical-current signal generated by the APD 400. For example, the voltage signal received by the comparator 456 may include a voltage pulse that corresponds to an electrical-current pulse produced by the APD 400 in response to receiving an optical pulse. The voltage signal received by the comparator 456 may be an analog signal, and an electrical-edge signal produced by the comparator 456 may be a digital signal.

The time-to-digital converter (TDC) 458 may be configured to receive an electrical-edge signal from the comparator 456 and determine an interval of time between emission of a pulse of light by the light source and receipt of the electrical-edge signal. The output of the TDC 458 may be a numerical value that corresponds to the time interval determined by the TDC 458. In some implementations, the TDC 458 has an internal counter or clock with any suitable period, such as for example, 5 ps, 10 ps, 15 ps, 20 ps, 30 ps, 50 ps, 100 ps, 0.5 ns, 1 ns, 2 ns, 5 ns, or 10 ns. The TDC 458 for example may have an internal counter or clock with a 20 ps period, and the TDC 458 may determine that an interval of time between emission and receipt of a pulse is equal to 25,000 time periods, which corresponds to a time interval of approximately 0.5 microseconds. The TDC 458 may send the numerical value "25000" to a processor or controller of the lidar system 10E, which may include a processor configured to determine a distance from the lidar system 10E to a remote target based at least in part on an interval of time determined by a TDC 458. The processor may receive a numerical value (e.g., "25000") from the TDC 458 and, based on the received value, the processor may determine the distance from the lidar system to the target.

Implementation of a Lidar System in a Vehicle

Depending on where a lidar system is mounted on a vehicle, one or more of the surfaces of the housing could coincide with an external or interior surface of a vehicle. Example surfaces include a hood, a quarter-panel, a side view mirror housing, a trunk lid, grill, headlamp or tail light housing, dashboard, vehicle roof, front bumper, rear bumper, or other vehicle body part surface. When provided in a vulnerable location of a vehicle, such as a front or rear bumper, the front or rear bumper may be fortified or reinforced with additional force resistance or force dampening features to protect sensitive components of the lidar system from damage. The low profile of the lidar system 10E discussed above, for example, lends itself to being strategically located at optimal locations of a vehicle body without detracting from the aesthetic appearance of the vehicle. For example, several lidar systems 10E may be disposed one at each front corner, or even one at each of all four corners, of a vehicle roof, with the majority of the volume occupied by the lidar systems embedded within the roof, so that only a window of the unit protrudes prominently of the vehicle roof (or other vehicle surface in which the lidar sensor unit 10 is embedded).

As discussed above, the housing 248 can enclose a sensor head only or an entire lidar system. The housing 248 can be mounted on the roof of a vehicle so that only the upper portion of the housing 248 protrudes prominently above the surface, and the other portion is "submerged" under the surface. The size of the submerged portion can be larger than the protruding portion, in some of the implementations, to reduce aerodynamic drag.

In general, any suitable number of lidar sensor units (sensor heads) may be integrated into a vehicle. In one example implementation, multiple lidar sensor units, operating in a lidar system similar to the system 10 or 10A-E, may be integrated into a car to provide a complete 360-degree horizontal FOR around the car. As another example, 4-10 lidar sensor units, each system having a 45-degree to 90-degree horizontal FOR, may be combined together to form a sensing system that provides a point cloud covering a 360-degree horizontal FOR. The lidar sensor units may be oriented so that adjacent FORs have an amount of spatial or angular overlap to allow data from the multiple lidar sensor units to be combined or stitched together to form a single or continuous 360-degree point cloud. As an example, the FOR of each lidar sensor unit may have approximately 1-15 degrees of overlap with an adjacent FOR.

In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), or spacecraft. In particular embodiments, a vehicle may include an internal combustion engine or an electric motor that provides propulsion for the vehicle.

Figure 30:
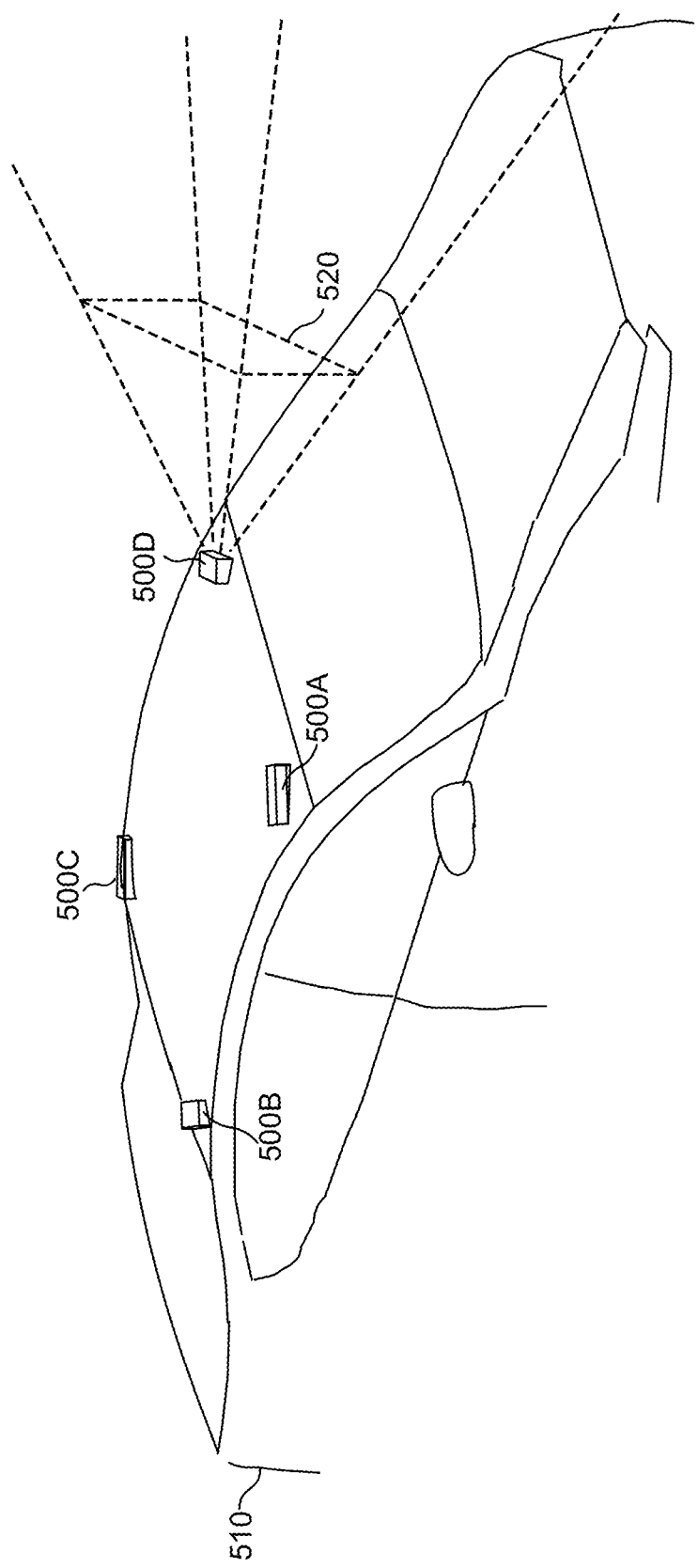
FIG. 30 is a perspective view of a roof of a vehicle, on which four sensor head units of a lidar system are arranged at respective corners.

Referring to FIG. 30, lidar sensor units 500A-D are installed in the roof of a vehicle 510, in an example implementation. Each lidar sensor unit 500A-D implements at least a portion of the lidar system 10 or 10A-E. Each of the lidar sensor units 500A-D is approximately at 45° relative to one of the edges of the roof. The lidar sensor units 500A-D thus are oriented so that the FOR of the lidar sensor unit 500A covers an area in front of the vehicle and to the right of the vehicle, the FOR of the lidar sensor unit 500B covers an area behind the vehicle and to the right of the vehicle, the FOR of the lidar sensor unit 500C covers an area behind the vehicle and to the left of the vehicle, and the FOR of the lidar sensor unit 500D covers an area in front of the vehicle and to the left of the vehicle. The FORs of the lidar sensor units 500A and 500D have an angular overlap (e.g., five degrees) directly in front of the vehicle, in an example implementation. Further, in an example implementation, the FORs of the lidar sensor units 500A and 500B have no angular overlap or little angular overlap.

In some implementations, one or more lidar sensor units 500A-D are included in a vehicle as part of an advanced driver assistance system (ADAS) to assist a driver of the vehicle in the driving process. For example, a lidar sensor unit 500A-D may be part of an ADAS that provides information or feedback to a driver (e.g., to alert the driver to potential problems or hazards) or that automatically takes control of part of a vehicle (e.g., a braking system or a steering system) to avoid collisions or accidents. The lidar sensor units 500A-D may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In some cases, one or more lidar sensor units 500A-D are integrated into a vehicle as part of an autonomous-vehicle driving system. In an example implementation, the lidar sensor units 10 provides information about the surrounding environment to a driving system of an autonomous vehicle. An autonomous-vehicle driving system may include one or more computing systems that receive information from the lidar sensor units 10 about the surrounding environment, analyze the received information, and provide control signals to the vehicle's driving systems (e.g., steering wheel, accelerator, brake, or turn signal). For example, the lidar sensor units 500A-D integrated into an autonomous vehicle may provide an autonomous-vehicle driving system with a point cloud every 0.1 seconds (e.g., the point cloud has a 10 Hz update rate, representing ten frames per second). The autonomous-vehicle driving system may analyze the received point clouds to sense or identify targets and their respective locations, distances, or speeds, and the autonomous-vehicle driving system may update control signals based on this information. As an example, if the lidar sensor unit 500A-D detects a vehicle ahead that is slowing down or stopping, the autonomous-vehicle driving system may send instructions to release the accelerator and apply the brakes.

An autonomous vehicle may be referred to as an autonomous car, driverless car, self-driving car, robotic car, or unmanned vehicle. An autonomous vehicle may be a vehicle configured to sense its environment and navigate or drive with little or no human input. For example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

An autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

As indicated above, a light source of the lidar sensor unit 500A-D can be located remotely from some of the other components of the lidar sensor unit. Moreover, a lidar system implemented in a vehicle may include fewer light sources than scanners and receivers.

Figure 31:
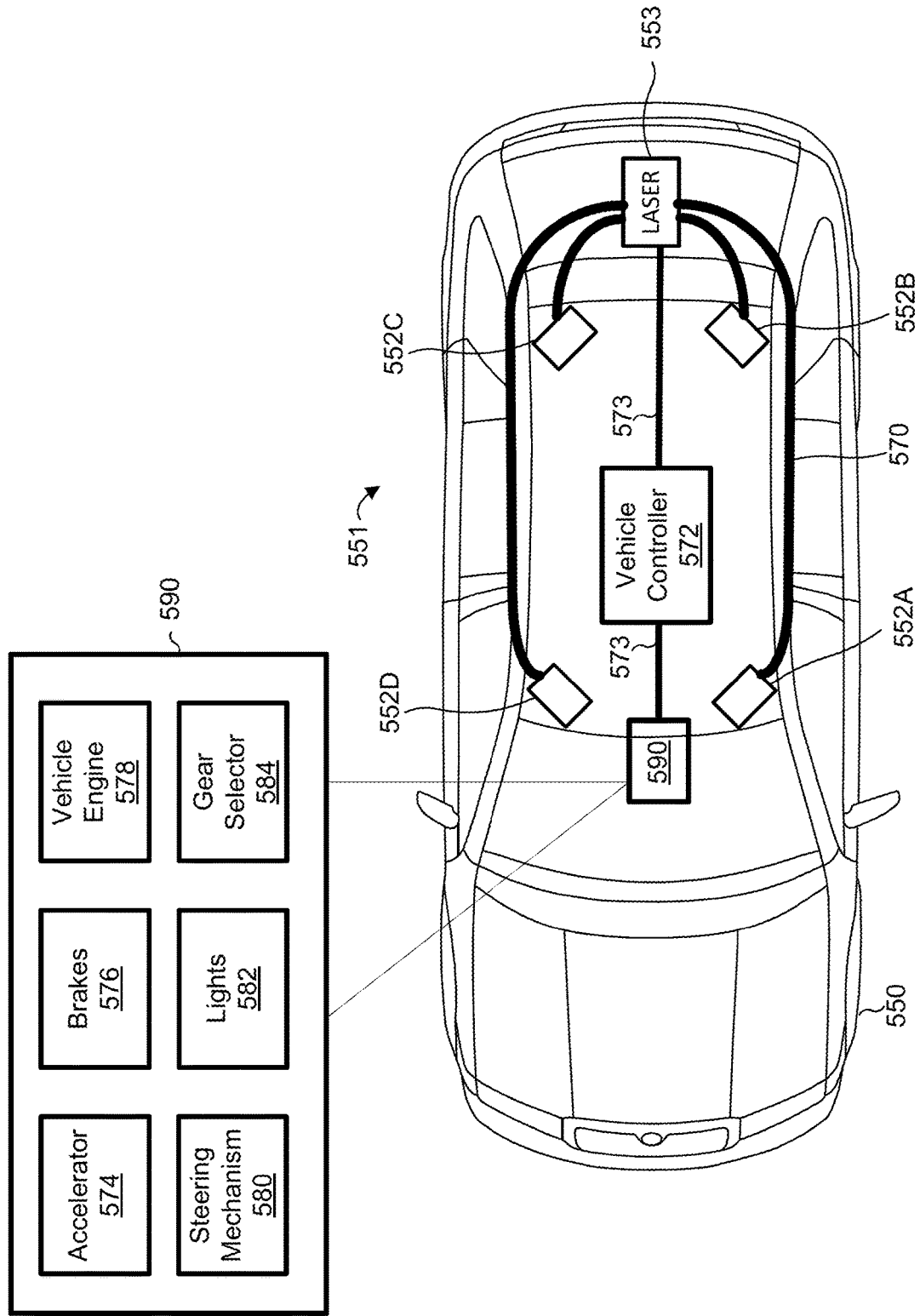
FIG. 31 illustrates an example vehicle in which one implementation of the lidar system of this disclosure can operate.

FIG. 31 illustrates an example vehicle 550 with a lidar system 551 that includes a laser 553 with multiple sensor heads 552 coupled to the laser 553 via multiple laser-sensor links 570. Each of the sensor heads 552 can implement the components of the lidar system 10 or 10A-E, for example, with the light source 12 provided outside the sensor head 552.

Each of the laser-sensor links 570 may include one or more optical links and/or one or more electrical links. The sensor heads 552 in FIG. 31 are positioned or oriented to provide a greater than 30-degree view of an environment around the vehicle. More generally, a lidar system with multiple sensor heads may provide a horizontal field of regard around a vehicle of approximately 30°, 45°, 60°, 90°, 120°, 180°, 270°, or 360°. Each of the sensor heads 552 may be attached to or incorporated into a bumper, fender, grill, side panel, spoiler, roof, headlight assembly, taillight assembly, rear-view mirror assembly, hood, trunk, window, or any other suitable part of the vehicle.

In the example of FIG. 31, four sensor heads 552 are positioned at or near the four corners of the roof of the vehicle, and the laser 553 may be located within the vehicle (e.g., in or near the trunk). The four sensor heads 552 may each provide a 90° to 120° horizontal field of regard (FOR), and the four sensor heads 552 may be oriented so that together they provide a complete 360-degree view around the vehicle. As another example, the lidar system 551 may include six sensor heads 552 positioned on or around a vehicle, where each of the sensor heads 552 provides a 60° to 90° horizontal FOR. As another example, the lidar system 551 may include eight sensor heads 552, and each of the sensor heads 552 may provide a 45° to 60° horizontal FOR. As yet another example, the lidar system 551 may include six sensor heads 552, where each of the sensor heads 552 provides a 70° horizontal FOR with an overlap between adjacent FORs of approximately 10°. As another example, the lidar system 551 may include two sensor heads 552 which together provide a forward-facing horizontal FOR of greater than or equal to 30°.

Data from each of the sensor heads 552 may be combined or stitched together to generate a point cloud that covers a greater than or equal to 30-degree horizontal view around a vehicle. For example, the laser 553 may include a controller or processor that receives data from each of the sensor heads 552 (e.g., via a corresponding electrical link 570) and processes the received data to construct a point cloud covering a 360-degree horizontal view around a vehicle or to determine distances to one or more targets. The point cloud or information from the point cloud may be provided to a vehicle controller 572 via a corresponding electrical, optical, or radio link 570. In some implementations, the point cloud is generated by combining data from each of the multiple sensor heads 552 at a controller included within the laser 553 and provided to the vehicle controller 572. In other implementations, each of the sensor heads 552 includes a controller or process that constructs a point cloud for a portion of the 360-degree horizontal view around the vehicle and provides the respective point cloud to the vehicle controller 572. The vehicle controller 572 then combines or stitches together the points clouds from the respective sensor heads 552 to construct a combined point cloud covering a 360-degree horizontal view. Still further, the vehicle controller 572 in some implementations communicates with a remote server to process point cloud data.

In any event, the vehicle 550 may be an autonomous vehicle where the vehicle controller 572 provides control signals to various components 590 within the vehicle 550 to maneuver and otherwise control operation of the vehicle 550. The components 590 are depicted in an expanded view in FIG. 31 for ease of illustration only. The components 590 may include an accelerator 574, brakes 576, a vehicle engine 578, a steering mechanism 580, lights 582 such as brake lights, head lights, reverse lights, emergency lights, etc., a gear selector 584, and/or other suitable components that effectuate and control movement of the vehicle 550. The gear selector 584 may include the park, reverse, neutral, drive gears, etc. Each of the components 590 may include an interface via which the component receives commands from the vehicle controller 572 such as "increase speed," "decrease speed," "turn left 5 degrees," "activate left turn signal," etc. and, in some cases, provides feedback to the vehicle controller 572.

In some implementations, the vehicle controller 572 receives point cloud data from the sensor heads 552 via the link 573 and analyzes the received point cloud data to sense or identify targets and their respective locations, distances, speeds, shapes, sizes, type of target (e.g., vehicle, human, tree, animal), etc. The vehicle controller 572 then provides control signals via the link 573 to the components 590 to control operation of the vehicle based on the analyzed information. For example, the vehicle controller 572 may identify an intersection based on the point cloud data and determine that the intersection is the appropriate location at which to make a left turn. Accordingly, the vehicle controller 572 may provide control signals to the steering mechanism 580, the accelerator 574, and brakes 576 for making a proper left turn. In another example, the vehicle controller 572 may identify a traffic light based on the point cloud data and determine that the vehicle 550 needs to come to a stop. As a result, the vehicle controller 572 may provide control signals to release the accelerator 574 and apply the brakes 576.

Figure 32:
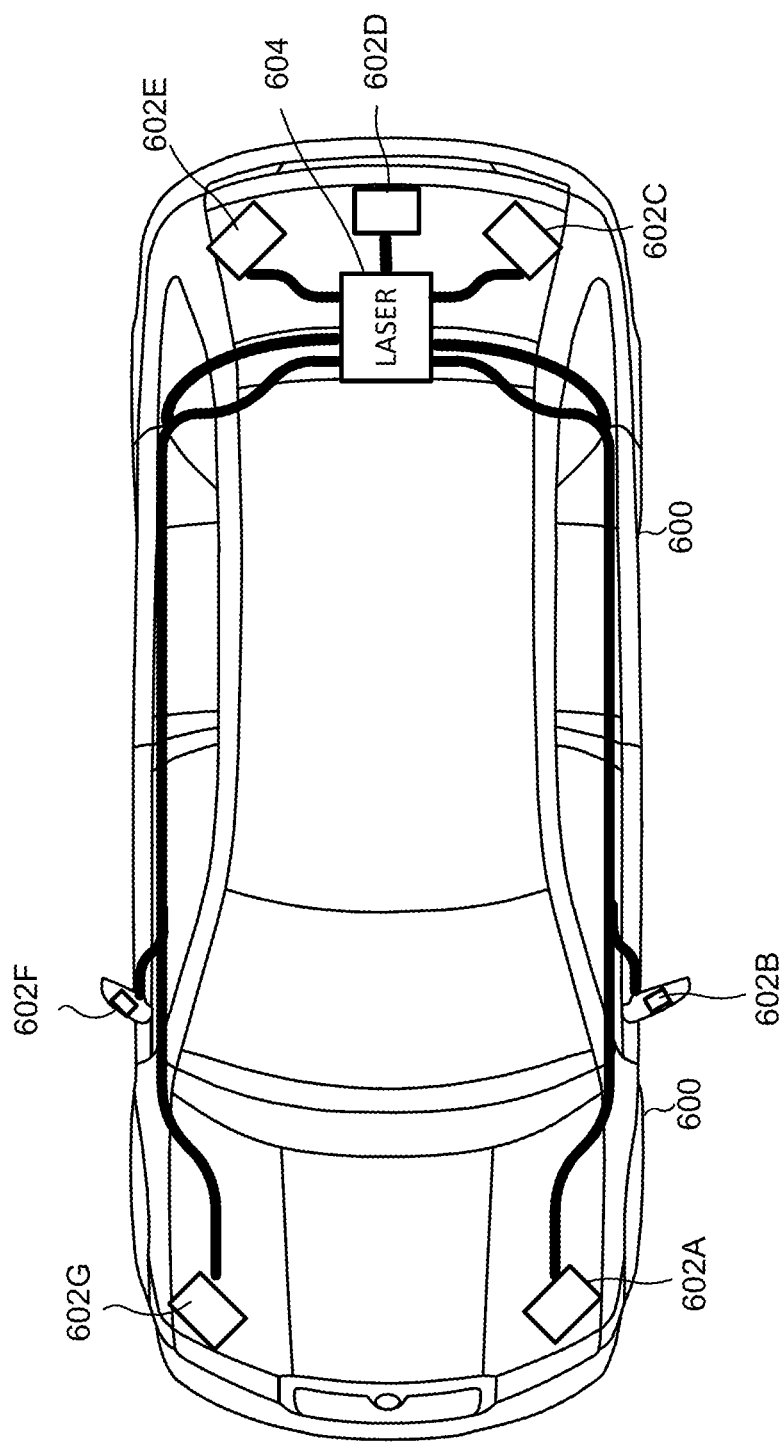
FIG. 32 illustrates an example vehicle in which another implementation of the lidar system of this disclosure can operate.

As another example, FIG. 32 illustrates a vehicle 600 in which a laser 604 is optically coupled to six sensor heads 602, each of which can be implemented as the lidar sensor unit 552 discussed above. The sensor heads 602A and 602G are disposed at the front of the vehicle 600, the sensor heads 602B and 602F are disposed in the side view mirrors, and the sensor heads 602C-E are disposed on the trunk. In particular, the sensor head 602D is oriented to face backward relative to the orientation of the vehicle 600, and the sensor heads 602E and 602C are oriented at approximately 45 degrees relative to the axis of orientation of the sensor head 602D.

Generating Pixels According to Scan Patterns in a Lidar System

Figure 33:
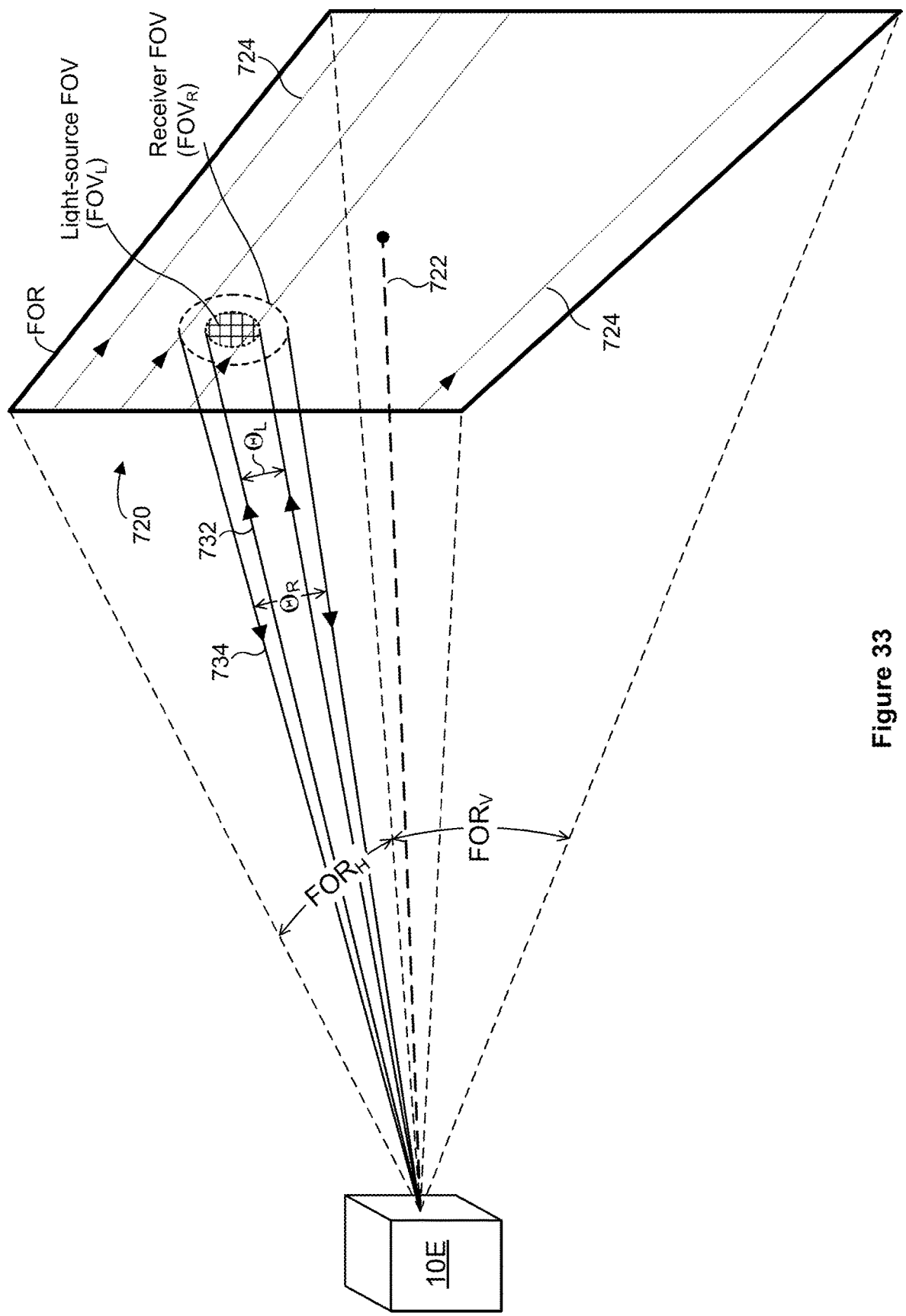
FIG. 33 schematically illustrates fields of view (FOVs) of a light source and a detector that can operate in the lidar sensor unit of this disclosure.

FIG. 33 illustrates an example light-source field of view ($FOV_L$) and receiver field of view ($FOV_R$) for the lidar system 10 or 10A-E, as well as a scan pattern 720 which this lidar system can produce. For convenience, the scenario of FIG. 33 is discussed with reference to the lidar system 10E.

The scan pattern 720 corresponds to a scan across any suitable field of regard (FOR) having any suitable horizontal FOR ($FOR_H$) and any suitable vertical FOR ($FOR_V$). For example, a certain scan pattern may have a field of regard represented by angular dimensions (e.g., $FOR_H \times FOR_V$) 40°×30°, 90°×40°, or 60°×15°. As another example, a certain scan pattern may have a $FOR_H$ greater than or equal to 10°, 25°, 30°, 40°, 60°, 90°, or 120°. As yet another example, a certain scan pattern may have a $FOR_V$ greater than or equal to 2°, 5°, 10°, 15°, 20°, 30°, or 45°. In the example of FIG. 33, a reference line 722 represents a center of the field of regard of the scan pattern 720. The reference line 522 may have any suitable orientation, such as, a horizontal angle of 0° (e.g., reference line 722 may be oriented straight ahead) and a vertical angle of 0° (e.g., reference line 722 may have an inclination of 0°), or the reference line 722 may have a nonzero horizontal angle or a nonzero inclination (e.g., a vertical angle of +10° or −10°). In FIG. 33, if the scan pattern 720 has a 60° x15° field of regard, then the scan pattern 720 covers a ±30° horizontal range with respect to reference line 722 and a ±7.5° vertical range with respect to reference line 722. Additionally, an optical beam 732 in FIG. 33 has an orientation of approximately −15° horizontal and +3° vertical with respect to reference line 722. The beam 732 may be referred to as having an azimuth of −15° and an altitude of +3° relative to the reference line 722. An azimuth (which may be referred to as an azimuth angle) may represent a horizontal angle with respect to the reference line 722, and an altitude (which may be referred to as an altitude angle, elevation, or elevation angle) may represent a vertical angle with respect to the reference line 722.

The scan pattern 720 may include multiple pixels along scan lines 724, each pixel corresponding to instantaneous light-source $FOV_L$. Each pixel may be associated with one or more laser pulses and one or more corresponding distance measurements. A cycle of the scan pattern 720 may include a total of $P_x \times P_y$ pixels (e.g., a two-dimensional distribution of $P_x$ by $P_y$ pixels). For example, the scan pattern 720 may include a distribution with dimensions of approximately 100-2,000 pixels along a horizontal direction and approximately 4-200 pixels along a vertical direction. As another example, the scan pattern 720 may include a distribution of 1,000 pixels along the horizontal direction by 64 pixels along the vertical direction (e.g., the frame size is 1000×64 pixels) for a total of 64,000 pixels per cycle of scan pattern 720. The number of pixels along a horizontal direction may be referred to as a horizontal resolution of the scan pattern 720, and the number of pixels along a vertical direction may be referred to as a vertical resolution of the scan pattern 720. As an example, the scan pattern 720 may have a horizontal resolution of greater than or equal to 100 pixels and a vertical resolution of greater than or equal to four pixels. As another example, the scan pattern 720 may have a horizontal resolution of 100-2,000 pixels and a vertical resolution of 4-400 pixels.

Each pixel may be associated with a distance (e.g., a distance to a portion of a target from which the corresponding laser pulse was scattered) or one or more angular values. As an example, the pixel may be associated with a distance value and two angular values (e.g., an azimuth and altitude) that represent the angular location of the pixel with respect to the lidar system. A distance to a portion of the target may be determined based at least in part on a time-of-flight measurement for a corresponding pulse. An angular value (e.g., an azimuth or altitude) may correspond to an angle (e.g., relative to reference line 722) of the output beam 732 (e.g., when a corresponding pulse is emitted from the lidar system 10E) or an angle of the input beam 734 (e.g., when an input signal is received by the lidar system 10E). In some implementations, the lidar system 10E determines an angular value based at least in part on a position of a component of the scanner. For example, an azimuth or altitude value associated with the pixel may be determined from an angular position of one or more corresponding scanning mirrors of the scanner.

The light sources of the lidar system 10E may emit pulses of light as the $FOV_L$ and $FOV_R$ are scanned by the scanner across the FOR. The light-source field of view may refer to an angular cone illuminated by the light source at a particular instant of time or an angular cone that would be illuminated by the light source at a particular instant of time if the light source were to emit light at that instant of time. For example, when the light source operates in a pulsed mode, the light source may continuously change its orientation relative to the external world but actively illuminate corresponding regions only during the duty cycle.

Similarly, a receiver field of view may refer to an angular cone over which the receiver may receive or detect light at a particular instant of time, and any light outside the receiver field of view may not be received or detected. For example, as the scanner scans the light-source field of view across a field of regard, the lidar system 10E may send the pulse of light in the direction the $FOV_L$ is pointing at the time the light source emits the pulse. The pulse of light may scatter off the target, and the receiver may receive and detect a portion of the scattered light that is directed along or contained within the $FOV_R$.

An instantaneous FOV may refer to an angular cone being illuminated by a pulse directed along the direction the light-source FOV is pointing at the instant the pulse of light is emitted. Thus, while the light-source FOV and the detector FOV are scanned together in a synchronous manner (e.g., the scanner scans both the light-source FOV and the detector FOV across the field of regard along the same scan direction and at the same scan speed, maintaining the same relative position to each other), the instantaneous FOV remains "stationary," and the detector FOV effectively moves relative to the instantaneous FOV. More particularly, when a pulse of light is emitted, the scanner directs the pulse along the direction in which the light-source FOV currently is pointing. Each instantaneous FOV (IFOV) corresponds to a pixel. Thus, each time a pulse is emitted, the lidar system 10E produces or defines an IFOV (or pixel) that is fixed in place and corresponds to the light-source FOV at the time when the pulse is emitted. During operation of the scanner, the detector FOV moves relative to the light-source IFOV but does not move relative to the light-source FOV.

In some implementations, the scanner is configured to scan both a light-source field of view and a receiver field of view across a field of regard of the lidar system 10E. The lidar system may emit and detect multiple pulses of light as the scanner scans the $FOV_L$ and $FOV_R$ across the field of regard while tracing out the scan pattern 720. The scanner in some implementations scans the light-source field of view and the receiver field of view synchronously with respect to one another. In this case, as the scanner scans $FOV_L$ across a scan pattern 720, the $FOV_R$ follows substantially the same path at the same scanning speed. Additionally, the $FOV_L$ and $FOV_R$ may maintain the same relative position to one another as the scanner scans $FOV_L$ and $FOV_R$ across the field of regard. For example, the $FOV_L$ may be substantially overlapped with or centered inside the $FOV_R$, and the scanner may maintain this relative positioning between $FOV_L$ and $FOV_R$ throughout a scan. As another example, the $FOV_R$ may lag behind the $FOV_L$ by a particular, fixed amount throughout a scan (e.g., the $FOV_R$ may be offset from the $FOV_L$ in a direction opposite the scan direction). As yet another example, during a time between the instant when a pulse is emitted and prior to the time when the pulse can return from a target located at the maximum distance $R_{MAX}$, $FOV_R$ may move relative to the IFOV or pixel to define different amounts of overlap, as discussed in more detail below.

The $FOV_L$ may have an angular size or extent $\Theta_L$ that is substantially the same as or that corresponds to the divergence of the output beam 732, and the $FOV_R$ may have an angular size or extent $\Theta_R$ that corresponds to an angle over which the receiver may receive and detect light. The receiver field of view may be any suitable size relative to the light-source field of view. For example, the receiver field of view may be smaller than, substantially the same size as, or larger than the angular extent of the light-source field of view. In some implementations, the light-source field of view has an angular extent of less than or equal to 50 milliradians, and the receiver field of view has an angular extent of less than or equal to 50 milliradians. The $FOV_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent $\Theta_R$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. The light-source field of view and the receiver field of view may have approximately equal angular extents. As an example, $\Theta_L$ and $\Theta_R$ may both be approximately equal to 1 mrad, 2 mrad, or 3 mrad. In some implementations, the receiver field of view is larger than the light-source field of view, or the light-source field of view is larger than the receiver field of view. For example, $\Theta_L$ may be approximately equal to 1.5 mrad, and $\Theta_R$ may be approximately equal to 3 mrad. As another example, $\Theta_R$ may be approximately L times larger than $\Theta_L$, where L is any suitable factor, such as for example, 1.1, 1.2, 1.5, 2, 3, 5, or 10.

As indicated above, a pixel may represent or correspond to an instantaneous light-source FOV. As the output beam 732 propagates from the light source, the diameter of the output beam 732 (as well as the size of the corresponding pixel) may increase according to the beam divergence $\Theta_L$. As an example, if the output beam 732 has a $\Theta_L$ of 2 mrad, then at a distance of 100 m from the lidar system 120A or 120B, the output beam 532 may have a size or diameter of approximately 20 cm, and a corresponding pixel may also have a corresponding size or diameter of approximately 20 cm. At a distance of 200 m from the lidar system 10E, the output beam 732 and the corresponding pixel may each have a diameter of approximately 40 cm.

The scanner may be configured to scan the output beam 732 over a 5-degree angular range, 20-degree angular range, 30-degree angular range, 60-degree angular range, or any other suitable angular range. The FOR of the lidar system 10E may refer to an area, region, or angular range over which the lidar system 10E may be configured to scan or capture distance information. When the lidar system 10E scans the output beam 732 within a 30-degree scanning range, the lidar system 10E may be referred to as having a 30-degree angular field of regard. In various implementations, the lidar system 10E may have a FOR of approximately 10°, 20°, 40°, 60°, 120°, or any other suitable FOR. The FOR also may be referred to as a scan region.

The scanner is configured to scan the output beam 732 horizontally, with each reflective surface of the polygon mirror defining a respective scan line 724, and vertically, where the oscillation of the planar mirror moves the scan lines 724 upward or downward. The lidar system 10E may have a particular FOR along the horizontal direction and another particular FOR along the vertical direction. For example, the lidar system 10E may have a horizontal FOR of 10° to 120° and a vertical FOR of 2° to 45°.

The controller of the lidar system 10E in one implementation generates and dynamically modifies the drive signal for the motor which oscillates the scan mirrors 204-1 and 204-2. The motor driving rotation of the polygon mirror 202 may operate in an open-loop mode, without relying on control signals from the controller. In this implementation, the motor driving the polygon mirror 202 may rotate at a constant speed to generate similar scan lines, while variations in the speed at which one or both of the scan mirrors 204-1 and 204-2 move relative to the axis of oscillation can result in some scan lines being farther apart, some scan lines being closer together, etc. Further, the controller can modify the drive signal for the galvanometer scanners to reposition the entire operational FOR of the lidar sensor unit 10E within the larger range motion available to the lidar system 10E. Still further, the controller can modify the drive signal for the motor to "stretch" the FOR of the operational FOR of the lidar system 10E so as to encompass the entire available FOR. In some implementations, the motor driving rotation of the polygon mirror 202 may operate in a closed-loop mode, where the motor receives a control signal that regulates, stabilizes, or adjusts the rotational speed of the polygon mirror 202. For example, the polygon mirror 202 may be provided with a tab that passes through one or more stationary photo-interrupters as the polygon mirror 202 rotates. The signals from the photo-interrupters may be sent to the controller, and the controller may provide a control signal to the motor to maintain the rotation speed of the polygon mirror 202 at a substantially constant value.

In other implementations, however, the controller modifies the drive signal supplied to the motor to thereby adjust the rotation of the polygon mirror 202. For example, the controller may slow down the rotation of the polygon mirror 202 when one of the output beams traverses the middle of the scan line, so that pixel density near the center of the $FOR_H$ is higher than at the periphery of the $FOR_H$.

The controller may modify the drive signal for the motor and/or the drive signal for the galvanometer scanners dynamically in response to various triggering events. In addition to detection of an upward or downward slope, as discussed in more detail below, examples of suitable triggering events include detection of a particular object in a certain direction relative to the vehicle (e.g., if an object is moving quickly across the path of the vehicle, the lidar system 10E may modify the scan pattern to obtain a higher density rate where the object is detected to be able to better respond to the potential threat of collision), a sound detected at in a certain direction relative to the vehicle, a heat signature detected at in a certain direction relative to the vehicle, etc.

General Considerations

In some cases, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some cases, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various implementations have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A lidar system comprising:
    a light source configured to produce a beam of light;
    a scanner configured to scan a field of regard of the lidar system, the scanner including:
        a polygon mirror having a block with a first wall, a second wall, and a plurality of reflective surfaces angularly offset from one another along a periphery of the block, the polygon mirror configured to rotate about a polygon-mirror rotation axis to scan the beam of light across the field of regard, and
        a bracket adjacent to the polygon mirror, wherein the bracket includes:
            a cavity that partially encloses the polygon mirror between a first edge of the cavity and a second edge of the cavity, wherein the plurality of reflective surfaces move away from the first edge and toward the second edge when the polygon mirror rotates about the polygon-mirror rotation axis; and
            a noise-reducing feature configured to reduce acoustic noise produced when pressure waves generated by the polygon mirror during rotation are incident on one or more components of the scanner, wherein the noise-reducing feature is disposed at the second edge of the cavity so as to spread out the pressure waves in time; and
    a receiver configured to detect light from the beam of light scattered by a remote target.

2. The lidar system of claim 1, wherein the polygon mirror further includes a plurality of chamfered or rounded corners in the block of the polygon mirror, each of the chamfered or rounded corners being bounded by a pair of adjacent reflective surfaces.

3. The lidar system of claim 1, wherein the noise-reducing feature includes a tapered feature oriented toward the pressure waves.

4. The lidar system of claim 3, wherein the noise-reducing feature includes a plurality of tapered features oriented toward the pressure waves.

5. The lidar system of claim 3, wherein the tapered feature is shaped as a triangle with substantially straight edges.

6. The lidar system of claim 3, wherein the tapered feature is shaped as a pseudo-triangle with convex or concave edges.

7. The lidar system of claim 3, wherein the noise-reducing feature includes another tapered feature disposed on the first edge and oriented in an opposite direction relative to the tapered feature disposed on the second edge.

8. The lidar system of claim 1, wherein a first line from the first edge to the polygon-mirror rotation axis and a second line from the second edge to the polygon-mirror rotation axis form an angle selected so that the pressure waves produced by the polygon mirror during rotation do not add together in phase.

9. The lidar system of claim 8, wherein the angle is selected according to a formula $\Omega=(360/N)*(m+\frac{1}{3})$, wherein $\Omega$ is the angle, N is a number of the plurality of reflective surfaces of the polygon mirror, and m is an integer.

10. The lidar system of claim 8, wherein the polygon mirror is a hexagonal mirror, and wherein the angle formed by the first line and the second line is approximately 200 degrees.

11. The lidar system of claim 1, wherein the bracket partially surrounds the polygon mirror.

12. A method for manufacturing a scanner for use in a lidar system, the method comprising:
    forming a polygon mirror having a block with a first wall, a second wall, and a plurality of reflective surfaces angularly offset from one another along a periphery of the block;
    forming a bracket including a cavity to partially enclose the polygon mirror, the cavity including a first edge and a second edge;
    mounting the polygon mirror on a polygon mirror axle, so that the bracket is adjacent to the polygon mirror, to configure the polygon mirror to rotate about the polygon mirror axle and scan a beam of light from a light source across a field of regard of the scanner;
    configuring the plurality of reflective surfaces to move away from the first edge and toward the second edge when the polygon mirror rotates about the polygon mirror axle;
    forming a noise-reducing feature on the bracket to reduce acoustic noise produced when pressure waves generated by the polygon mirror during rotation are incident on one or more components of the scanner, wherein forming the noise-reducing feature includes placing the noise-reducing feature at the second edge of the cavity so as to spread out the pressure waves in time; and
    coupling a receiver to the scanner to detect light from the beam of light scattered by a remote target.

13. The method of claim 12, further comprising forming a plurality of chamfered or rounded corners in the block of the polygon mirror, each of the chamfers being bounded by a pair of adjacent reflective surfaces.

14. The method of claim 12, wherein forming the noise-reducing feature further includes forming, at the second edge of the cavity, a tapered feature oriented toward the pressure waves.

15. The method of claim 14, further comprising forming a plurality of tapered features oriented toward the pressure waves.

16. The method of claim 14, wherein forming the noise-reducing feature further includes shaping the tapered feature as a triangle with substantially straight edges.

17. The method of claim 14, wherein forming the noise-reducing feature further includes shaping the tapered feature as a pseudo-triangle with convex or concave edges.

18. The method of claim 14, further comprising:
  forming another tapered feature on the first edge, and
  orienting the tapered feature on the first edge in an opposite direction relative to the tapered feature on the second edge.

19. The method of claim 12, wherein a first line from the first edge to the polygon-mirror axle and a second line from the second edge to the polygon-mirror axle form an angle; the method further comprising:
  selecting the angle so that the pressure waves produced by the polygon mirror during rotation do not add together in phase.

20. The method of claim 19, further comprising selecting the angle according to a formula $\Omega=(360/N)*(m+\frac{1}{3})$, wherein $\Omega$ is the angle, N is a number of the plurality of reflective surfaces of the polygon mirror, and m is an integer.

21. The method of claim 19, wherein the polygon mirror is a hexagonal mirror, and wherein the method includes selecting the angle formed by the first line and the second line to be approximately 200 degrees.

* * * * *